US012073859B2

(12) United States Patent
Kaneko et al.

(10) Patent No.: US 12,073,859 B2
(45) Date of Patent: Aug. 27, 2024

(54) DETECTION DEVICE, INSPECTION DEVICE, MAGNETIC TAPE CARTRIDGE, MAGNETIC TAPE, MAGNETIC TAPE DRIVE, MAGNETIC TAPE SYSTEM, DETECTION METHOD, INSPECTION METHOD, AND PROGRAM

(71) Applicant: FUJIFILM Corporation, Tokyo (JP)

(72) Inventors: Tetsuya Kaneko, Kanagawa (JP); Toru Nakao, Kanagawa (JP); Yoichi Akano, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/145,088

(22) Filed: Dec. 22, 2022

(65) Prior Publication Data

US 2023/0206950 A1 Jun. 29, 2023

(30) Foreign Application Priority Data

Dec. 24, 2021 (JP) ................................ 2021-211558

(51) Int. Cl.

*G11B 5/584* (2006.01)
*G11B 5/008* (2006.01)
*G11B 5/596* (2006.01)

(52) U.S. Cl.

CPC .......... *G11B 5/59688* (2013.01); *G11B 5/584* (2013.01)

(58) Field of Classification Search

CPC ..... G11B 5/56; G11B 5/00817; G11B 5/2652; G11B 5/29
USPC ....................................................... 360/77.12
See application file for complete search history.

(56) References Cited

U.S. PATENT DOCUMENTS

| | | | | |
|---|---|---|---|---|
| 6,781,784 | B2 | 8/2004 | Peterson | |
| 8,094,402 | B2 | 1/2012 | Bui et al. | |
| 11,031,033 | B2 * | 6/2021 | Terakawa ........... | G11B 5/00813 |
| 2009/0128949 | A1 | 5/2009 | Matsuno et al. | |
| 2012/0014010 | A1 | 1/2012 | Cherubini et al. | |

FOREIGN PATENT DOCUMENTS

JP 2009-123288 A 6/2009

OTHER PUBLICATIONS

Extended European Search Report dated May 17, 2023 in Application No. 22214838.9.
Giovanni Cherubini et al., "High-Performance Servo Channel for Nanometer Head Positioning in Tape Systems", The 2012 IEEE/ASME International Conference on Advanced Intelligent Mechatronics, Jul. 11-14, 2012, Kaohsiung, Taiwan, pp. 788-795 (8 total pages).

* cited by examiner

*Primary Examiner* — Nabil Z Hindi
(74) *Attorney, Agent, or Firm* — Sughrue Mion, PLLC

(57) ABSTRACT

A detection device includes a processing device and a storage medium. The processing device stores a result of reading a reference servo pattern by a servo reading element in the storage medium as an ideal waveform signal, acquires a servo band signal which is a result of reading a servo pattern recorded in a servo band by the servo reading element, and detects a servo pattern signal which is a result of reading the servo pattern by the servo reading element by comparing the ideal waveform signal with the servo band signal. The reference servo pattern is recorded between a BOT section and an EOT section in a longitudinal direction of the magnetic tape.

24 Claims, 35 Drawing Sheets

DETECTION DEVICE, INSPECTION DEVICE, MAGNETIC TAPE CARTRIDGE, MAGNETIC TAPE, MAGNETIC TAPE DRIVE, MAGNETIC TAPE SYSTEM, DETECTION METHOD, INSPECTION METHOD, AND PROGRAM

CROSS-REFERENCE TO RELATED APPLICATIONS

This application claims priority under 35 USC 119 from Japanese Patent Application No. 2021-211558 filed on Dec. 24, 2021, the disclosure of which is incorporated by reference herein.

BACKGROUND

1. Technical Field

The technology of the present disclosure relates to a detection device, an inspection device, a magnetic tape cartridge, a magnetic tape, a magnetic tape drive, a magnetic tape system, a detection method, an inspection method, and a program.

2. Related Art

U.S. Pat. No. 8,094,402B raises a problem in a magnetic tape device that a read and/or write error occurs in a case in which a tape does not pass through a head at appropriate tension and/or a skew angle. In order to solve this problem, a system disclosed in U.S. Pat. No. 8,094,402B includes a head having an array of at least one of a reader or a writer, a drive mechanism that causes a magnetic recording tape to pass on the head, and a skew induction mechanism bonded to the head, in which a skew angle of a vertical axis of the array with respect to a direction perpendicular to a direction in which the tape is moved on the head, and a controller that communicates with the head is adjusted. In addition, the system disclosed in U.S. Pat. No. 8,094,402B determines a tape dimension stable state of the tape, adjusts the skew angle in a direction away from a normal line with respect to a tape movement direction, and reduces the tension of the tape on the entire head in a case in which the tape dimension stable state is in a contraction state.

U.S. Pat. No. 6,781,784B discloses a method of performing reading by selectively using a reading element offset in a vertical direction with respect to a data track of a magnetic tape in which distortion in a lateral direction occurs. The reading element is a part of a tape head that has an azimuthal angle with respect to the tape and creates an offset in the lateral direction between the reading elements. The offset in the lateral direction is used to minimize the effects of the distortion of the tape in the lateral direction.

JP2009-123288A discloses a head device comprising a head unit on which a plurality of magnetic elements that each perform at least one of reproduction of data recorded in a plurality of data tracks provided in a magnetic tape or recording of data in each data track are arranged to be parallel on a first straight line at equal intervals, a moving mechanism that moves the head unit, and a controller that executes a tracking control of causing the magnetic elements to be on-tracked on the data tracks, respectively, by moving the head unit by the moving mechanism. In the head device disclosed in JP2009-123288A, the moving mechanism is configured to perform rotational movement of rotationally moving the head unit in an orientation of increasing or decreasing an angle formed by a second straight line along a width of the magnetic tape line and the first straight line, and, during the execution of the tracking control, the controller causes each magnetic element to be on-tracked on each data track by rotationally moving and driving the head unit by the moving mechanism by an increasing or decreasing amount of the angle in accordance with a change of an interval between the data tracks.

SUMMARY

One embodiment according to the technology of the present disclosure is to provide a detection device, an inspection device, a magnetic tape cartridge, a magnetic tape, a magnetic tape drive, a magnetic tape system, a detection method, an inspection method, and a program capable of detecting a servo pattern signal with high accuracy.

A first aspect according to the technology of the present disclosure relates to a detection device comprising a processing device, and a storage medium, in which the processing device stores a result of reading a reference servo pattern by a servo reading element from a magnetic tape in which the reference servo pattern is recorded, in the storage medium as an ideal waveform signal indicating an ideal waveform, acquires a servo band signal which is a result of reading a servo pattern recorded in a servo band of the magnetic tape by the servo reading element, and detects a servo pattern signal which is a result of reading the servo pattern by the servo reading element by comparing the ideal waveform signal stored in the storage medium with the servo band signal, the magnetic tape has a BOT section and an EOT section, and the reference servo pattern is recorded between the BOT section and the EOT section in a longitudinal direction of the magnetic tape.

A second aspect according to the technology of the present disclosure relates to the detection device according to the first aspect, in which the reference servo pattern is recorded in a plurality of sections intermittently provided along the longitudinal direction.

A third aspect according to the technology of the present disclosure relates to the detection device according to the second aspect, in which the plurality of sections are provided across a portion, which is designated in advance as a portion in which a width of the magnetic tape is deformed, in the longitudinal direction.

A fourth aspect according to the technology of the present disclosure relates to the detection device according to the second or third aspect, in which the plurality of sections are provided at regular intervals along the longitudinal direction of the magnetic tape.

A fifth aspect according to the technology of the present disclosure relates to the detection device according to any one of the first to fourth aspects, in which the reference servo pattern is further recorded in at least one of the BOT section or the EOT section.

A sixth aspect according to the technology of the present disclosure relates to the detection device according to any one of the first to fifth aspects, in which the ideal waveform signal is a signal indicating a statistic value of the result of reading the reference servo pattern.

A seventh aspect according to the technology of the present disclosure relates to the detection device according to any one of the first to sixth aspects, in which a geometrical characteristic of the reference servo pattern corresponds to a geometrical characteristic of the servo pattern.

An eighth aspect according to the technology of the present disclosure relates to the detection device according to any one of the first to seventh aspects, in which the reference servo pattern is at least one first linear magnetization region pair, the first linear magnetization region pair includes a first linear magnetization region which is linearly magnetized, and a second linear magnetization region which is linearly magnetized, the first linear magnetization region and the second linear magnetization region are inclined in opposite directions with respect to a first imaginary straight line along a width direction of the magnetic tape, the ideal waveform signal is classified into a first ideal waveform signal and a second ideal waveform signal, the first ideal waveform signal is a signal indicating a result of reading the first linear magnetization region by the servo reading element, and the second ideal waveform signal is a signal indicating a result of reading the second linear magnetization region by the servo reading element.

A ninth aspect according to the technology of the present disclosure relates to the detection device according to the eighth aspect, in which the servo pattern is at least one second linear magnetization region pair, the second linear magnetization region pair includes a third linear magnetization region which is linearly magnetized, and a fourth linear magnetization region which is linearly magnetized, the third linear magnetization region and the fourth linear magnetization region are inclined in opposite directions with respect to the first imaginary straight line along the width direction of the magnetic tape, the servo pattern signal includes a first signal which is a result of reading the third linear magnetization region by the servo reading element, and a second signal which is a result of reading the fourth linear magnetization region by the servo reading element, the processing device includes a first detection circuit and a second detection circuit which are connected in parallel, the first detection circuit acquires the servo band signal, and detects the first signal by comparing the servo band signal with the first ideal waveform signal, and the second detection circuit acquires the servo band signal, and detects the second signal by comparing the servo band signal with the second ideal waveform signal.

A tenth aspect according to the technology of the present disclosure relates to the detection device according to any one of the first to ninth aspects, in which the processing device detects the servo pattern signal by using an autocorrelation coefficient.

An eleventh aspect according to the technology of the present disclosure relates to the detection device according to any one of the first to tenth aspects, in which the magnetic tape is accommodated in a cartridge, and a noncontact storage medium capable of communicating with the processing device in a noncontact manner is provided in the cartridge as the storage medium.

A twelfth aspect according to the technology of the present disclosure relates to the detection device according to any one of the first to eleventh aspects, in which the storage medium is the magnetic tape.

A thirteenth aspect according to the technology of the present disclosure relates to a magnetic tape cartridge comprising a memory in which the ideal waveform signal to be compared with the servo band signal by the processing device provided in the detection device according to any one of the first to twelfth aspects is stored, and the magnetic tape.

A fourteenth aspect according to the technology of the present disclosure relates to a magnetic tape in which the ideal waveform signal to be compared with the servo band signal by the processing device provided in the detection device according to any one of the first to twelfth aspects is stored.

A fifteenth aspect according to the technology of the present disclosure relates to the magnetic tape according to the fourteenth aspect, in which a BOT section and/or an EOT section is provided, and the ideal waveform signal is stored in the BOT section and/or the EOT section.

A sixteenth aspect according to the technology of the present disclosure relates to the magnetic tape according to the fourteenth or fifteenth aspect, in which a data band is formed, and the ideal waveform signal is stored in the data band.

A seventeenth aspect according to the technology of the present disclosure relates to a magnetic tape cartridge in which the magnetic tape according to any one of the fourteenth to sixteenth aspects is accommodated.

An eighteenth aspect according to the technology of the present disclosure relates to an inspection device comprising the detection device according to any one of the first to twelfth aspects, and an inspection processor that performs an inspection of the servo band in which the servo pattern is recorded in the magnetic tape based on the servo pattern signal detected by the detection device.

A nineteenth aspect according to the technology of the present disclosure relates to a magnetic tape drive comprising the detection device according to any one of the first to twelfth aspects, and a magnetic head that is operated in response to the servo pattern signal detected by the detection device.

A twentieth aspect according to the technology of the present disclosure relates to a magnetic tape system comprising a magnetic tape drive including the detection device according to any one of the first to twelfth aspects, and a magnetic head that is operated in response to the servo pattern signal detected by the detection device, and a magnetic tape subjected to magnetic processing by the magnetic head.

A twenty-first aspect according to the technology of the present disclosure relates to a detection method comprising storing a result of reading a reference servo pattern by a servo reading element from a magnetic tape in which the reference servo pattern is recorded, in a storage medium as an ideal waveform signal indicating an ideal waveform, acquiring a servo band signal which is a result of reading a servo pattern recorded in a servo band of the magnetic tape by the servo reading element, and detecting a servo pattern signal which is a result of reading the servo pattern by the servo reading element by comparing the ideal waveform signal stored in the storage medium with the servo band signal, in which the magnetic tape has a BOT section and an EOT section, and the reference servo pattern is recorded between the BOT section and the EOT section in a longitudinal direction of the magnetic tape.

A twenty-second aspect according to the technology of the present disclosure relates to an inspection method comprising performing an inspection of the servo band in which the servo pattern is recorded in the magnetic tape based on the servo pattern signal detected by the detection method according to the twenty-first aspect.

A twenty-third aspect according to the technology of the present disclosure relates to a program causing a computer to execute a process comprising storing a result of reading a reference servo pattern by a servo reading element from a magnetic tape in which the reference servo pattern is recorded, in a storage medium as an ideal waveform signal indicating an ideal waveform, acquiring a servo band signal which is a result of reading a servo pattern recorded in a servo band of the magnetic tape by the servo reading element, and detecting a servo pattern signal which is a result of reading the servo pattern by the servo reading element by comparing the ideal waveform signal stored in the storage medium with the servo band signal, in which the magnetic tape has a BOT section and an EOT section, and the reference servo pattern is recorded between the BOT section and the EOT section in a longitudinal direction of the magnetic tape.

BRIEF DESCRIPTION OF THE DRAWINGS

Exemplary embodiments of the technology of the disclosure will be described in detail based on the following figures, wherein.

DETAILED DESCRIPTION

In the following, examples of embodiments of a detection device, an inspection device, a magnetic tape cartridge, a magnetic tape, a magnetic tape drive, a magnetic tape system, a detection method, an inspection method, and a program according to the technology of the present disclosure will be described with reference to the accompanying drawings.

First, the terms used in the following description will be described.

NVM refers to an abbreviation of "non-volatile memory". CPU refers to an abbreviation of "central processing unit". RAM refers to an abbreviation of "random access memory". EEPROM refers to an abbreviation of "electrically erasable and programmable read only memory". SSD refers to an abbreviation of "solid state drive". HDD refers to an abbreviation of "hard disk drive". ASIC refers to an abbreviation of "application specific integrated circuit". FPGA refers to an abbreviation of "field-programmable gate array". PLC is an abbreviation of "programmable logic controller". SOC refers to an abbreviation of "system-on-a-chip". IC refers to an abbreviation of "integrated circuit". RFID refers to an abbreviation of "radio frequency identifier". BOT refers to an abbreviation of "beginning of tape". EOT refers to an abbreviation of "end of tape". UI refers to an abbreviation of "user interface". WAN refers to an abbreviation of "wide area network". LAN refers to an abbreviation of "local area network". In addition, in the following description, the geometrical characteristic refers to a generally recognized geometrical characteristic, such as a length, a shape, an orientation, and/or a position.

Figure 1:
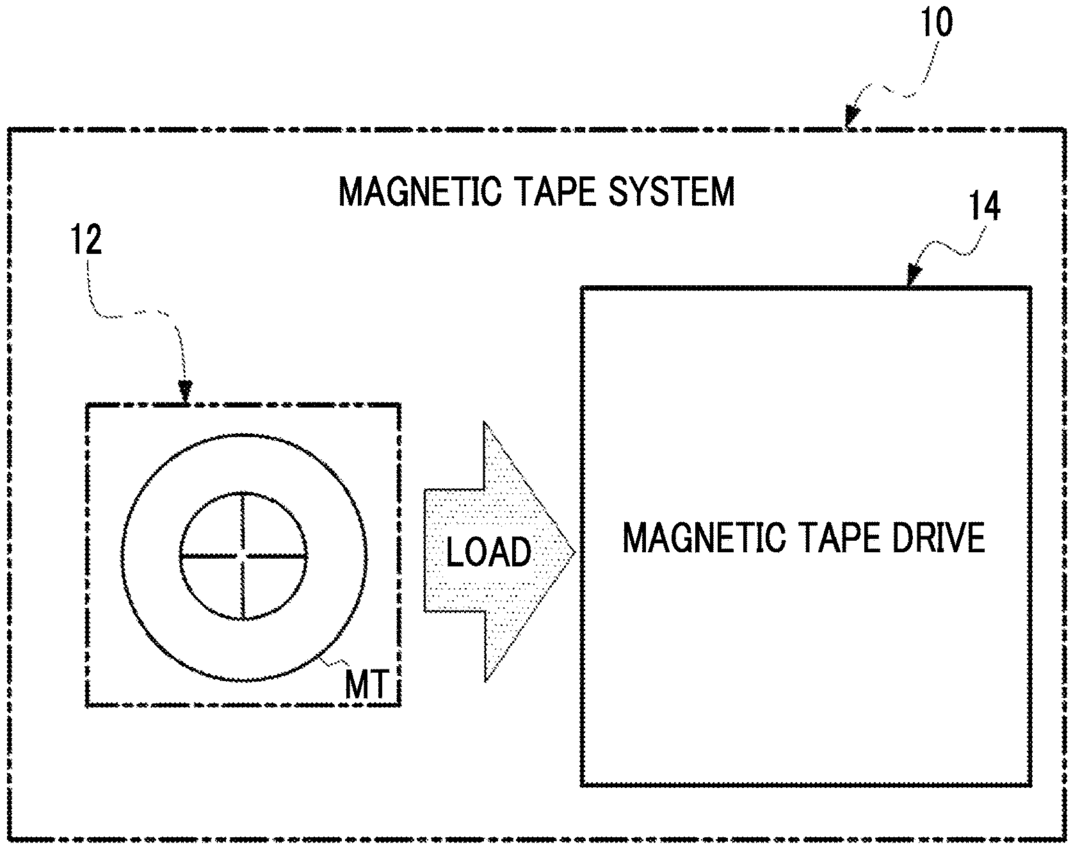
FIG. 1 is a block diagram showing an example of a configuration of a magnetic tape system according to an embodiment.

As an example, as shown in FIG. 1, a magnetic tape system 10 comprises a magnetic tape cartridge 12 and a magnetic tape drive 14. A magnetic tape cartridge 12 is loaded into the magnetic tape drive 14. The magnetic tape cartridge 12 accommodates a magnetic tape MT. The magnetic tape drive 14 pulls out the magnetic tape MT from the loaded magnetic tape cartridge 12, and records data in the magnetic tape MT and reads data from the magnetic tape MT while causing the pulled out magnetic tape MT to travel.

In the present embodiment, the magnetic tape MT is an example of a "magnetic tape" according to the technology of the present disclosure. In addition, in the present embodiment, the magnetic tape system 10 is an example of a "magnetic tape system" according to the technology of the present disclosure. In addition, in the present embodiment, the magnetic tape drive 14 is an example of a "magnetic tape drive" according to the technology of the present disclosure. In addition, in the present embodiment, the magnetic tape cartridge 12 is an example of a "cartridge" and a "magnetic tape cartridge" according to the technology of the present disclosure.

Next, an example of a configuration of the magnetic tape cartridge 12 will be described with reference to FIGS. 2 to 4. It should be noted that, in the following description, for convenience of description, in FIGS. 2 to 4, a loading direction of the magnetic tape cartridge 12 into the magnetic tape drive 14 is indicated by an arrow A, a direction of the arrow A is defined as a front direction of the magnetic tape cartridge 12, and a side of the magnetic tape cartridge 12 in the front direction is defined as a front side of the magnetic tape cartridge 12. In the following description of the structure, "front" refers to the front side of the magnetic tape cartridge 12.

In addition, in the following description, for convenience of description, in FIGS. 2 to 4, a direction of an arrow B orthogonal to the direction of the arrow A is defined as a right direction, and a side of the magnetic tape cartridge 12 in the right direction is defined as a right side of the magnetic tape cartridge 12. In the following description of the structure, "right" refers to the right side of the magnetic tape cartridge 12.

In addition, in the following description, for convenience of description, in FIGS. 2 to 4, a direction opposite to the direction of the arrow B is defined as a left direction, and a side of the magnetic tape cartridge 12 in the left direction is defined as a left side of the magnetic tape cartridge 12. In the following description of the structure, "left" refers to the left side of the magnetic tape cartridge 12.

In addition, in the following description, for convenience of description, in FIGS. 2 to 4, a direction orthogonal to the direction of the arrow A and the direction of the arrow B is indicated by an arrow C, a direction of the arrow C is defined as an upper direction of the magnetic tape cartridge 12, and a side of the magnetic tape cartridge 12 in the upper direction is defined as an upper side of the magnetic tape cartridge 12. In the following description of the structure, "upper" refers to the upper side of the magnetic tape cartridge 12.

In addition, in the following description, for convenience of description, in FIGS. 2 to 4, a direction opposite to the front direction of the magnetic tape cartridge 12 is defined as a rear direction of the magnetic tape cartridge 12, and a side of the magnetic tape cartridge 12 in the rear direction is defined as a rear side of the magnetic tape cartridge 12. In the following description of the structure, "rear" refers to the rear side of the magnetic tape cartridge 12.

In addition, in the following description, for convenience of description, in FIGS. 2 to 4, a direction opposite to the upper direction of the magnetic tape cartridge 12 is defined as a lower direction of the magnetic tape cartridge 12, and a side of the magnetic tape cartridge 12 in the lower direction is defined as a lower side of the magnetic tape cartridge 12. In the following description of the structure, "lower" refers to the lower side of the magnetic tape cartridge 12.

Figure 2:
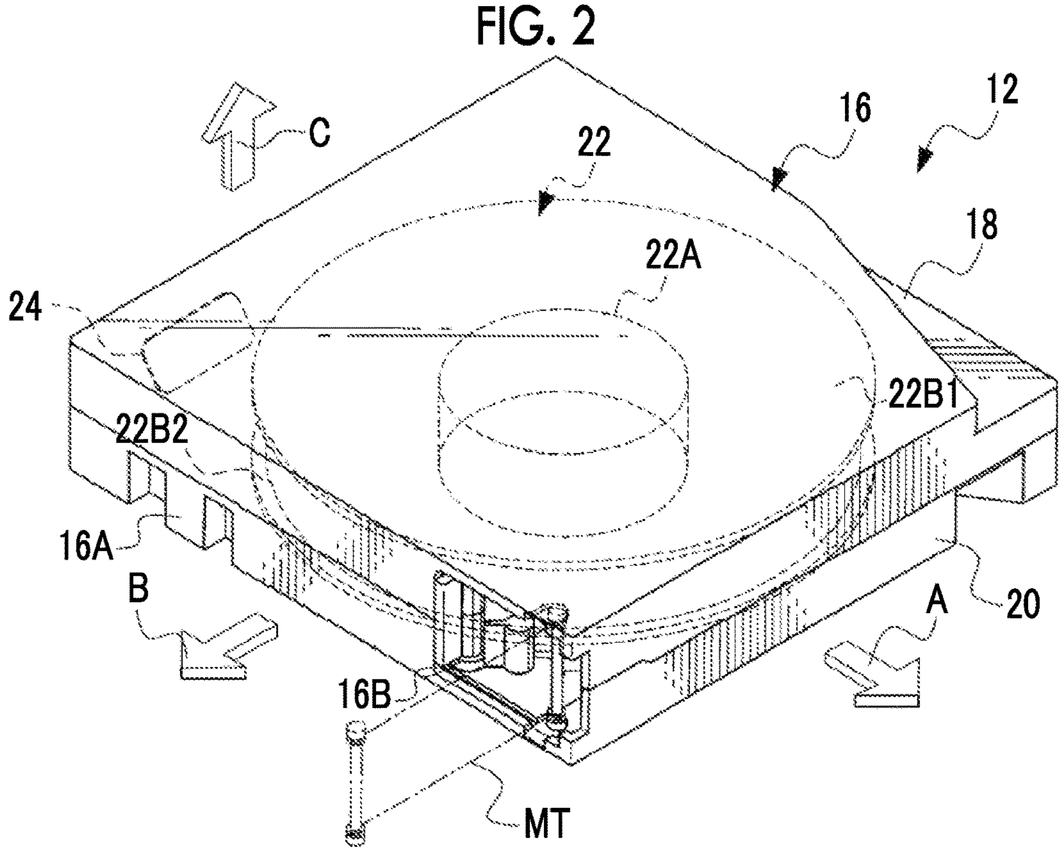
FIG. 2 is a schematic perspective view of an example of an appearance of a magnetic tape cartridge according to the embodiment.

As an example, as shown in FIG. 2, the magnetic tape cartridge 12 has a substantially rectangular shape in a plan view, and comprises a box-shaped case 16. The magnetic tape MT is accommodated in the case 16. The case 16 is made of resin, such as polycarbonate, and comprises an upper case 18 and a lower case 20. The upper case 18 and the lower case 20 are bonded by welding (for example, ultrasound welding) and screwing in a state in which a lower peripheral edge surface of the upper case 18 and an upper peripheral edge surface of the lower case 20 are brought into contact with each other. The bonding method is not limited to welding and screwing, and other bonding methods may be used.

A sending reel 22 is rotatably accommodated inside the case 16. The sending reel 22 comprises a reel hub 22A, an upper flange 22B1, and a lower flange 22B2. The reel hub 22A is formed in a cylindrical shape. The reel hub 22A is an axial center portion of the sending reel 22, has an axial center direction along an up-down direction of the case 16, and is disposed in a center portion of the case 16. Each of the upper flange 22B1 and the lower flange 22B2 is formed in an annular shape. A center portion of the upper flange 22B1 in a plan view is fixed to an upper end portion of the reel hub 22A, and a center portion of the lower flange 22B2 in a plan view is fixed to a lower end portion of the reel hub 22A. It should be noted that the reel hub 22A and the lower flange 22B2 may be integrally molded.

The magnetic tape MT is wound around an outer peripheral surface of the reel hub 22A, and an end portion of the magnetic tape MT in a width direction is held by the upper flange 22B1 and the lower flange 22B2.

An opening 16B is formed on a front side of a right wall 16A of the case 16. The magnetic tape MT is pulled out from the opening 16B.

A cartridge memory 24 is provided in the lower case 20. Specifically, the cartridge memory 24 is accommodated in a right rear end portion of the lower case 20. An IC chip including an NVM is mounted on the cartridge memory 24. In the present embodiment, a so-called passive RFID tag is adopted as the cartridge memory 24, and the read/write of various pieces of information is performed with respect to the cartridge memory 24 in a noncontact manner.

The cartridge memory 24 stores management information for managing the magnetic tape cartridge 12. Examples of the management information include information on the cartridge memory 24 (for example, information for specifying the magnetic tape cartridge 12), information on the magnetic tape MT (for example, information indicating a recording capacity of the magnetic tape MT, information indicating an outline of the data recorded in the magnetic tape MT, information indicating items of the data recorded in the magnetic tape MT, and information indicating a recording format of the data recorded in the magnetic tape MT), and information on the magnetic tape drive 14 (for example, information indicating a specification of the magnetic tape drive 14 and a signal used in the magnetic tape drive 14). It should be noted that the cartridge memory 24 is an example of a "noncontact storage medium", and a "memory" according to the technology of the present disclosure.

Figure 3:
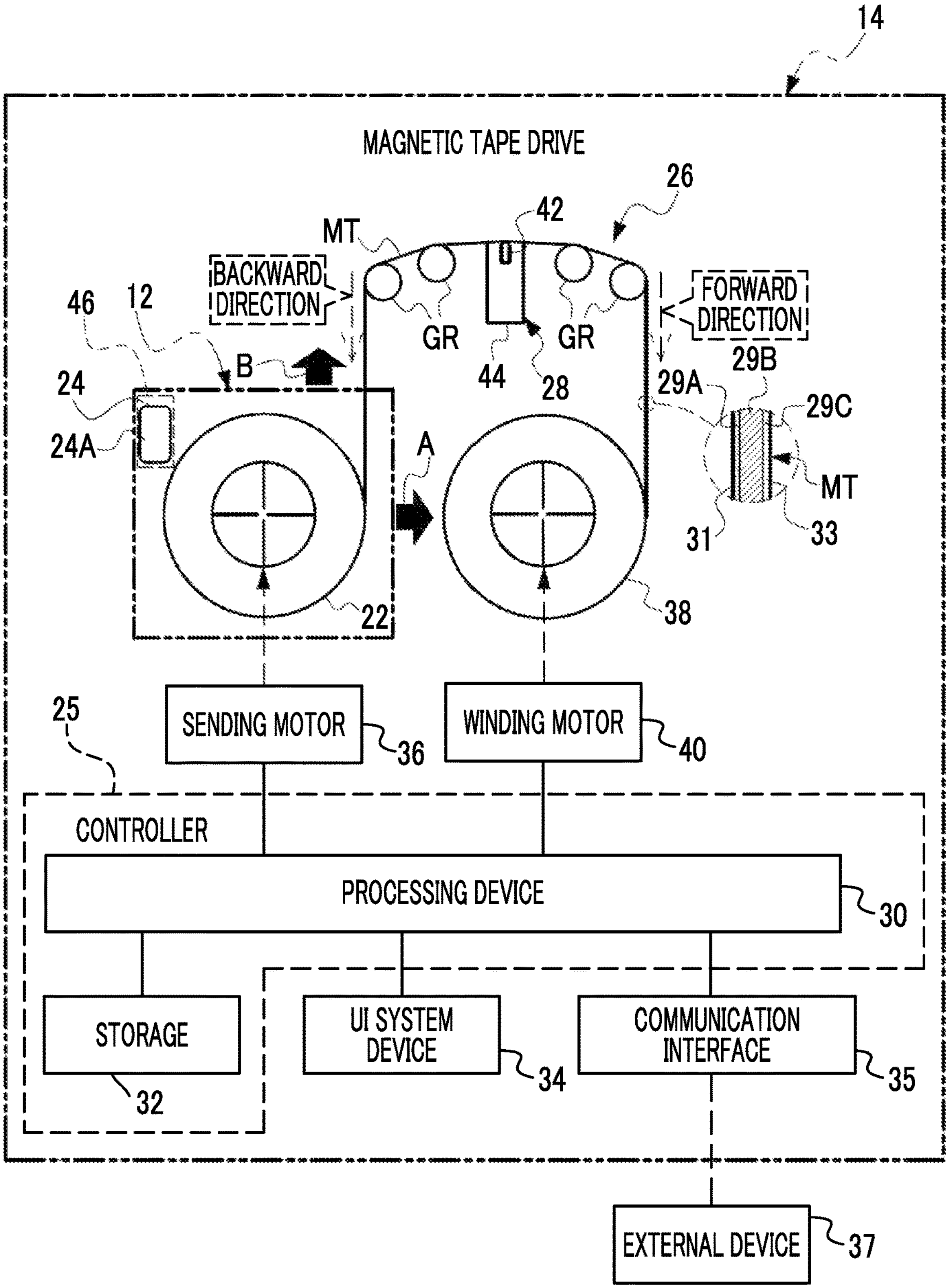
FIG. 3 is a schematic configuration diagram showing an example of a hardware configuration of a magnetic tape drive according to the embodiment.

As an example, as shown in FIG. 3, the magnetic tape drive 14 comprises a controller 25, a transport device 26, a magnetic head 28, a UI system device 34, and a communication interface 35. The controller 25 is an example of a "detection device" according to the technology of the present disclosure, and comprises a processing device 30 and a storage 32. The processing device 30 is an example of a "processing device" according to the technology of the present disclosure, and the storage 32 is an example of a "storage medium" according to the technology of the present disclosure.

The magnetic tape drive 14 is loaded into the magnetic tape cartridge 12 along the direction of the arrow A. In the magnetic tape drive 14, the magnetic tape MT is pulled out from the magnetic tape cartridge 12 and used.

The magnetic tape MT has a magnetic layer 29A, a base film 29B, and a back coating layer 29C. The magnetic layer 29A is formed on one surface side of the base film 29B, and the back coating layer 29C is formed on the other surface side of the base film 29B. The data is recorded in the magnetic layer 29A. The magnetic layer 29A contains ferromagnetic powder. As the ferromagnetic powder, for example, ferromagnetic powder generally used in the magnetic layer of various magnetic recording media is used. Preferable specific examples of the ferromagnetic powder include hexagonal ferrite powder. Examples of the hexagonal ferrite powder include hexagonal strontium ferrite powder and hexagonal barium ferrite powder. The back coating layer 29C is a layer containing non-magnetic powder, such as carbon black. The base film 29B is also referred to as a support, and is made of, for example, polyethylene terephthalate, polyethylene naphthalate, or polyamide. It should be noted that a non-magnetic layer may be formed between the base film 29B and the magnetic layer 29A. In the magnetic tape MT, a surface on which the magnetic layer 29A is formed is a front surface 31 of the magnetic tape MT, and a surface on which the back coating layer 29C is formed is a back surface 33 of the magnetic tape MT.

The magnetic tape drive 14 performs magnetic processing on the front surface 31 of the magnetic tape MT by using the magnetic head 28. Here, the magnetic processing refers to recording the data in the front surface 31 of the magnetic tape MT and reading the data (that is, reproducing the data) from the front surface 31 of the magnetic tape MT. In the present embodiment, the magnetic tape drive 14 selectively records the data in the front surface 31 of the magnetic tape MT and reads the data from the front surface 31 of the magnetic tape MT by using the magnetic head 28. That is, the magnetic tape drive 14 pulls out the magnetic tape MT from the magnetic tape cartridge 12, records the data in the front surface 31 of the pulled out magnetic tape MT by using the magnetic head 28, or reads the data from the front surface 31 of the pulled out magnetic tape MT by using the magnetic head 28.

The processing device 30 controls the entire magnetic tape drive 14. In the present embodiment, although the processing device 30 is realized by an ASIC, the technology of the present disclosure is not limited to this. For example, the processing device 30 may be realized by an FPGA and/or a PLC. In addition, the processing device 30 may be realized by the computer including a CPU, a flash memory (for example, an EEPROM and/or an SSD), and a RAM. In addition, the processing device 30 may be realized by combining two or more of an ASIC, an FPGA, a PLC, and a computer. That is, the processing device 30 may be realized by a combination of a hardware configuration and a software configuration.

The storage 32 is connected to the processing device 30, and the processing device 30 writes various pieces of information to the storage 32 and reads out various pieces of information from the storage 32. Examples of the storage 32 include a flash memory and/or an HDD. The flash memory and the HDD are merely examples, and any memory may be used as long as the memory is a non-volatile memory that can be mounted on the magnetic tape drive 14.

The UI system device 34 is a device having the reception function of receiving a command signal indicating a command from a user and the presentation function of presenting the information to the user. The reception function is realized by a touch panel, a hard key (for example, a keyboard), and/or a mouse, for example. The presentation function is realized by a display, a printer, and/or a speaker, for example. The UI system device 34 is connected to the processing device 30. The processing device 30 acquires the command signal received by the UI system device 34. The UI system device 34 presents various pieces of information to the user under the control of the processing device 30.

The communication interface 35 is connected to the processing device 30. In addition, the communication interface 35 is connected to an external device 37 via a communication network (not shown), such as a WAN and/or a LAN. The communication interface 35 controls the exchange of various pieces of information (for example, the data to be recorded in the magnetic tape MT, the data read from the magnetic tape MT, and/or a command signal given to the processing device 30) between the processing device 30 and the external device 37. It should be noted that examples of the external device 37 include a personal computer and a mainframe.

The transport device 26 is a device that selectively transports the magnetic tape MT along a predetermined path in a forward direction and a backward direction, and comprises a sending motor 36, a winding reel 38, a winding motor 40, and a plurality of guide rollers GR. It should be noted that, here, the forward direction refers to a sending direction of the magnetic tape MT, and the backward direction refers to a rewinding direction of the magnetic tape MT.

The sending motor 36 rotates the sending reel 22 in the magnetic tape cartridge 12 under the control of the processing device 30. The processing device 30 controls the sending motor 36 to control a rotation direction, a rotation speed, a rotation torque, and the like of the sending reel 22.

The winding motor 40 rotates the winding reel 38 under the control of the processing device 30. The processing device 30 controls the winding motor 40 to control a rotation direction, a rotation speed, a rotation torque, and the like of the winding reel 38.

In a case in which the magnetic tape MT is wound by the winding reel 38, the processing device 30 rotates the sending motor 36 and the winding motor 40 such that the magnetic tape MT travels along the predetermined path in the forward direction. The rotation speed, the rotation torque, and the like of the sending motor 36 and the winding motor 40 are adjusted in accordance with a speed at which the magnetic tape MT is wound around the winding reel 38. In addition, by adjusting the rotation speed, the rotation torque, and the like of each of the sending motor 36 and the winding motor 40 by the processing device 30, the tension is applied to the magnetic tape MT. In addition, the tension applied to the magnetic tape MT is controlled by adjusting the rotation speed, the rotation torque, and the like of each of the sending motor 36 and the winding motor 40 by the processing device 30.

It should be noted that, in a case in which the magnetic tape MT is rewound to the sending reel 22, the processing device 30 rotates the sending motor 36 and the winding motor 40 such that the magnetic tape MT travels along the predetermined path in the backward direction.

In the present embodiment, the tension applied to the magnetic tape MT is controlled by controlling the rotation speed, the rotation torque, and the like of the sending motor 36 and the winding motor 40, but the technology of the present disclosure is not limited to this. For example, the tension applied to the magnetic tape MT may be controlled by using a dancer roller, or may be controlled by drawing the magnetic tape MT into a vacuum chamber.

Each of the plurality of guide rollers GR is a roller which guides the magnetic tape MT. The predetermined path, that is, a traveling path of the magnetic tape MT is determined by separately disposing the plurality of guide rollers GR at positions across the magnetic head 28 between the magnetic tape cartridge 12 and the winding reel 38.

The magnetic head 28 comprises a magnetic element unit 42 and a holder 44. The magnetic element unit 42 is held by the holder 44 to come into contact with the traveling magnetic tape MT. The magnetic element unit 42 includes a plurality of magnetic elements.

The magnetic element unit 42 records the data in the magnetic tape MT transported by the transport device 26, and reads the data from the magnetic tape MT transported by the transport device 26. Here, the data refers to, for example, a servo pattern 52 (see FIG. 6) and the data other than the servo pattern 52, that is, the data recorded in a data band DB (see FIG. 6).

The magnetic tape drive 14 comprises a noncontact read/write device 46. The noncontact read/write device 46 is disposed to face a back surface 24A of the cartridge memory 24 on the lower side of the magnetic tape cartridge 12 in a state in which the magnetic tape cartridge 12 is loaded, and performs the read/write of the information with respect to the cartridge memory 24 in a noncontact manner.

Figure 4:
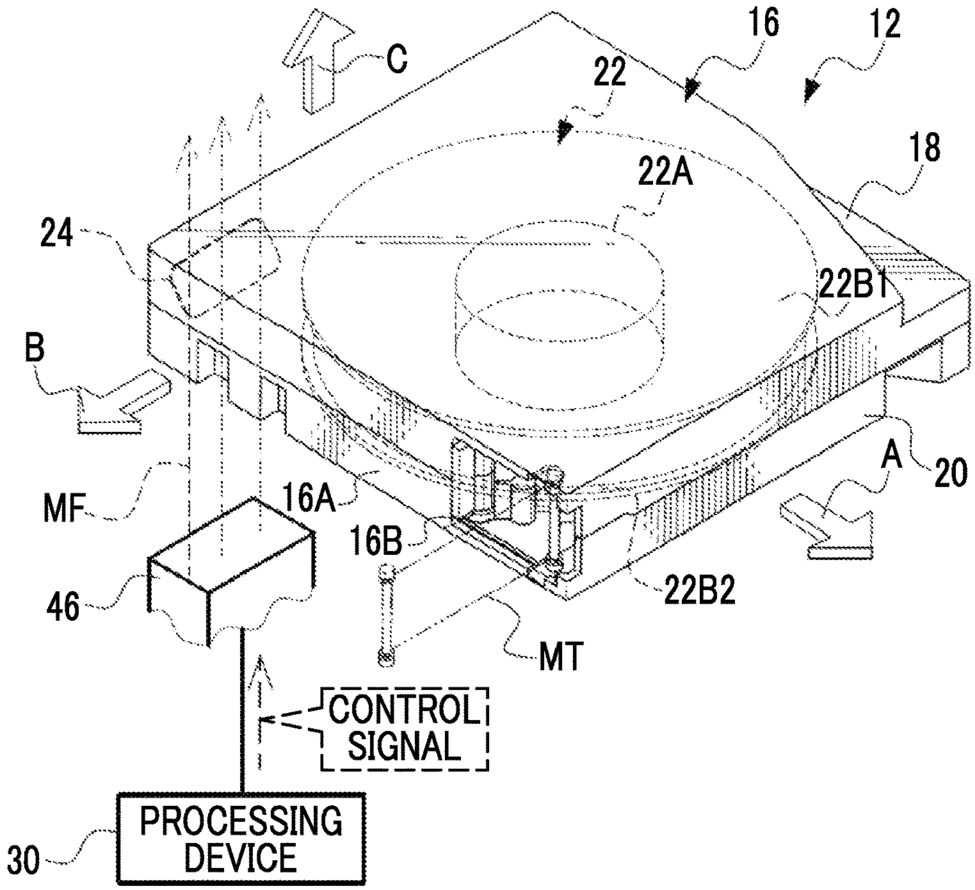
FIG. 4 is a schematic perspective view showing an example of an aspect in which a magnetic field is released by a noncontact read/write device from a lower side of the magnetic tape cartridge according to the embodiment.

As an example, as shown in FIG. 4, the noncontact read/write device 46 releases a magnetic field MF from the lower side of the magnetic tape cartridge 12 toward the cartridge memory 24. The magnetic field MF passes through the cartridge memory 24.

The noncontact read/write device 46 is connected to the processing device 30. The processing device 30 outputs a control signal to the noncontact read/write device 46. The control signal is a signal for controlling the cartridge memory 24. The noncontact read/write device 46 generates the magnetic field MF in response to the control signal input from the processing device 30, and releases the generated magnetic field MF toward the cartridge memory 24.

The noncontact read/write device 46 performs noncontact communication with the cartridge memory 24 via the magnetic field MF to perform processing on the cartridge memory 24 in response to the control signal. For example, the noncontact read/write device 46 selectively performs, under the control of the processing device 30, processing of reading the information from the cartridge memory 24 and processing of storing the information in the cartridge memory 24 (that is, processing of writing the information to the cartridge memory 24). In other words, the processing device 30 reads the information from the cartridge memory 24 and stores the information in the cartridge memory 24 by performing communication with the cartridge memory 24 via the noncontact read/write device 46 in a noncontact manner.

Figure 5:
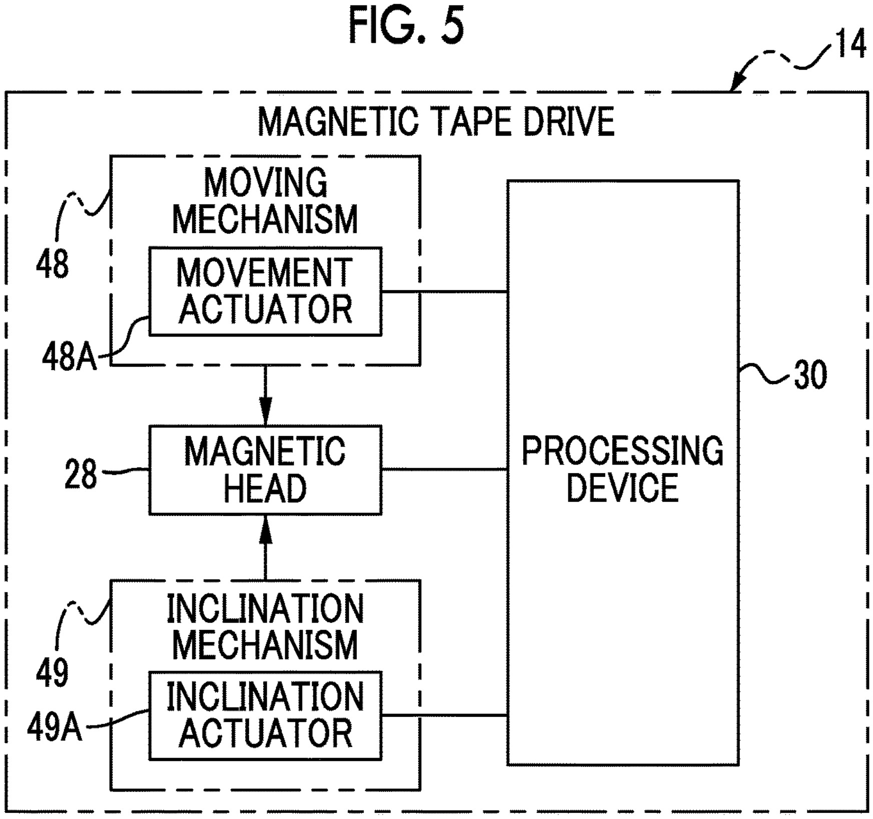
FIG. 5 is a schematic configuration diagram showing an example of the hardware configuration of the magnetic tape drive according to the embodiment.

As an example, as shown in FIG. 5, the magnetic tape drive 14 comprises a moving mechanism 48. The moving mechanism 48 includes a movement actuator 48A. Examples of the movement actuator 48A include a voice coil motor and/or a piezo actuator. The movement actuator 48A is connected to the processing device 30, and the processing device 30 controls the movement actuator 48A. The movement actuator 48A generates power under the control of the processing device 30. The moving mechanism 48 moves the magnetic head 28 in the width direction of the magnetic tape MT by receiving the power generated by the movement actuator 48A.

The magnetic tape drive 14 comprises an inclination mechanism 49. The inclination mechanism 49 includes an inclination actuator 49A. Examples of the inclination actuator 49A include a voice coil motor and/or a piezo actuator. The inclination actuator 49A is connected to the processing device 30, and the processing device 30 controls the inclination actuator 49A. The inclination actuator 49A generates power under the control of the processing device 30. The inclination mechanism 49 inclines the magnetic head 28 to a longitudinal direction LD side of the magnetic tape MT with respect to a width direction WD of the magnetic tape MT by receiving the power generated by the inclination actuator 49A (see FIG. 8). That is, the magnetic head 28 is skewed on the magnetic tape MT under the control of the processing device 30.

Figure 6:
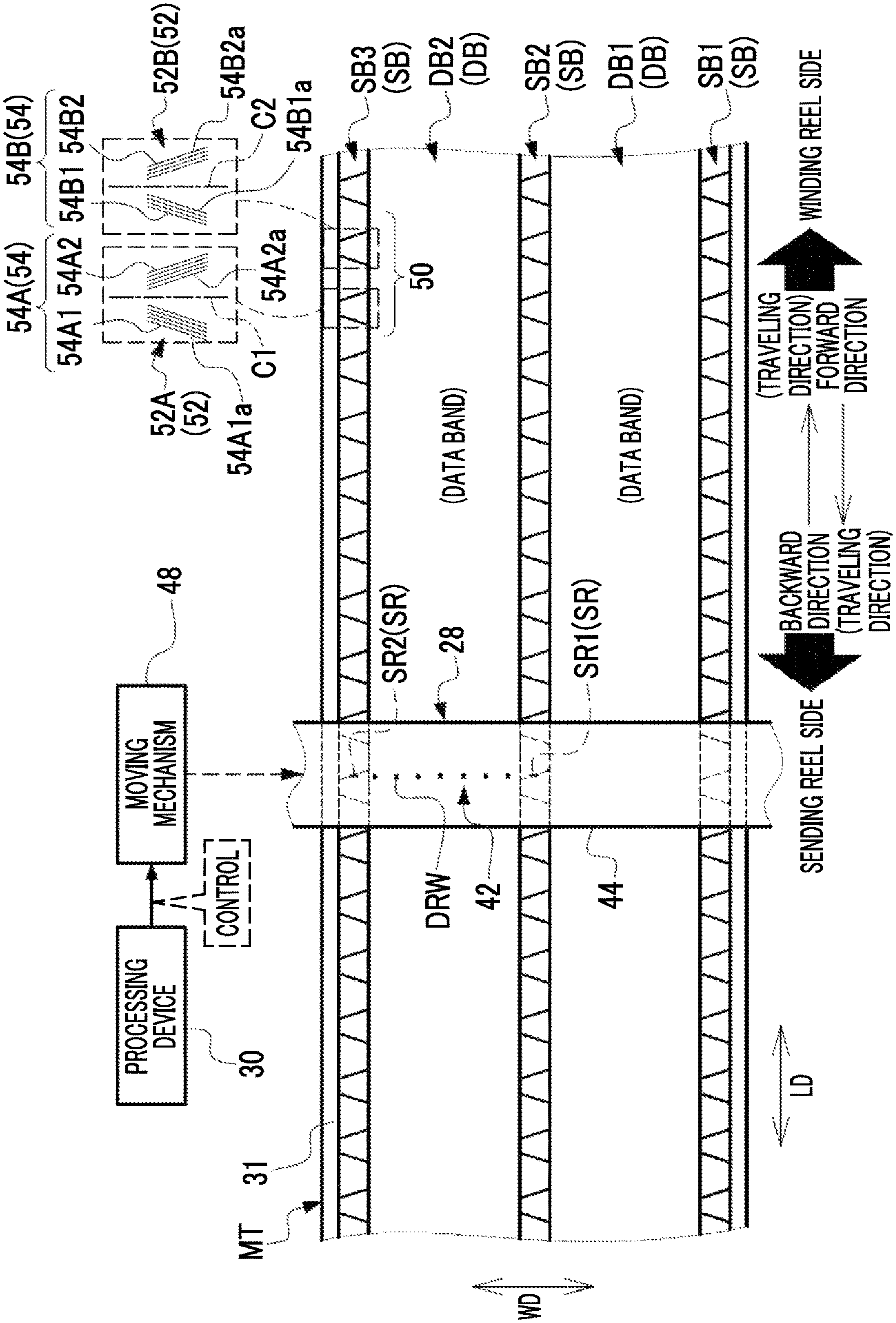
FIG. 6 is a conceptual diagram showing an example of an aspect in which a state in which a magnetic head is disposed on a magnetic tape according to the embodiment is observed from a front surface side of the magnetic tape.

As an example, as shown in FIG. 6, on the front surface 31 of the magnetic tape MT, servo bands SB1, SB2, and SB3 are data bands DB1 and DB2 are formed. It should be noted that, in the following, for convenience of description, in a case in which the distinction is not specifically needed, the servo bands SB1 to SB3 are referred to as a servo band SB, and the data bands DB1 and DB2 are referred to as the data band DB.

The servo bands SB1 to SB3 and the data bands DB1 and DB2 are formed along the longitudinal direction LD (that is, a total length direction) of the magnetic tape MT. Here, the total length direction of the magnetic tape MT refers to the traveling direction of the magnetic tape MT, in other words. The traveling direction of the magnetic tape MT is defined in two directions of the forward direction which is a direction in which the magnetic tape MT travels from the sending reel 22 side to the winding reel 38 side (hereinafter, also simply referred to as "forward direction"), and the backward direction which is a direction in which the magnetic tape MT travels from the winding reel 38 side to the sending reel 22 side (hereinafter, also simply referred to as "backward direction").

The servo bands SB1 to SB3 are arranged at positions spaced in the width direction WD of the magnetic tape MT (hereinafter, also simply referred to as "width direction WD"). For example, the servo bands SB1 to SB3 are arranged at equal intervals along the width direction WD. It should be noted that, in the present embodiment, "equal interval" refers to the equal interval in the sense of including an error generally allowed in the technical field to which the technology of the present disclosure belongs, that is the error to the extent that it does not contradict the purpose of the technology of the present disclosure, in addition to the exact equal interval.

The data band DB1 is disposed between the servo band SB1 and the servo band SB2, and the data band DB2 is disposed between a servo band SB2 and a servo band SB3. That is, the servo bands SB and the data bands DB are arranged alternately along the width direction WD.

It should be noted that, in the example shown in FIG. 6, for convenience of description, three servo bands SB and two data bands DB are shown, but these are merely examples, and two servo bands SB and one data band DB may be used, and the technology of the present disclosure is established even in a case in which four or more servo bands SB and three or more data bands DB are used.

A plurality of servo patterns 52 are recorded in the servo band SB along the longitudinal direction LD of the magnetic tape MT. The servo patterns 52 are classified into a servo pattern 52A and a servo pattern 52B. The plurality of servo patterns 52 are disposed at regular intervals along the longitudinal direction LD of the magnetic tape MT. It should be noted that, in the present embodiment, "regular" refers to the regularity in the sense of including an error generally allowed in the technical field to which the technology of the present disclosure belongs, which is the error to the extent that it does not contradict the purpose of the technology of the present disclosure, in addition to the exact regularity.

The servo band SB is divided by a plurality of frames 50 along the longitudinal direction LD of the magnetic tape MT. The frame 50 is defined by one set of servo patterns 52. In the example shown in FIG. 6, the servo patterns 52A and 52B are shown as an example of the set of servo patterns 52. The servo patterns 52A and 52B are adjacent to each other along the longitudinal direction LD of the magnetic tape MT, and the servo pattern 52A is positioned on the upstream side in the forward direction in the frame 50, and the servo pattern 52B is positioned on the downstream side in the forward direction.

The servo pattern 52 consists of a linear magnetization region pair 54. The linear magnetization region pair 54 is an example of a "first linear magnetization region pair" and a "second linear magnetization region pair" according to the technology of the present disclosure. The linear magnetization region pair 54 is classified into a linear magnetization region pair 54A and a linear magnetization region pair 54B.

The servo pattern 52A consists of the linear magnetization region pair 54A. In the example shown in FIG. 6, a pair of linear magnetization regions 54A1 and 54A2 is shown as an example of the linear magnetization region pair 54A. Each of the linear magnetization regions 54A1 and 54A2 is a linearly magnetized region. The linear magnetization region 54A1 is an example of a "first linear magnetization region" and a "third linear magnetization region" according to the technology of the present disclosure, and the linear magnetization region 54A2 is a "second linear magnetization region" and a "fourth linear magnetization region" according to the technology of the present disclosure.

The linear magnetization regions 54A1 and 54A2 are inclined in opposite directions with respect to an imaginary straight line C1 which is an imaginary straight line along the width direction WD. In the example shown in FIG. 6, the linear magnetization regions 54A1 and 54A2 are inclined line-symmetrically with respect to the imaginary straight line C1. More specifically, the linear magnetization regions 54A1 and 54A2 are formed in a state of being not parallel to each other and being inclined at a predetermined angle (for example, 5 degrees) in opposite directions on the longitudinal direction LD side of the magnetic tape MT with the imaginary straight line C1 as the symmetry axis.

The linear magnetization region 54A1 is a set of magnetization straight lines 54A1*a*, which are five magnetized straight lines. The linear magnetization region 54A2 is a set of magnetization straight lines 54A2*a*, which are five magnetized straight lines.

The servo pattern 52B consists of the linear magnetization region pair 54B. In the example shown in FIG. 6, a pair of linear magnetization regions 54B1 and 54B2 is shown as an example of the linear magnetization region pair 54B. Each of the linear magnetization regions 54B1 and 54B2 is a linearly magnetized region. The linear magnetization region 54B1 is an example of a "first linear magnetization region" and a "third linear magnetization region" according to the technology of the present disclosure, and the linear magnetization region 54B2 is a "second linear magnetization region" and a "fourth linear magnetization region" according to the technology of the present disclosure.

The linear magnetization regions 54B1 and 54B2 are inclined in opposite directions with respect to an imaginary straight line C2 which is an imaginary straight line along the width direction WD. In the example shown in FIG. 6, the linear magnetization regions 54B1 and 54B2 are inclined line-symmetrically with respect to the imaginary straight line C2. More specifically, the linear magnetization regions 54B1 and 54B2 are formed in a state of being not parallel to each other and being inclined at a predetermined angle (for example, 5 degrees) in opposite directions on the longitudinal direction LD side of the magnetic tape MT with the imaginary straight line C2 as the symmetry axis.

The linear magnetization region 54B1 is a set of magnetization straight lines 54B1*a*, which are four magnetized straight lines. The linear magnetization region 54B2 is a set of magnetization straight lines 54B2*a*, which are four magnetized straight lines.

The magnetic head 28 is disposed on the front surface 31 side of the magnetic tape MT configured as described above. The holder 44 is formed in a rectangular parallelepiped shape, and is disposed to cross the front surface 31 of the magnetic tape MT along the width direction WD. The plurality of magnetic elements of the magnetic element unit 42 are arranged in a straight line along the longitudinal direction of the holder 44. The magnetic element unit 42 has a pair of servo reading elements SR and a plurality of data read/write elements DRW as the plurality of magnetic elements. A length of the holder 44 in the longitudinal direction is sufficiently long with respect to the width of the magnetic tape MT. For example, the length of the holder 44 in the longitudinal direction is set to a length exceeding the width of the magnetic tape MT even in a case in which the magnetic element unit 42 is disposed at any position on the magnetic tape MT.

The pair of servo reading elements SR are mounted on the magnetic head 28. In the magnetic head 28, a relative positional relationship between the holder 44 and the pair of servo reading elements SR is fixed. The pair of servo reading elements SR consists of servo reading elements SR1 and SR2. The servo reading element SR1 is disposed at one end of the magnetic element unit 42, and the servo reading element SR2 is disposed at the other end of the magnetic element unit 42. In the example shown in FIG. 6, the servo reading element SR1 is provided at a position corresponding to the servo band SB2, and the servo reading element SR2 is provided at a position corresponding to the servo band SB3.

The plurality of data read/write elements DRW are disposed in a straight line between the servo reading element SR1 and the servo reading element SR2. The plurality of data read/write elements DRW are disposed at intervals along the longitudinal direction of the magnetic head 28 (for example, are disposed at equal intervals along the longitudinal direction of the magnetic head 28). In the example shown in FIG. 6, the plurality of data read/write elements DRW are provided at positions corresponding to the data band DB2.

The processing device 30 acquires a servo pattern signal which is a result of reading the servo pattern 52 by the servo reading element SR, and performs a servo control in response to the acquired servo pattern signal. Here, the servo control refers to a control of moving the magnetic head 28 in the width direction WD of the magnetic tape MT by operating the moving mechanism 48 in accordance with the servo pattern 52 read by the servo reading element SR.

By performing the servo control, the plurality of data read/write elements DRW are positioned on a designated region in the data band DB, and perform the magnetic processing on the designated region in the data band DB. In the example shown in FIG. 6, the plurality of data read/write elements DRW perform the magnetic processing on the designated region in the data band DB2.

In addition, in a case in which the data band DB of which the data is to be read by the magnetic element unit 42 is changed (in the example shown in FIG. 6, the data band DB of which the data is to be read by the magnetic element unit 42 is changed from the data band DB2 to the data band DB1), the moving mechanism 48 moves, under the control of the processing device 30, the magnetic head 28 in the width direction WD to change the position of the pair of servo reading elements SR. That is, by moving the magnetic head 28 in the width direction WD, the moving mechanism 48 moves the servo reading element SR1 to a position corresponding to the servo band SB1 and moves the servo reading element SR2 to the position corresponding to the servo band SB2. As a result, the positions of the plurality of data read/write elements DRW are changed from the data band DB2 to the data band DB1, and the plurality of data read/write elements DRW perform the magnetic processing on the data band DB1.

By the way, in recent years, research on a technology of reducing the influence of transverse dimensional stability (TDS) has been advanced. It has been known that the TDS is affected by a temperature, humidity, a pressure at which the magnetic tape is wound around the reel, temporal deterioration, or the like, the TDS is increased in a case in which no measures are taken, and off-track (that is, misregistration of the data read/write element DRW with respect to the track in the data band DB) occurs in a scene in which the magnetic processing is performed on the data band DB.

Figure 7:
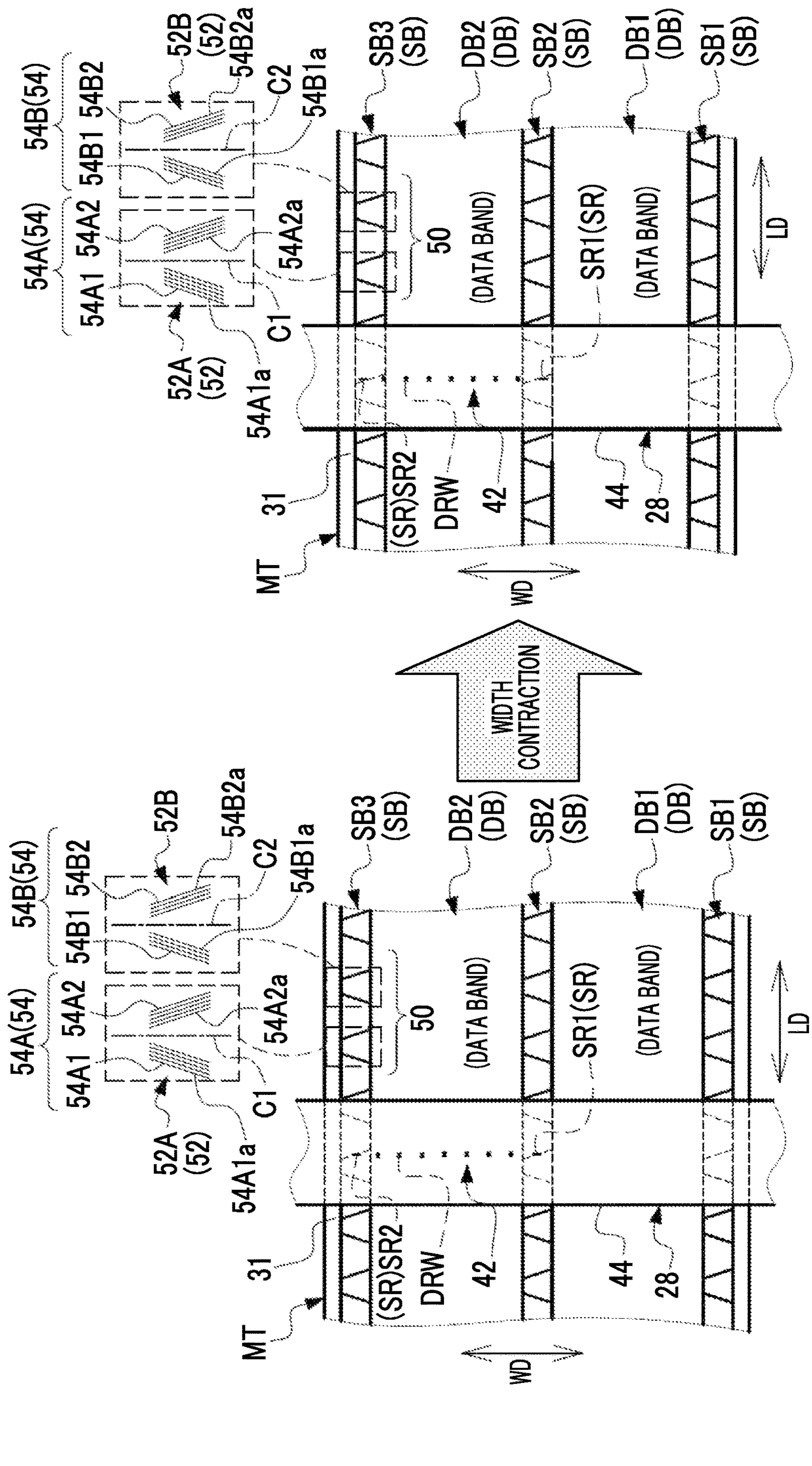
FIG. 7 is a conceptual diagram showing an example of an aspect in which the magnetic tape according to the embodiment before and after a width of the magnetic tape contracts is observed from the front surface side of the magnetic tape.

In the example shown in FIG. 7, an aspect is shown in which the width of the magnetic tape MT contracts with the elapse of time. In this case, the off-track occurs. In some cases, the width of the magnetic tape MT expands, and the off-track occurs in this case as well. That is, in a case in which the width of the magnetic tape MT contracts or expands with the elapse of time, the position of the servo reading element SR with respect to the servo pattern 52 diverges from a predetermined position (for example, the center position of each of the linear magnetization regions 54A1, 54A2, 54B1, and 54B2) determined by design in the width direction WD. In a case in which the position of the servo reading element SR with respect to the servo pattern 52 diverges from the predetermined position determined by the design in the width direction WD, the accuracy of the servo control is deteriorated, and the position of the track in the data band DB and the position of the data read/write element DRW deviate from each other. Then, an originally planned track will not be subjected to the magnetic processing.

Figure 8:
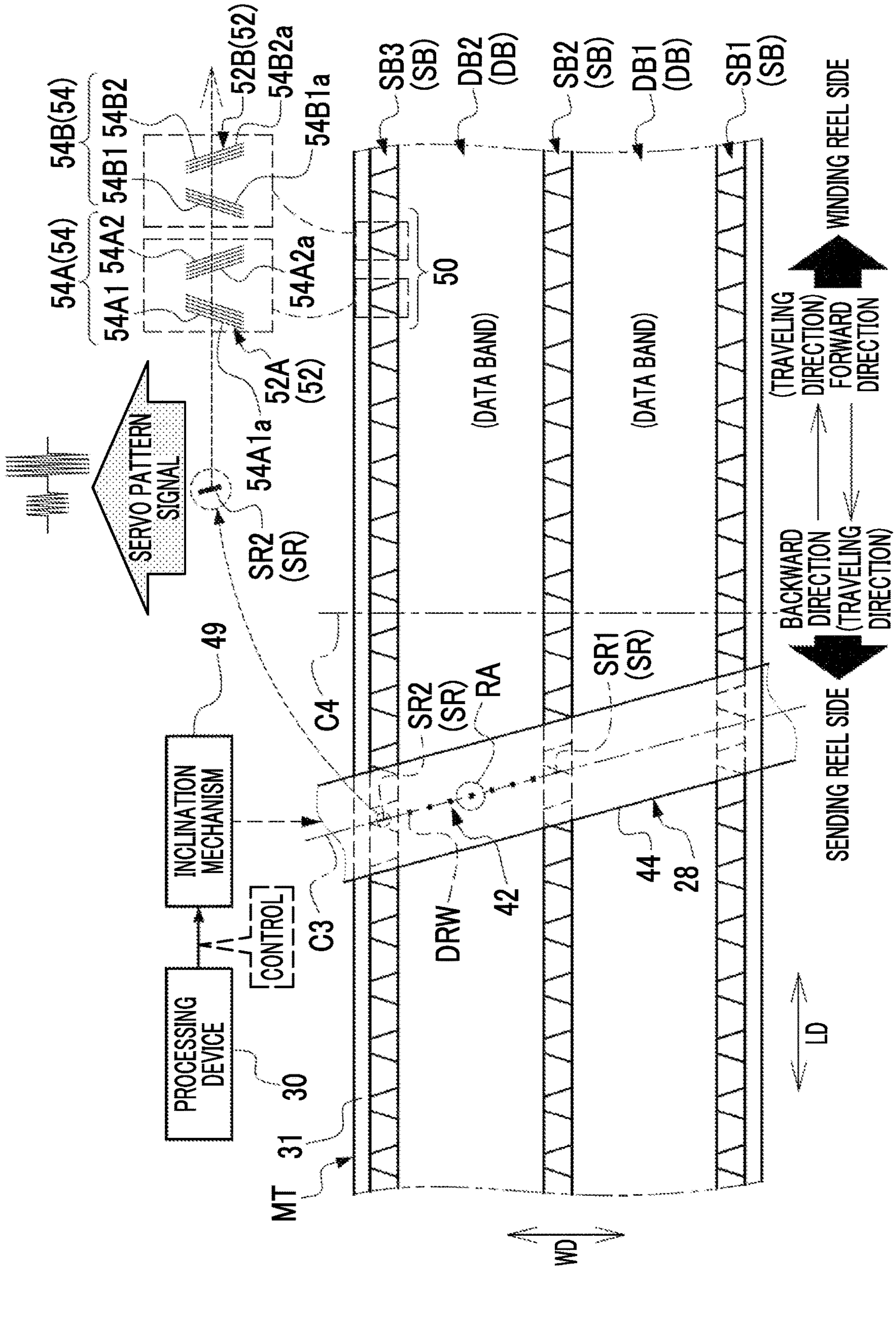
FIG. 8 is a conceptual diagram showing an example of an aspect in which a state in which the magnetic head is skewed on the magnetic tape according to the embodiment is observed from the front surface side of the magnetic tape.

As a method of reducing the influence of the TDS, as shown in FIG. 8 as an example, a method of holding the position of the servo reading element SR with respect to the servo pattern 52 at the predetermined position determined by design by skewing the magnetic head 28 on the magnetic tape MT is known.

The magnetic head 28 comprises a rotation axis RA. The rotation axis RA is provided at a position corresponding to a center portion of the magnetic element unit 42 provided in the magnetic head 28 in a plan view. The magnetic head 28 is rotatably held by the inclination mechanism 49 via the rotation axis RA. An imaginary straight line C3 which is an imaginary center line is provided in the magnetic head 28. The imaginary straight line C3 is a straight line that passes through the rotation axis RA and extends in the longitudinal direction of the magnetic head 28 in a plan view (that is, the direction in which the plurality of data read/write elements DRW are arranged). The magnetic head 28 is held by the inclination mechanism 49 to have a posture in which the imaginary straight line C3 is inclined to the longitudinal direction LD side of the magnetic tape MT with respect to an imaginary straight line C4 which is an imaginary straight line along the width direction WD. In the example shown in FIG. 8, the magnetic head 28 is held by the inclination mechanism 49 in a posture in which the imaginary straight line C3 is inclined toward the sending reel 22 side with respect to the imaginary straight line C4 (that is, a posture inclined counterclockwise as viewed from a paper surface side of FIG. 8). It should be noted that, in the following, the angle formed by the imaginary straight line C3 and the imaginary straight line C4 is also referred to as a "skew angle". The skew angle is an angle defined such that the counterclockwise direction as viewed from the paper surface side of FIG. 8 is positive, and the clockwise direction as viewed from the paper surface side of FIG. 8 is negative.

The inclination mechanism 49 receives the power from the inclination actuator 49A (see FIG. 5) to rotate the magnetic head 28 around the rotation axis RA on the front surface 31 of the magnetic tape MT. The inclination mechanism 49 rotates, under the control of the processing device 30, the magnetic head 28 around the rotation axis RA on the front surface 31 of the magnetic tape MT to change the direction of the inclination of the imaginary straight line C3 with respect to the imaginary straight line C4 (that is, azimuth) and the inclined angle.

By changing the direction of the inclination of the imaginary straight line C3 with respect to the imaginary straight line C4 and the inclined angle in accordance with the temperature, the humidity, the pressure at which the magnetic tape MT is wound around the reel, the temporal deterioration, and the like, or expansion and contraction of the magnetic tape MT in the width direction WD due to these, the position of the servo reading element SR with respect to the servo pattern 52 is held at the predetermined position determined in design.

By the way, the servo reading element SR is formed in a straight line along the imaginary straight line C3. Therefore, in a case in which the servo pattern 52A is read by the servo reading element SR, in the linear magnetization region pair 54A, an angle formed by the linear magnetization region 54A1 and the servo reading element SR and an angle formed by the linear magnetization region 54A2 and the servo reading element SR are different. In a case in which the angles are different in this way, a variation due to an azimuth loss (for example, variation in signal level and waveform distortion) occurs between the servo pattern signal derived from the linear magnetization region 54A1 (that is, the servo pattern signal obtained by reading the linear magnetization region 54A1 by the servo reading element SR) and the servo pattern signal derived from the linear magnetization region 54A2 (that is, the servo pattern signal obtained by reading the linear magnetization region 54A2 by the servo reading element SR). In the example shown in FIG. 8, since the angle formed by the servo reading element SR and the linear magnetization region 54A1 is larger than the angle formed by the servo reading element SR and the linear magnetization region 54A2, the output of the servo pattern signal is small, and the waveform also spreads, so that the variation occurs in the servo pattern signal obtained by reading the servo reading element SR across the servo band SB in a state in which the magnetic tape MT travels. In addition, also in a case in which the servo pattern 52B is read by the servo reading element SR, the variation due to the azimuth loss occurs between the servo pattern signal derived from the linear magnetization region 54B1 and the servo pattern signal derived from the linear magnetization region 54B2. Such a variation in the servo pattern signal can contribute to a decrease in the accuracy of the servo control.

As a method of detecting the servo pattern signal, a method of detecting the servo pattern signal by using an autocorrelation coefficient can be considered. In this method, an ideal waveform signal indicating an ideal waveform and a servo band signal (that is, a signal indicating a result of reading the servo band SB by the servo reading element) are compared. The ideal waveform signal to be compared with the servo band signal is prepared in advance. However, the ideal waveform signal to be compared with the servo band signal differs depending on a type of the magnetic tape (for example, an inclination of the servo pattern 52 mainly) and/or an inclination of the magnetic head 28. In addition, in a case in which a temporal change of the magnetic tape MT and/or the inclination (that is, the skew angle) of the magnetic head 28 deviates from an assumed range, a waveform of the ideal waveform signal prepared in advance and a waveform of the actual servo pattern signal are separated from each other, and thus it is difficult to detect the servo pattern signal with high accuracy.

Therefore, in view of such circumstances, in the processing device 30 (see FIGS. 3 and 9) of the controller 25 (see FIG. 3) of the magnetic tape drive 14 according to the present embodiment, servo pattern detection processing (see FIG. 15) and ideal waveform signal acquisition processing (see FIG. 16) are performed. In the following, the servo pattern detection processing and the ideal waveform signal acquisition processing will be specifically described.

Figure 9:
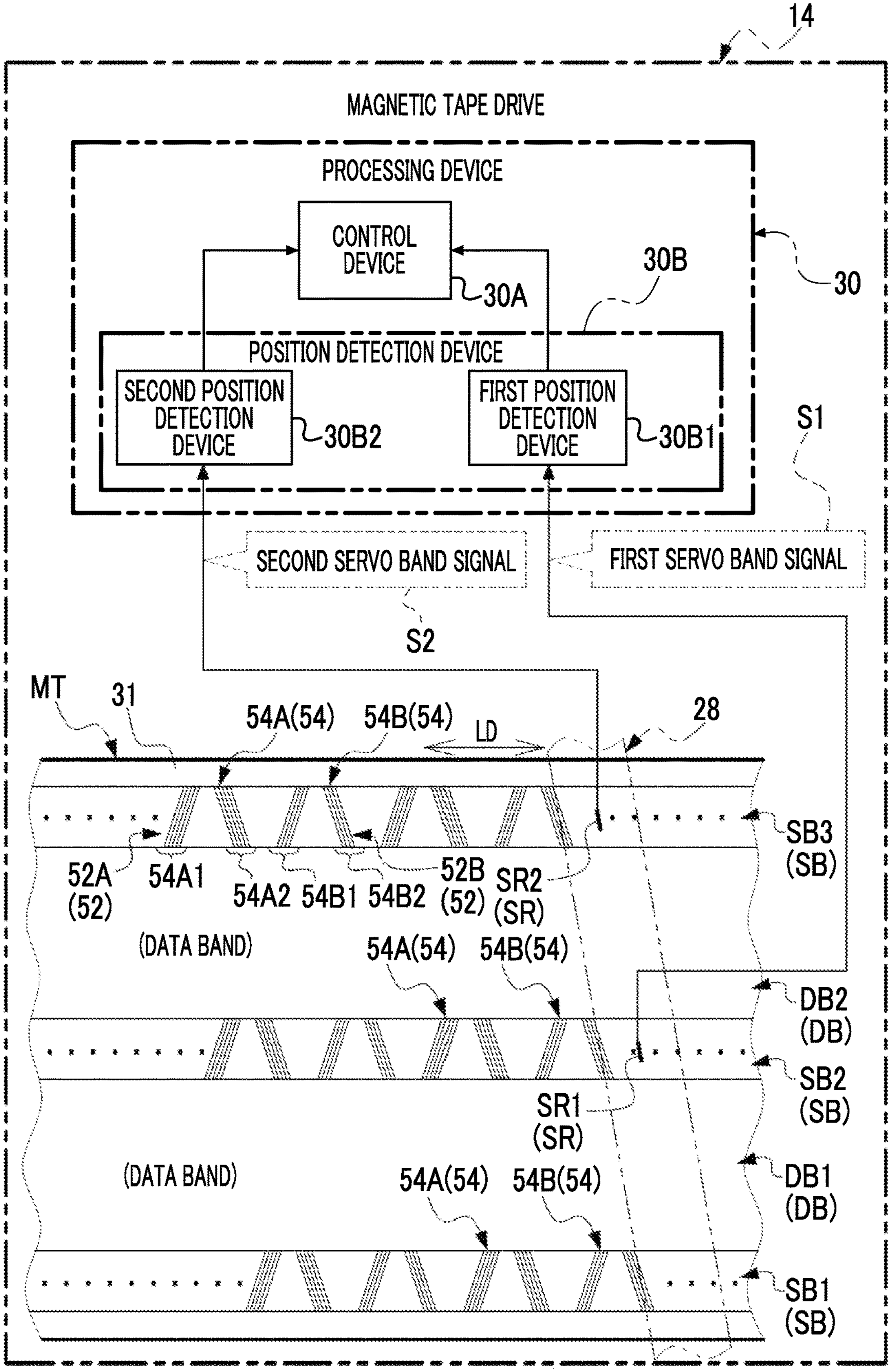
FIG. 9 is a conceptual diagram showing an example of a function of a processing device provided in the magnetic tape drive according to the embodiment.

First, an example of the servo pattern detection processing will be described with reference to FIGS. 9 and 10. As an example, as shown in FIG. 9, the processing device 30 includes a control device 30A and a position detection device 30B. The position detection device 30B includes a first position detection device 30B1 and a second position detection device 30B2. The position detection device 30B acquires a servo band signal that is a result of reading the servo band SB by the servo reading element SR, and detects the position of the magnetic head 28 on the magnetic tape MT based on the acquired servo band signal. The servo band signal includes a signal (for example, noise) unnecessary for the servo control in addition to the servo pattern signal which is the result of reading the servo pattern 52. Therefore, in order to realize the control based on the servo pattern signal (for example, servo control) with high accuracy, the processing device 30 needs to detect the servo pattern signal from the servo band signal with high accuracy.

The position detection device 30B acquires the servo band signal from the magnetic head 28. The servo band signal is classified into a first servo band signal S1 and a second servo band signal S2. The first servo band signal S1 is the signal indicating a result of reading the servo band SB by the servo reading element SR1, and the second servo band signal S2 is the signal indicating a result of reading the servo band SB by the servo reading element SR2. The first position detection device 30B1 acquires the first servo band signal S1, and the second position detection device 30B2 acquires the second servo band signal S2. In the example shown in FIG. 9, the signal obtained by reading the servo band SB2 by the servo reading element SR1 is shown as an example of the first servo band signal S1, and the signal obtained by reading the servo band SB3 by the servo reading element SR2 is shown as an example of the second servo band signal S2. It should be noted that, in the following, for convenience of description, in a case in which the distinction is not specifically needed, the first servo band signal S1 and the second servo band signal S2 will be referred to as a "servo band signal" without reference numerals.

The first position detection device 30B1 detects a position of the servo reading element SR1 with respect to the servo band SB2 based on the first servo band signal S1. The second position detection device 30B2 detects a position of the servo reading element SR2 with respect to the servo band SB3 based on the second servo band signal S2.

The control device 30A performs various controls based on a position detection result by the first position detection device 30B1 (that is, a result of detecting the position by the first position detection device 30B1) and a position detection result by the second position detection device 30B2 (that is, a result of detecting the position by the second position detection device 30B2). Here, the various controls refer to, for example, the servo control, a skew angle control, and/or a tension control. The tension control refers to a control of the tension applied to the magnetic tape MT (for example, the tension for reducing the influence of the TDS).

Next, a specific processing content of the position detection device 30B will be described. It should be noted that since the configuration of the second position detection device 30B2 and the configuration of the first position detection device 30B1 are the same, in the following, the processing content of the position detection device 30B is described with a specific processing content of the first position detection device 30B1 as an example, and the description of a specific processing content of the second position detection device 30B2 will be omitted.

In addition, in the following, for convenience of description, the servo pattern signal derived from the linear magnetization region 54A1 or 54B1 (see FIGS. 6 to 9) is also referred to as a "first linear magnetization region signal", and the servo pattern signal derived from the linear magnetization region 54A2 or 54B2 (see FIGS. 6 to 9) is also referred to as a "second linear magnetization region signal". In addition, in the present embodiment, the servo pattern signal is a signal composed of the first linear magnetization region signal and the second linear magnetization region signal. Therefore, the detection of the first linear magnetization region signal and the second linear magnetization region signal by the position detection device 30B means the detection of the servo pattern signal by the position detection device 30B.

Figure 10:
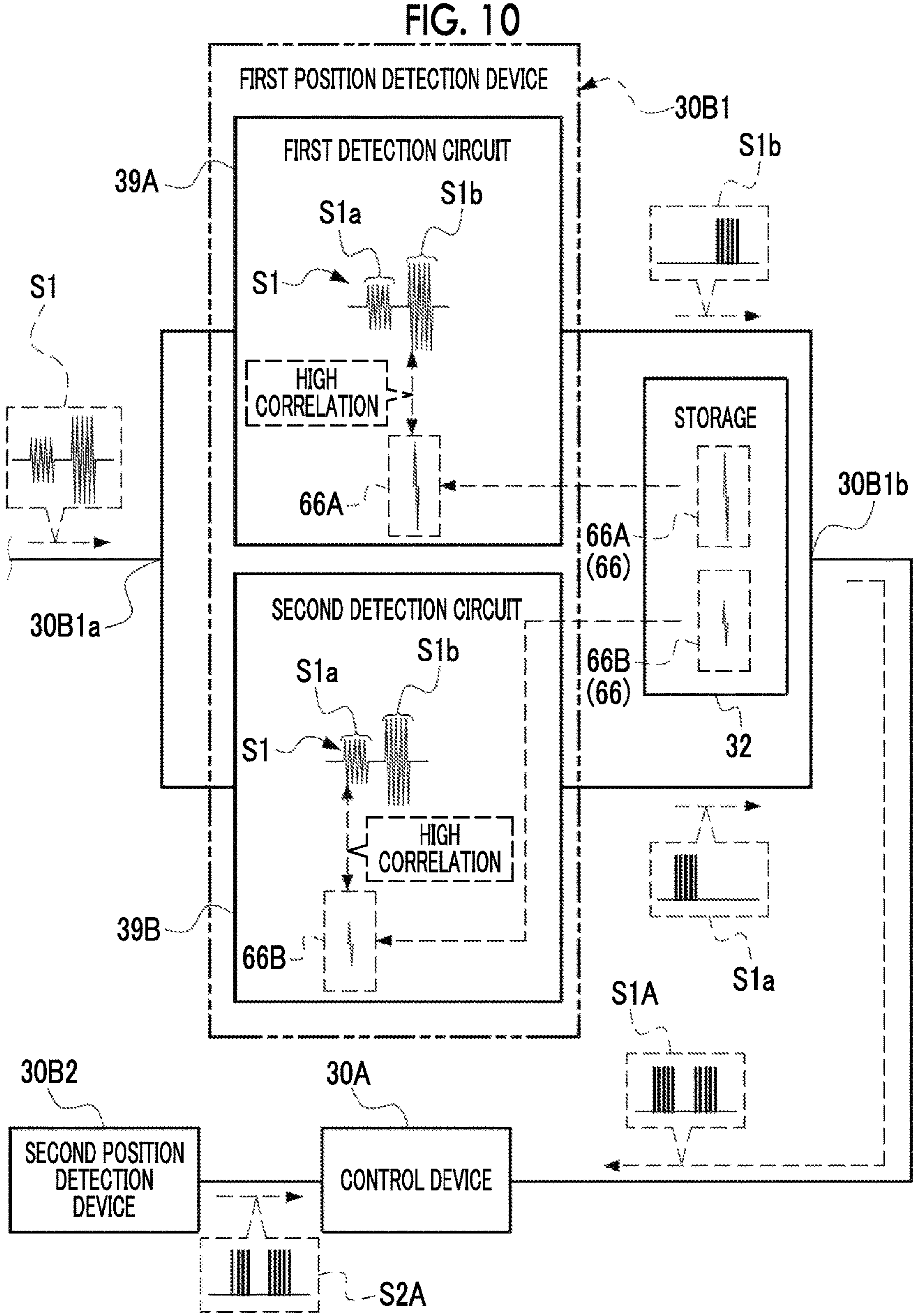
FIG. 10 is a conceptual diagram showing an example of processing contents of a first position detection device provided in the processing device provided in the magnetic tape drive according to the embodiment.

As an example, as shown in FIG. 10, the first position detection device 30B1 includes a first detection circuit 39A and a second detection circuit 39B. The first detection circuit 39A and the second detection circuit 39B are connected in parallel and comprise an input terminal 30B1*a* and an output terminal 30B1*b* common to each other. In the example shown in FIG. 10, an aspect example is shown in which the first servo band signal S1 is input to the input terminal 30B1*a*. The first servo band signal S1 includes a first linear magnetization region signal Sla and a second linear magnetization region signal S1*b*. The first linear magnetization region signal Sla and the second linear magnetization region signal S1*b* are the servo pattern signals (that is, analog servo pattern signals) which are the results of read by the servo reading element SR1 (see FIG. 9). The same applied to the second servo band signal S2 (see FIG. 9) as in the first servo band signal S1. That is, the servo pattern signal includes the first linear magnetization region signal Sla and the second linear magnetization region signal S1*b*.

An ideal waveform signal 66 is stored in advance in the storage 32. The ideal waveform signal 66 is a signal indicating the ideal waveform of the servo pattern signal (that is, the analog servo pattern signal) which is a result of reading the servo pattern 52 (see FIGS. 6 and 9) recorded in the servo band SB of the magnetic tape MT by the servo reading element SR. The ideal waveform signal 66 can be said to be a sample signal compared with the first servo band signal S1.

The ideal waveform signal 66 is classified into a first ideal waveform signal 66A and a second ideal waveform signal 66B. The first ideal waveform signal 66A corresponds to a signal derived from the linear magnetization region 54A2 or 54B2, that is, the second linear magnetization region signal S1*b*, and is a signal indicating the ideal waveform of the second linear magnetization region signal S1*b*. The second ideal waveform signal 66B corresponds to a signal derived from the linear magnetization region 54A1 or 54B1, that is, the first linear magnetization region signal Sla, and is a signal indicating the ideal waveform of the first linear magnetization region signal Sla. More specifically, for example, the first ideal waveform signal 66A is a signal indicating a single ideal waveform (that is, for one wavelength) included in the second linear magnetization region signal S1*b* (for example, an ideal signal which is a result of reading one of an ideal magnetization straight lines included in the servo pattern 52 by the servo reading element SR). In addition, for example, the second ideal waveform signal 66B is a signal indicating a single ideal waveform (that is, one wavelength) included in the first linear magnetization region signal Sla (for example, an ideal signal which is a result of reading one of an ideal magnetization straight lines included in the servo pattern 52 by the servo reading element SR).

An ideal waveform indicated by a first ideal waveform signal 66A is a waveform determined in accordance with an orientation of the magnetic head 28 on the magnetic tape MT. A relative positional relationship between the holder 44 (see FIG. 8) of the magnetic head 28 and the servo reading element SR is fixed. Therefore, the ideal waveform indicated by the first ideal waveform signal 66A can be said to be a waveform determined in accordance with the orientation of the servo reading element SR on the magnetic tape MT. For example, the ideal waveform indicated by the first ideal waveform signal 66A is a waveform determined in accordance with a geometrical characteristic of the linear magnetization region 54A2 of the servo pattern 52A (for example, a geometrical characteristic of the magnetization straight line 54A2*a*) and the orientation of the magnetic head 28 on the magnetic tape MT. As described above, since the relative positional relationship between the holder 44 (see FIG. 8) of the magnetic head 28 and the servo reading element SR is fixed, the ideal waveform indicated by the first ideal waveform signal 66A can be said to be a waveform determined in accordance with the geometrical characteristic of the linear magnetization region 54A2 of the servo pattern 52A (for example, geometrical characteristic of the magnetization straight line 54A2*a*) and the orientation of the servo reading element SR on the magnetic tape MT. Here, the orientation of the magnetic head 28 on the magnetic tape MT refers to, for example, an angle formed by the linear magnetization region 54A2 and the magnetic head 28 on the magnetic tape MT. In addition, the orientation of the servo reading element SR on the magnetic tape MT refers to, for example, an angle formed by the linear magnetization region 54A2 and the servo reading element SR on the magnetic tape MT. It should be noted that the ideal waveform indicated by the first ideal waveform signal 66A may be determined by also adding the characteristics of the servo reading element SR itself (material, size, shape, and/or use history), the characteristics of the magnetic tape MT (material and/or use history), and/or the use environment of the magnetic head 28 in addition to the elements described above.

Similarly to the ideal waveform indicated by the first ideal waveform signal 66A, an ideal waveform indicated by a second ideal waveform signal 66B is also a waveform determined in accordance with the orientation of the magnetic head 28 on the magnetic tape MT, that is, a waveform determined in accordance with the orientation of the servo reading element SR on the magnetic tape MT. For example, the ideal waveform indicated by the second ideal waveform signal 66B is a waveform determined in accordance with the geometrical characteristic of the linear magnetization region 54A1 of the servo pattern 52A (for example, geometrical characteristic of the magnetization straight line 54A1*a*) and the orientation of the magnetic head 28 on the magnetic tape MT, that is, a waveform determined in accordance with the geometrical characteristic of the linear magnetization region 54A1 of the servo pattern 52A (for example, geometrical characteristic of the magnetization straight line 54A1*a*) and the orientation of the servo reading element SR on the magnetic tape MT. Here, the orientation of the magnetic head 28 on the magnetic tape MT refers to, for example, an angle formed by the linear magnetization region 54A1 and the magnetic head 28 on the magnetic tape MT. In addition, the orientation of the servo reading element SR on the magnetic tape MT refers to, for example, an angle formed by the linear magnetization region 54A1 and the servo reading element SR on the magnetic tape MT. It should be noted that, similarly to the ideal waveform indicated by the first ideal waveform signal 66A the ideal waveform indicated by the second ideal waveform signal 66B may be determined by also adding the characteristics of the servo reading element SR itself (material, size, shape, and/or use history), the characteristics of the magnetic tape MT (material and/or use history), and/or the use environment of the magnetic head 28 in addition to the elements described above.

The first position detection device 30B1 acquires the first servo band signal S1 and compares the acquired first servo band signal S1 with the ideal waveform signal 66 to detect a servo pattern signal S1A. In the example shown in FIG. 10, the first position detection device 30B1 detects the servo pattern signal S1A by using the first detection circuit 39A and the second detection circuit 39B. The first detection circuit 39A is an example of a "first detection circuit" according to the technology of the present disclosure, and the second detection circuit 39B is an example of a "second detection circuit" according to the technology of the present disclosure.

The first servo band signal S1 is input to the first detection circuit 39A via the input terminal 30B1*a*. The first detection circuit 39A detects the second linear magnetization region signal S1*b* from the input first servo band signal S1 by using an autocorrelation coefficient. The second linear magnetization region signal S1*b* is an example of a "first signal" according to the technology of the present disclosure.

The autocorrelation coefficient used by the first detection circuit 39A is a coefficient indicating a degree of correlation between the first servo band signal S1 and the first ideal waveform signal 66A. The first detection circuit 39A acquires the first ideal waveform signal 66A from the storage 32 to compare the acquired first ideal waveform signal 66A with the first servo band signal S1. Moreover, the first detection circuit 39A calculates the autocorrelation coefficient based on the comparison result. The first detection circuit 39A detects a position at which the correlation between the first servo band signal S1 and the first ideal waveform signal 66A is high (for example, position at which the first servo band signal S1 and the first ideal waveform signal 66A match) on the servo band SB (for example, servo band SB2 shown in FIG. 9) in accordance with the autocorrelation coefficient.

On the other hand, the first servo band signal S1 is also input to the second detection circuit 39B via the input terminal 30B1*a*. The second detection circuit 39B detects the first linear magnetization region signal Sla from the input first servo band signal S1 by using the autocorrelation coefficient. The first linear magnetization region signal Sla is an example of a "second signal" according to the technology of the present disclosure.

The autocorrelation coefficient used by the second detection circuit 39B is a coefficient indicating a degree of correlation between the first servo band signal S1 and the second ideal waveform signal 66B. The second detection circuit 39B acquires the second ideal waveform signal 66B from the storage 32 to compare the acquired second ideal waveform signal 66B with the first servo band signal S1. Moreover, the second detection circuit 39B calculates the autocorrelation coefficient based on the comparison result. The second detection circuit 39B detects a position at which the correlation between the first servo band signal S1 and the second ideal waveform signal 66B is high (for example, position at which the first servo band signal S1 and the second ideal waveform signal 66B match) on the servo band SB (for example, servo band SB2 shown in FIG. 9) in accordance with the autocorrelation coefficient.

The first position detection device 30B1 detects the servo pattern signal S1A based on a detection result by the first detection circuit 39A and a detection result by the second detection circuit 39B.

The first position detection device 30B1 outputs the servo pattern signal S1A from the output terminal 30B1*b* to the control device 30A. The servo pattern signal S1A is a signal indicating a logical sum of the second linear magnetization region signal S1*b* detected by the first detection circuit 39A and the first linear magnetization region signal S1*a* detected by the second detection circuit 39B (for example, digital signal).

The position of the servo reading element SR with respect to the servo band SB is detected based on, for example, an interval between the servo patterns 52A and 52B in the longitudinal direction LD. For example, the interval between the servo patterns 52A and 52B in the longitudinal direction LD is detected in accordance with the autocorrelation coefficient. In a case in which the servo reading element SR is positioned on the upper side of the servo pattern 52 (that is, the upper side in the front view of the paper in FIG. 9), an interval between the linear magnetization region 54A1 and the linear magnetization region 54A2 is narrowed, and an interval between the linear magnetization region 54B1 and the linear magnetization region 54B2 is also narrowed. On the other hand, in a case in which the servo reading element SR is positioned on the lower side of the servo pattern 52 (that is, the lower side in the front view of the paper in FIG. 9), the interval between the linear magnetization region 54A1 and the linear magnetization region 54A2 is widened, and the interval between the linear magnetization region 54B1 and the linear magnetization region 54B2 is also widened. As described above, the first position detection device 30B1 detects the position of the servo reading element SR with respect to the servo band SB by using the interval between the linear magnetization region 54A1 and the linear magnetization region 54A2 and the interval between the linear magnetization region 54B1 and the linear magnetization region 54B2 detected in accordance with the autocorrelation coefficient.

It should be noted that, in the example shown in FIG. 10, the form example has been described in which the first position detection device 30B1 detects the servo pattern signal S1A by comparing the first servo band signal S1 with the ideal waveform signal 66, similarly, the second position detection device 30B2 also detects the servo pattern signal S2A by comparing the second servo band signal S2 with the ideal waveform signal 66, and outputs the detected servo pattern signal S2A to the control device 30A.

Figure 11:
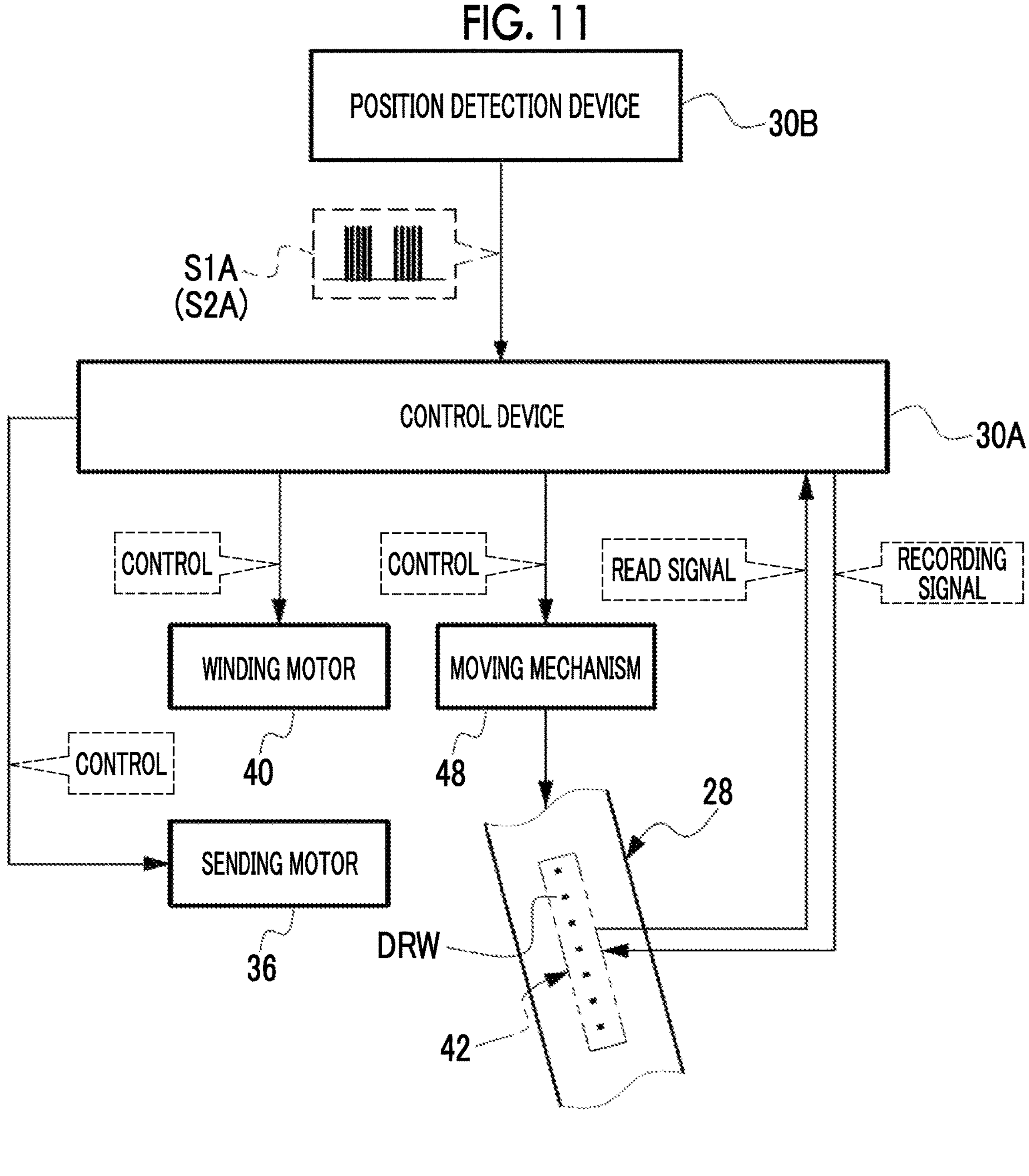
FIG. 11 is a conceptual diagram showing an example of processing contents of a control device provided in the processing device provided in the magnetic tape drive according to the embodiment.

As shown in FIG. 11 as an example, the control device 30A operates the moving mechanism 48 based on the position detection result (that is, the servo pattern signals S1A and S2A) in the position detection device 30B to adjust the position of the magnetic head 28. In addition, the control device 30A causes the magnetic element unit 42 to perform the magnetic processing on the data band DB of the magnetic tape MT. That is, the control device 30A acquires a read signal (that is, data read from the data band DB of the magnetic tape MT by the magnetic element unit 42) from the magnetic element unit 42, or supplies a recording signal to the magnetic element unit 42 to record the data in response to the recording signal in the data band DB of the magnetic tape MT.

In addition, in order to reduce the influence of the TDS, the control device 30A calculates the servo band pitch from the position detection result (that is, the servo pattern signals S1A and S2A) of the position detection device 30B, and performs the tension control in accordance with the calculated servo band pitch, or skews the magnetic head 28 on the magnetic tape MT. The tension control is realized by adjusting the rotation speed, rotation torque, and the like of each of the sending motor 36 and the winding motor 40. The skew of the magnetic head 28 is realized by operating the inclination mechanism 49.

Next, an example of the ideal waveform signal acquisition processing will be described with reference to FIGS. 12 and 13. The ideal waveform signal acquisition processing is performed by the control device 30A (see FIG. 13).

Figure 12:
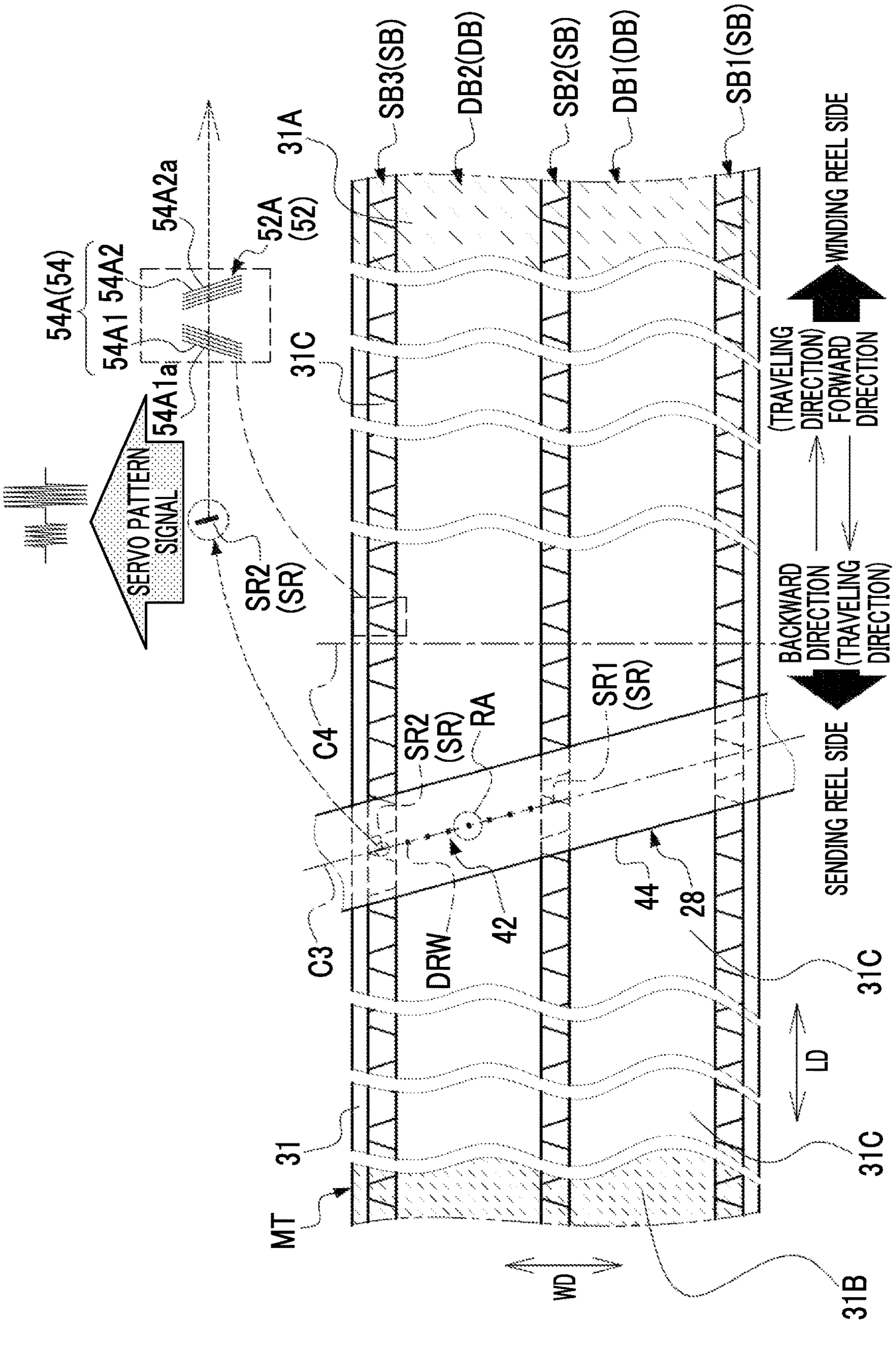
FIG. 12 is a conceptual diagram showing an example of an aspect in which a servo pattern is read by a servo reading element from a servo band in an ideal waveform signal acquisition section of the magnetic tape according to the embodiment.

As shown in FIG. 12 as an example, the magnetic tape MT has a BOT section 31A and an EOT section 31B. The BOT section 31A refers to a section provided at the beginning of the magnetic tape MT. The EOT section 31B refers to a section provided at the end of the magnetic tape MT.

The BOT section 31A and the EOT section 31B are formed on the front surface 31 of the magnetic tape MT, and include a plurality of servo bands SB (in the example shown in FIG. 12, servo bands SB1, SB2, and SB3) and a plurality of data band DB (in the example shown in FIG. 12, data bands DB1 and DB2).

In addition, the magnetic tape MT has a plurality of ideal waveform signal acquisition sections 31C between the BOT section 31A and the EOT section 31B in the longitudinal direction LD of the magnetic tape MT. The plurality of ideal waveform signal acquisition sections 31C are an example of "plurality of sections" according to the technology of the present disclosure.

The plurality of ideal waveform signal acquisition sections 31C are intermittently provided between the BOT section 31A and the EOT section 31B along the longitudinal direction LD. The plurality of ideal waveform signal acquisition sections 31C are provided between the BOT section 31A and the EOT section 31B along the longitudinal direction LD at regular intervals, for example.

The plurality of servo patterns 52 are recorded in the servo band SB of the BOT section 31A, the servo band SB of the ideal waveform signal acquisition section 31C, and the servo band SB of the EOT section 31B along the longitudinal direction LD. The servo patterns 52 recorded in the servo band SB of the BOT section 31A, the servo band SB of the ideal waveform signal acquisition section 31C, and the servo band SB of the EOT section 31B are an example of a "reference servo pattern" according to the technology of the present disclosure.

In the ideal waveform signal acquisition processing, in a state in which the magnetic head 28 faces the ideal waveform signal acquisition section 31C and the magnetic tape MT travels at a regular speed (for example, the same speed as the regular speed that is designated as the speed at which magnetic processing is performed by the magnetic head 28 in a region other than the ideal waveform signal acquisition section 31C among regions between the BOT section 31A and the EOT section 31B), the servo pattern 52 of the ideal waveform signal acquisition section 31C is read by the servo reading element SR. In the example shown in FIG. 12, an example of an aspect in which the servo pattern 52A of the ideal waveform signal acquisition section 31C is read by the servo reading element SR2 is shown. Note that, in the example shown in FIG. 12, in the ideal waveform signal acquisition processing, an example of an aspect in which the servo pattern 52 of the ideal waveform signal acquisition section 31C is read by the servo reading element SR2 is shown, but this is merely an example. For example, in the ideal waveform signal acquisition processing, in addition to reading the servo pattern 52 of the ideal waveform signal acquisition section 31C by the servo reading element SR2, the servo pattern 52 of at least one of the BOT section 31A and the EOT section 31B may also be read by the servo pattern element SR2.

The geometrical characteristic of the servo pattern 52 recorded in each servo band SB of the BOT section 31A, the ideal waveform signal acquisition section 31C, and the EOT section 31B is the same as the geometrical characteristic of the servo pattern 52 recorded in the magnetic tape MT other than the BOT section 31A, the ideal waveform signal acquisition section 31C, and the EOT section 31B. Here, "the same" refers to the same in the sense of including an error generally allowed in the technical field to which the technology of the present disclosure belongs, which is the error to the extent that it does not contradict the purpose of the technology of the present disclosure, in addition to the exact same.

Figure 13:
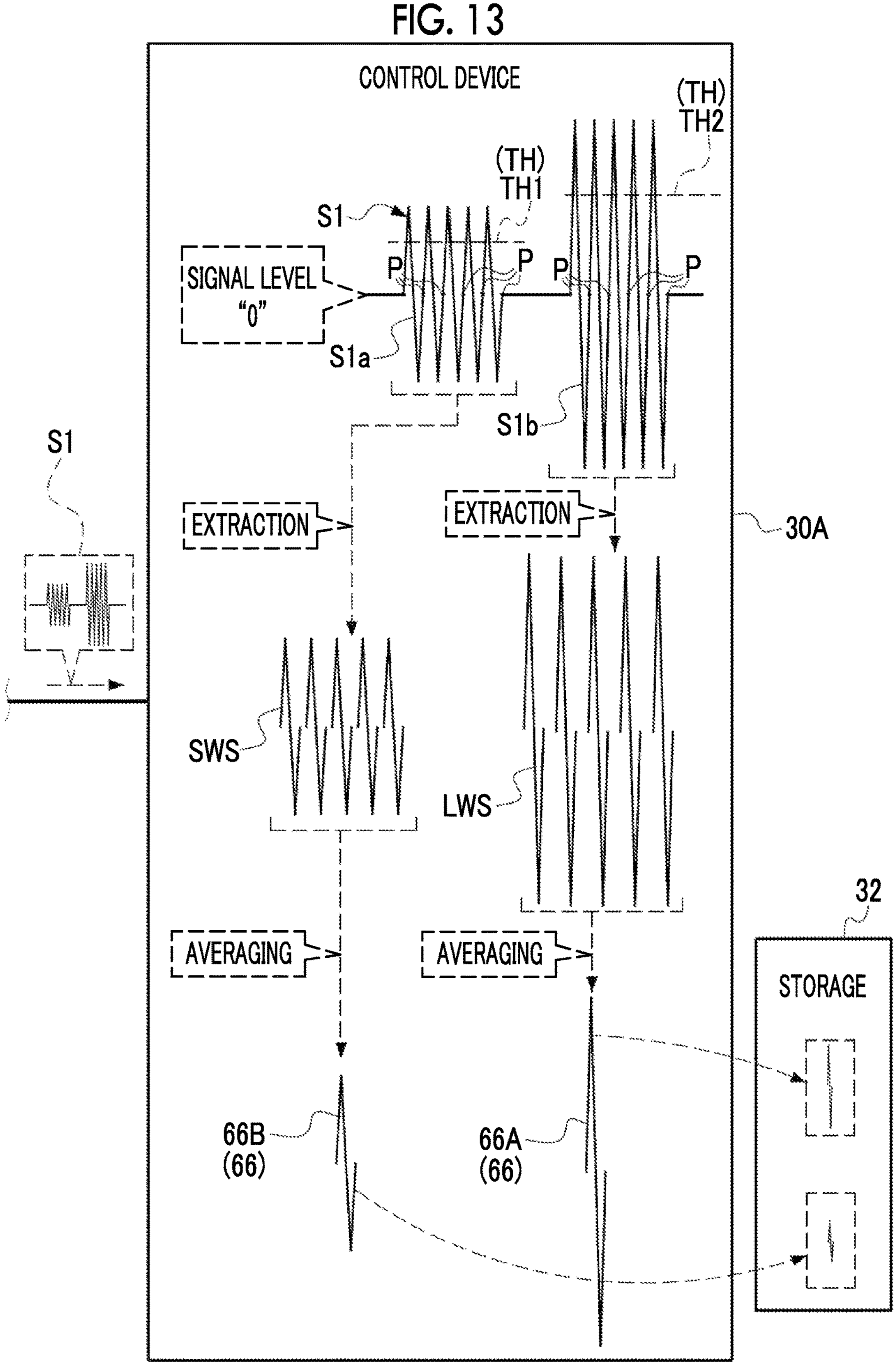
FIG. 13 is a conceptual diagram showing an example of an aspect in which the ideal waveform signal is generated by the control device provided in the magnetic tape drive according to the embodiment and stored in the storage.

As an example, as shown in FIG. 13, the first servo band signal S1 is input to the control device 30A. In the example shown in FIG. 13, the first servo band signal S1 input to the control device 30A is a signal which is obtained by reading the servo band SB3 of the ideal waveform signal acquisition section 31C by the servo reading element SR (see FIG. 12). Note that FIG. 13 shows the first servo band signal S1 obtained by reading the servo band SB3 of the ideal waveform signal acquisition section 31C by the servo reading element SR, but this is merely an example, and the first servo band signal S1 obtained by reading the servo band SB3 in the BOT section 31A and/or the servo band SB3 in the EOT section 31B by the servo reading element SR may be used. In addition, although the first servo band signal S1 is shown in FIG. 13, this is merely an example, and the second servo band signal S2 may be applied instead of the first servo band signal S1.

The control device 30A has a threshold value TH determined in accordance with an angle formed by the servo pattern 52 and the servo reading element SR (that is, the skew angle of the magnetic head 28). For example, the threshold value TH is derived from an arithmetic expression (not shown) in which the skew angle of the magnetic head 28 is an independent variable and the threshold value TH is dependent variable, or a table (not shown) in which the skew angle of the magnetic head 28 and the threshold value TH are associated with each other.

The control device 30A extracts a small waveform signal SWS and a large waveform signal LWS from the first servo band signal S1 by using the threshold value TH. The threshold value TH is classified into a first threshold value TH1 and a second threshold value TH2. The first threshold value TH1 is determined in accordance with a first angle, and the second threshold value TH2 is determined in accordance with a second angle. The first angle is an angle formed by the linear magnetization region 54A1 or 54B1 (see FIGS. 6 to 9) and the servo reading element SR (see FIGS. 6 to 9) (for example, an angle formed by the magnetization straight line 54A1*a* or 54B1*a* (see FIGS. 6 to 8) and the servo reading element SR (see FIGS. 6 to 9)). The second angle is an angle formed by the linear magnetization region 54A2 or 54B2 (see FIGS. 6 to 9) and the servo reading element SR (see FIGS. 6 to 9) (for example, an angle formed by the magnetization straight line 54A2*a* or 54B2*a* (see FIGS. 6 to 8) and the servo reading element SR (see FIGS. 6 to 9)).

In the example shown in FIG. 13, the first threshold value TH1 is smaller than the second threshold value TH2. The control device 30A detects, from the first servo band signal S1, a point P at which the signal level rises at "0", and extracts, as the small waveform signal SWS, a signal for one wavelength having one peak value equal to or more the first threshold value TH1 and smaller than the second threshold value TH2 between the adjacent points P. In addition, the control device 30A extracts, as the large waveform signal LWS, a signal for one wavelength having one peak value equal to or more than the second threshold value TH2 between the adjacent points P.

Each of the small waveform signal SWS and the large waveform signal LWS is a signal for one wavelength. The amplitude of the small waveform signal SWS is smaller than the amplitude of the large waveform signal LWS. In the example shown in FIG. 13, the control device 30A extracts five small waveform signals SWS from the first linear magnetization region signal Sla, and extracts five large waveform signals LWS from the second linear magnetization region signal S1*b*.

The control device 30A generates the second ideal waveform signal 66B by averaging a plurality of small waveform signals SWS (five small waveform signals SWS in the example shown in FIG. 13), and stores the generated second ideal waveform signal 66B in the storage 32. Here, averaging the plurality of small waveform signals SWS refers to generating a signal indicating an average waveform of the plurality of small waveform signals SWS.

In addition, here, although a form example shown in which the signal indicating the average waveform of the plurality of small waveform signals SWS is stored in the storage 32 as the second ideal waveform signal 66B, this is merely an example. For example, a signal indicating a waveform positioned at a median value among the plurality of small waveform signals SWS may be used as the second ideal waveform signal 66B, or a signal indicating the waveform that appears at the highest frequency among the plurality of small waveform signals SWS may be used as the second ideal waveform signal 66B, and a signal indicating the waveform derived in accordance with the statistic value among the plurality of small waveform signals SWS (that is, statistical waveform derived from the plurality of small waveform signals SWS) need only used as the second ideal waveform signal 66B.

In addition, in the present embodiment, the number of the plurality of small waveform signals SWS used to generate the second ideal waveform signal 66B is five, but this is merely an example. For example, the number of the plurality of small waveform signals SWS used to generate the second ideal waveform signal 66B may be six or more. In this case, for example, the second ideal waveform signal 66B may be generated from the plurality of small waveform signals SWS extracted from the plurality of first linear magnetization region signals Sla corresponding to the plurality of linear magnetization regions 54A1 (see FIGS. 6 to 9). In addition, the number of the plurality of small waveform signals SWS used to generate the second ideal waveform signal 66B may be smaller than five.

The control device 30A generates the first ideal waveform signal 66A by averaging a plurality of large waveform signals LWS (five large waveform signals LWS in the example shown in FIG. 13), and stores the generated first ideal waveform signal 66A in the storage 32. Here, averaging the plurality of large waveform signals LWS refers to generating a signal indicating an average waveform of the plurality of large waveform signals LWS.

In addition, here, although a form example shown in which the signal indicating the average waveform of the plurality of large waveform signals LWS is stored in the storage 32 as the first ideal waveform signal 66A, this is merely an example. For example, a signal indicating a waveform positioned at a median value among the plurality of large waveform signals LWS may be used as the first ideal waveform signal 66A, or a signal indicating the waveform that appears at the highest frequency among the plurality of large waveform signals LWS may be used as the first ideal waveform signal 66A, and a signal indicating the waveform derived in accordance with the statistic value among the plurality of large waveform signals LWS (that is, statistical waveform derived from the plurality of large waveform signals LWS) need only used as the first ideal waveform signal 66A.

In addition, in the present embodiment, the number of the plurality of large waveform signals LWS used to generate the first ideal waveform signal 66A is five, but this is merely an example. For example, the number of the plurality of large waveform signals LWS used to generate the first ideal waveform signal 66A may be six or more. In this case, for example, the first ideal waveform signal 66A may be generated from the plurality of large waveform signals LWS extracted from the plurality of second linear magnetization region signals S1*b* corresponding to the plurality of linear magnetization regions 54A1 and 54B1 (see FIGS. 6 to 9). In addition, the number of the plurality of large waveform signals LWS used to generate the first ideal waveform signal 66A may be smaller than five.

As described above, by executing the ideal waveform signal acquisition processing by the control device 30A, the signal indicating the result of reading the servo pattern 52A recorded between the BOT section 31A and the EOT section 31B in the magnetic tape MT (here, as an example, the servo pattern 52A recorded in the ideal waveform signal acquisition section 31C) by the servo reading element SR is stored in the storage 32 as the ideal waveform signal 66.

In the example shown in FIG. 12 and FIG. 13, the signal indicating the result of reading the servo pattern 52A recorded in the ideal waveform signal acquisition section 31C by the servo reading element SR is used as the ideal waveform signal 66, but this is merely an example. For example, the signal indicating the result of reading the servo pattern 52B recorded in the ideal waveform signal acquisition section 31C by the servo reading element SR may be used as the ideal waveform signal 66. In addition, the signal indicating the result of reading the servo pattern 52 recorded in the BOT section 31A by the servo reading element SR may be used as the ideal waveform signal 66. In addition, the signal indicating the result of reading the servo pattern 52 recorded in the EOT section 31B by the servo reading element SR may be used as the ideal waveform signal 66.

Next, among a plurality of steps included in a manufacturing process of the magnetic tape MT, an example of a servo pattern recording step of recording the servo pattern 52 on the servo band SB of the magnetic tape MT and an example of a winding step of winding the magnetic tape MT will be described.

Figure 14:
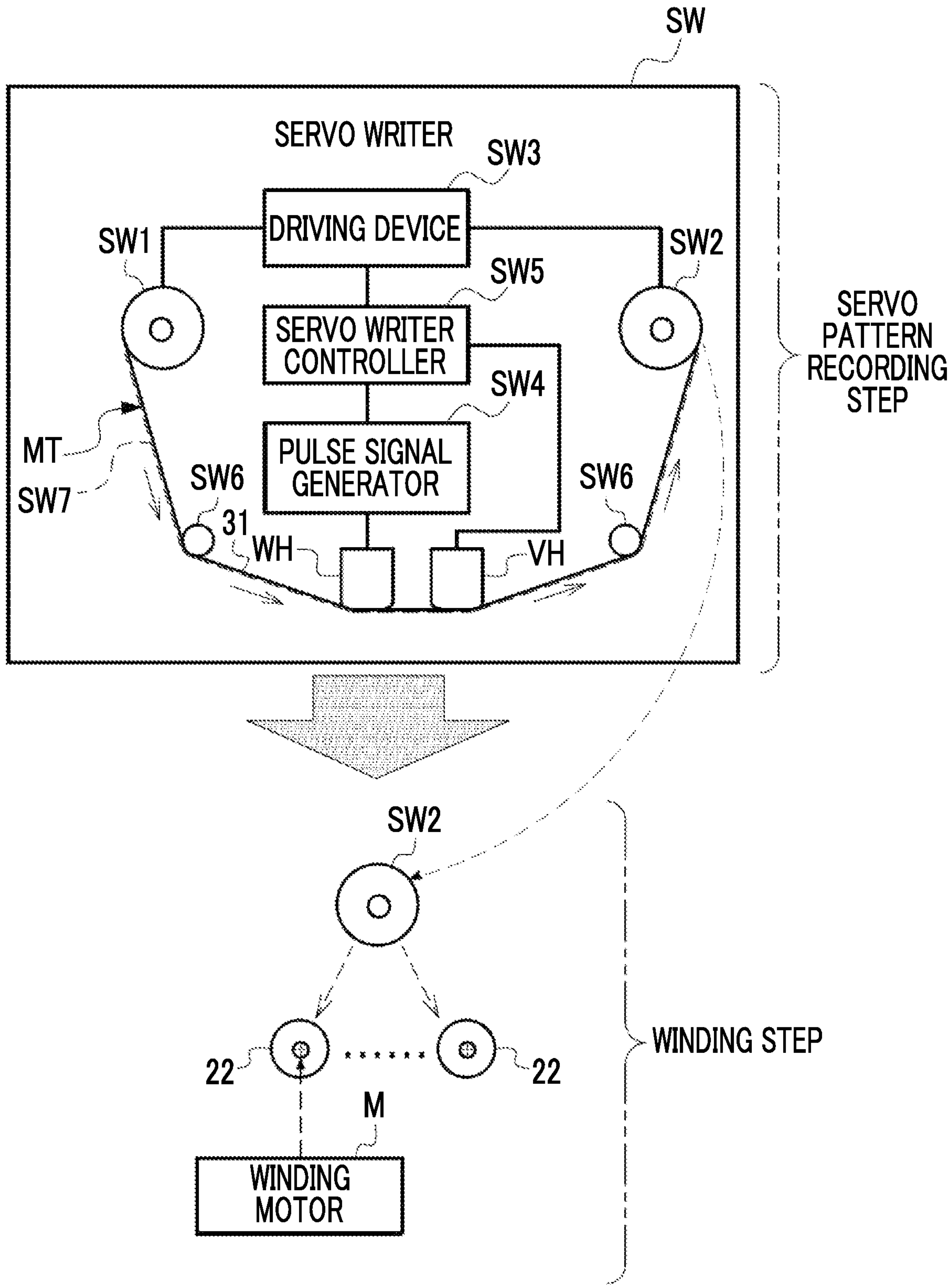
FIG. 14 is a conceptual diagram showing an example of a configuration of a servo writer according to the embodiment.

As an example, as shown in FIG. 14, a servo writer SW is used in the servo pattern recording step. The servo writer SW comprises a sending reel SW1, a winding reel SW2, a driving device SW3, a pulse signal generator SW4, a servo writer controller SW5, a plurality of guides SW6, a transport passage SW7, a servo pattern recording head WH, and a verification head VH. The servo writer controller SW5 incorporates a device corresponding to the controller 25 (see FIG. 3) described above.

In the present embodiment, the servo writer SW is an example of a "detection device" and an "inspection device" according to the technology of the present disclosure. In addition, in the present embodiment, the servo writer controller SW5 is an example of a "processing device", an "inspection processor", and a "storage medium" according to the technology of the present disclosure.

The servo writer controller SW5 controls the entirety of the servo writer SW. In the present embodiment, although the servo writer controller SW5 is realized by an ASIC, the technology of the present disclosure is not limited to this. For example, the servo writer controller SW5 may be realized by an FPGA and/or a PLC. In addition, the servo writer controller SW5 may be realized by the computer including a CPU, a flash memory (for example, an EEPROM and/or an SSD), and a RAM. In addition, the servo writer controller SW5 may be realized by combining two or more of an ASIC, an FPGA, a PLC, and a computer. That is, the servo writer controller SW5 may be realized by a combination of a hardware configuration and a software configuration.

A pancake is set in the sending reel SW1. The pancake refers to a large-diameter roll in which the magnetic tape MT cut into a product width from a wide web raw material before writing the servo pattern 52 is wound around a hub.

The driving device SW3 has a motor (not shown) and a gear (not shown), and is mechanically connected to the sending reel SW1 and the winding reel SW2. In a case in which the magnetic tape MT is wound by the winding reel SW2, the driving device SW3 generates power in accordance with the command from the servo writer controller SW5, and transmits the generated power to the sending reel SW1 and the winding reel SW2 to rotate the sending reel SW1 and the winding reel SW2. That is, the sending reel SW1 receives the power from the driving device SW3 and is rotated to send the magnetic tape MT to the predetermined transport passage SW7. The winding reel SW2 receives the power from the driving device SW3 and is rotated to wind the magnetic tape MT sent from the sending reel SW1. The rotation speed, the rotation torque, and the like of the sending reel SW1 and the winding reel SW2 are adjusted in accordance with a speed at which the magnetic tape MT is wound around the winding reel SW2.

The plurality of guides SW6 and the servo pattern recording head WH are disposed on the transport passage SW7. The servo pattern recording head WH is disposed on the front surface 31 side of the magnetic tape MT between the plurality of guides SW6. The magnetic tape MT sent from the sending reel SW1 to the transport passage SW7 is guided by the plurality of guides SW6 and is wound by the winding reel SW2 via the servo pattern recording head WH.

In the servo pattern recording step, the pulse signal generator SW4 generates the pulse signal under the control of the servo writer controller SW5, and supplies the generated pulse signal to the servo pattern recording head WH. In a state in which the magnetic tape MT travels on the transport passage SW7 at the regular speed, the servo pattern recording head WH records the servo pattern 52 in the servo band SB in response to the pulse signal supplied from the pulse signal generator SW4. As a result, for example, the plurality of servo patterns 52 are recorded in the servo band SB of the magnetic tape MT over the total length of the magnetic tape MT (see FIGS. 6 to 9).

In addition, after the plurality of servo patterns 52 are recorded in the magnetic tape MT, the servo writer controller SW5 performs the ideal waveform signal acquisition processing in the servo writer SW. As a result, the ideal waveform signal 66 is stored in a storage (not shown) in the servo writer controller SW5.

The manufacturing process of the magnetic tape MT includes a plurality of steps in addition to the servo pattern recording step. The plurality of steps include the inspection step and the winding step.

For example, the inspection step is a step of inspecting the servo band SB formed on the front surface 31 of the magnetic tape MT by the servo pattern recording head WH. The inspection of the servo band SB refers to, for example, processing of determining the correctness of the servo pattern 52 recorded in the servo band SB. The determination of the correctness of the servo pattern 52 refers to, for example, the determination (that is, verification of the servo pattern 52) whether or not the servo patterns 52A and 52B are recorded in a predetermined portion of the front surface 31 without excess or deficiency of the magnetization straight lines 54A1*a*, 54A2*a*, 54B1*a*, and 54B2*a* and within an allowable error.

The inspection step is performed by using the servo writer controller SW5 and the verification head VH. The verification head VH is disposed on the downstream side of the servo pattern recording head WH in a transport direction of the magnetic tape MT. In addition, the verification head VH includes a plurality of servo reading elements (not shown) similarly to the magnetic head 28, and the plurality of servo bands SB are read by the plurality of servo reading elements. In addition, in a case in which the ideal waveform signal acquisition processing is performed by the servo writer controller SW5, the servo pattern 52 is also read by the servo reading element provided in the verification head VH in the same manner as for reading the servo pattern 52 by the servo reading element SR of the magnetic head 28 in the magnetic tape drive 14.

The verification head VH is connected to the servo writer controller SW5. The verification head VH is disposed at a position facing the servo band SB as viewed from the front surface 31 side of the magnetic tape MT (that is, the rear surface side of the verification head VH), and reads the servo pattern 52 recorded in the servo band SB, and outputs a reading result (hereinafter, referred to as "servo pattern reading result") to the servo writer controller SW5. The servo writer controller SW5 inspects the servo band SB (for example, determines the correctness of the servo pattern 52) based on the servo pattern reading result (for example, the servo pattern signal) input from the verification head VH. For example, since the servo writer controller SW5 incorporates the device corresponding to the controller 25 (see FIG. 3) described above, the servo writer controller SW5 acquires the position detection result from the servo pattern reading result, and inspects the servo band SB by determining the correctness of the servo pattern 52 by using the position detection result.

Here, for example, the servo writer controller SW5 acquires the position detection result from the servo pattern reading result by performing the servo pattern detection processing. The ideal waveform signal 66 used in the servo pattern detection processing by the servo writer controller SW5 is the ideal waveform signal 66 stored in the storage (not shown) in the servo writer controller SW5.

The servo writer controller SW5 outputs information indicating the result of inspecting the servo band SB (for example, the result of determining the correctness of the servo pattern 52) to a predetermined output destination (for example, the storage 32 (see FIG. 3), the UI system device 34 (see FIG. 3), and/or the external device 37 (see FIG. 3)).

For example, in a case in which the inspection step is terminated, the winding step is then performed. The winding step is a step of winding the magnetic tape MT around the sending reel 22 (that is, the sending reel 22 (see FIGS. 2 to 4) accommodated in the magnetic tape cartridge 12 (see FIGS. 1 to 4)) used for each of the plurality of magnetic tape cartridges 12 (see FIGS. 1 to 4). In the winding step, a winding motor M is used. The winding motor M is mechanically connected to the sending reel 22 via a gear and the like. The winding motor M rotates the sending reel 22 by applying a rotation force to the sending reel 22 under the control of the processing device (not shown). The magnetic tape MT wound around the winding reel SW2 is wound around the sending reel 22 by the rotation of the sending reel 22. In the winding step, a cutting device (not shown) is used. In a case in which a required amount of the magnetic tape MT is wound around the sending reel 22 for each of the plurality of sending reels 22, the magnetic tape MT sent from the winding reel SW2 to the sending reel 22 is cut by the cutting device.

The pulse signal generator SW4 generates the pulse signal under the control of the servo writer controller SW5, and supplies the generated pulse signal to the servo pattern recording head WH. In a state in which the magnetic tape MT travels on the transport passage SW7 at a regular speed, the servo pattern recording head WH records the servo pattern 52 in the servo band SB in response to the pulse signal supplied from the pulse signal generator SW4.

Next, an action of the magnetic tape system 10 will be described.

The magnetic tape cartridge 12 accommodates the magnetic tape MT shown in FIG. 6. The magnetic tape cartridge 12 is loaded into the magnetic tape drive 14. In the magnetic tape drive 14, in a case in which the magnetic tape MT is subjected to the magnetic processing by the magnetic element unit 42, the magnetic tape MT is pulled out from the magnetic tape cartridge 12, and the servo pattern 52 in the servo band SB is read by the servo reading element SR of the magnetic head 28 (see FIGS. 8 and 9).

As shown in FIG. 8, in a case in which the servo pattern 52A is read by the servo reading element SR, in the linear magnetization region pair 54A, an angle formed by the linear magnetization region 54A1 and the servo reading element SR and an angle formed by the linear magnetization region 54A2 and the servo reading element SR are different. In a case in which the angles are different in this way, the variation due to the azimuth loss occurs between the servo pattern signal derived from the linear magnetization region 54A1, that is, the first linear magnetization region signal Sla (see FIG. 10), and the servo pattern signal derived from the linear magnetization region 54A2, that is, the second linear magnetization region signal S1*b* (see FIG. 10). The variation between the first linear magnetization region signal Sla and the second linear magnetization region signal S1*b* may contribute to a decrease in the accuracy of the servo control or the like.

Figure 15:
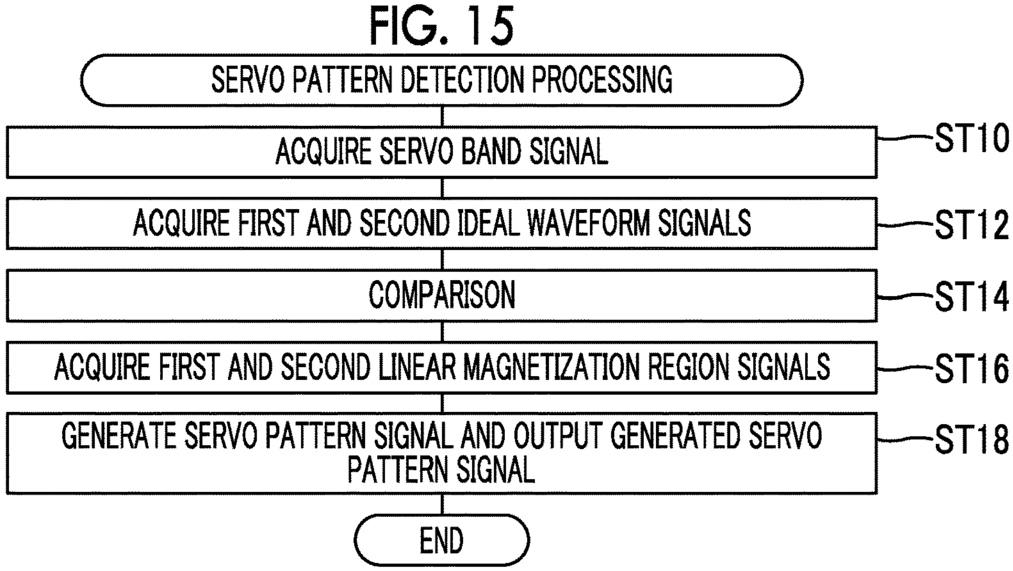
FIG. 15 is a flowchart showing an example of a flow of servo pattern detection processing according to the embodiment.

Therefore, in the magnetic tape system 10 according to the present embodiment, as shown in FIG. 15 as an example, the servo pattern detection processing is performed by the processing device 30 (see FIG. 9). For example, in the servo pattern detection processing shown in FIG. 15, each time the servo reading element SR starts reading the servo pattern 52 (that is, each time the servo reading element SR starts reading the servo pattern 52 in units of 50 frames). It should be noted that a flow of the servo pattern detection processing shown in FIG. 15 is an example of a part of a "detection method" according to the technology of the present disclosure.

In the servo pattern detection processing shown in FIG. 15, first, in step ST10, the position detection device 30B acquires the servo band signal. For example, the first position detection device 30B1 acquires the first servo band signal S1, and the second position detection device 30B2 acquires the second servo band signal S2. After the processing of step ST10 is executed, the servo pattern detection processing proceeds to step ST12.

In step ST12, the position detection device 30B acquires the first ideal waveform signal 66A and the second ideal waveform signal 66B from the storage 32. Here, the first ideal waveform signal 66A and the second ideal waveform signal 66B corresponding to the frame 50 including the servo pattern 52A read by the servo reading element SR are acquired by the position detection device 30B from the storage 32. After the processing of step ST12 is executed, the servo pattern detection processing proceeds to step ST14. It should be noted that the technology of the present disclosure is established even in a case in which the processing of step ST10 and the processing of step ST12 are changed in the servo pattern detection processing shown in FIG. 16.

In step ST14, the position detection device 30B compares the servo band signal acquired in step ST10 with the ideal waveform signal 66 acquired in step ST12. That is, in the first position detection device 30B1, the first detection circuit 39A compares the first servo band signal S1 with the first ideal waveform signal 66A, and the second detection circuit 39B compares the first servo band signal S1 with the second ideal waveform signal 66B. On the other hand, in the second position detection device 30B2, the first detection circuit 39A compares the second servo band signal S2 with the first ideal waveform signal 66A, and the second detection circuit 39B compares the second servo band signal S2 with the second ideal waveform signal 66B. After the processing of step ST14 is executed, the servo pattern detection processing proceeds to step ST16.

In step ST16, the first detection circuit 39A of the first position detection device 30B1 acquires the second linear magnetization region signal S1*b* based on the comparison result in step ST14, and the second detection circuit 39B of the first position detection device 30B1 acquires the first linear magnetization region signal Sla based on the comparison result in step ST14. In addition, the first detection circuit 39A of the second position detection device 30B2 acquires the second linear magnetization region signal S1*b* based on the comparison result in step ST14, and the second detection circuit 39B of the second position detection device 30B2 acquires the first linear magnetization region signal Sla based on the comparison result in step ST14. After the processing of step ST16 is executed, the servo pattern detection processing proceeds to step ST18.

In step ST18, the first position detection device 30B1 generates the servo pattern signal S1A which is the logical sum of the first linear magnetization region signal Sla and the second linear magnetization region signal S1*b* acquired in step ST16, and outputs the generated servo pattern signal S1A to the control device 30A. In addition, the second position detection device 30B2 generates the servo pattern signal S2A which is the logical sum of the first linear magnetization region signal Sla acquired in step ST16 and the second linear magnetization region signal S1*b*, and outputs the generated servo pattern signal S2A to the control device 30A. After the processing of step ST18 is executed, the servo pattern detection processing is terminated.

Figure 16:
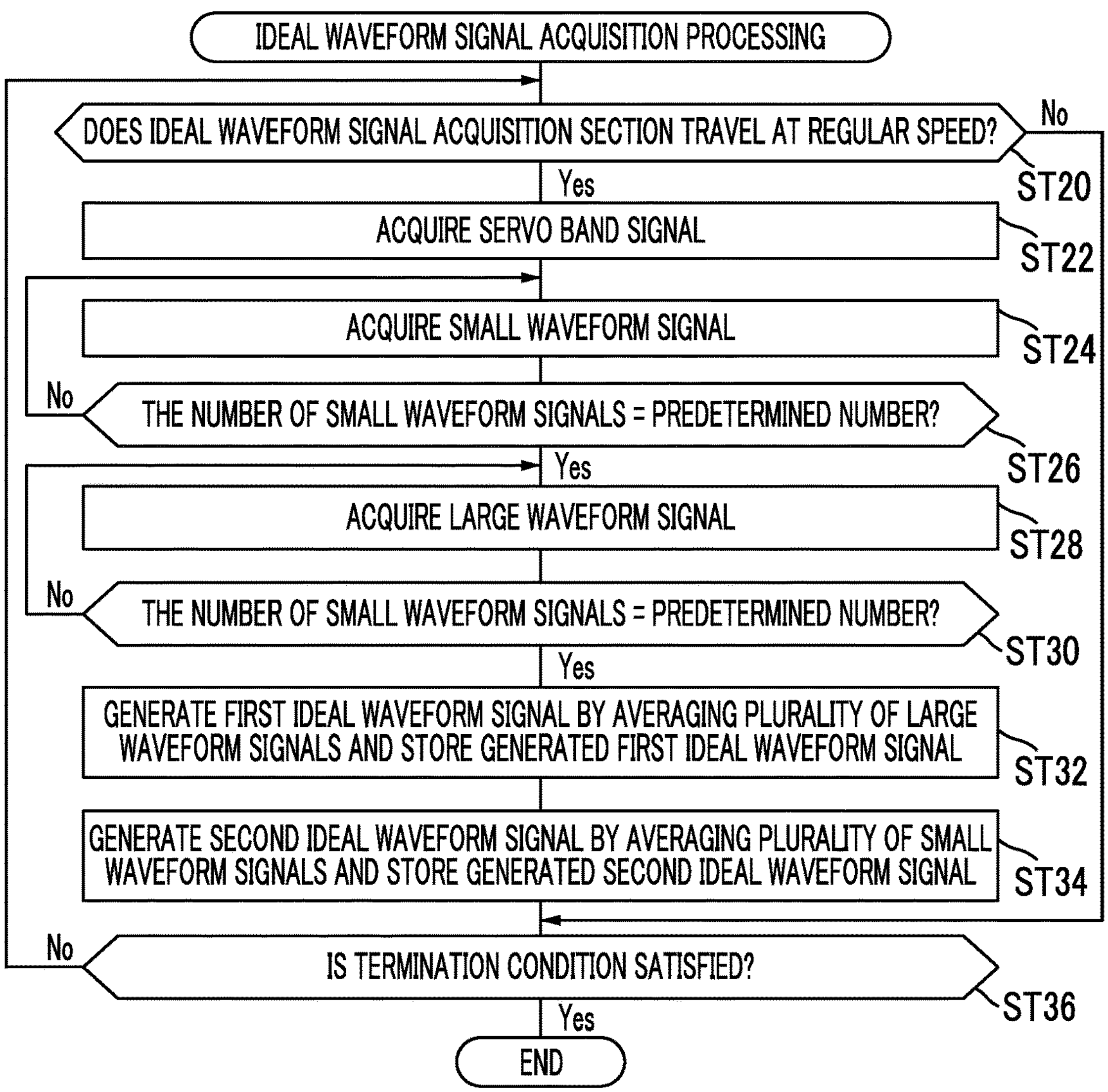
FIG. 16 is a flowchart showing an example of a flow of ideal waveform signal acquisition processing according to the embodiment.

In the magnetic tape system 10 according to the present embodiment, as an example, as shown in FIG. 16, the processing device 30 (see FIG. 9) performs the ideal waveform signal acquisition processing. The ideal waveform signal acquisition processing is performed by the processing device 30 in a case in which a predetermined condition is satisfied. Here, examples of the predetermined condition include a condition that the magnetic tape MT starts traveling in the forward direction in a state in which the servo reading element SR is positioned at the beginning of the magnetic tape MT in the longitudinal direction LD and positioned at the center portion in the width direction WD. A flow of the ideal waveform signal acquisition processing shown in FIG. 16 is an example of a part of a "detection method" according to the technology of the present disclosure.

In the ideal waveform signal acquisition processing shown in FIG. 16, first, in step ST20, the control device 30A determines whether or not the ideal waveform signal acquisition section 31C (see FIG. 12) of the magnetic tape MT travels at the regular speed on the magnetic head 28. In step ST20, in a case in which the ideal waveform signal acquisition section 31C of the magnetic tape MT does not travel at the regular speed on the magnetic head 28, a negative determination is made, and the ideal waveform signal acquisition processing proceeds to step ST36. In step ST20, in a case in which the ideal waveform signal acquisition section 31C of the magnetic tape MT travels at the regular speed on the magnetic head 28, a positive determination is made, and the ideal waveform signal acquisition processing proceeds to step ST22.

In step ST22, the control device 30A acquires the servo band signal (for example, the first servo band signal S1) obtained by reading the servo band SB in the ideal waveform signal acquisition section 31C by the servo reading element SR. After the processing of step ST22 is executed, the ideal waveform signal acquisition processing proceeds to step ST24.

In step ST24, the control device 30A acquires the small waveform signal SWS from the servo band signal acquired in step ST22. For example, the control device 30A acquires the small waveform signal SWS by extracting, as the small waveform signal SWS, the signal for one wavelength having one peak value equal to or more the first threshold value TH1 and smaller than the second threshold value TH2 between the adjacent points P from the first servo band signal S1. After the processing of step ST24 is executed, the ideal waveform signal acquisition processing proceeds to step ST26.

In step ST26, the control device 30A determines whether or not the number of the small waveform signals SWS acquired in step ST24 has reached a predetermined number (for example, five). In step ST26, in a case in which the number of the small waveform signals SWS has not reached the predetermined number, a negative determination is made, and the ideal waveform signal acquisition processing proceeds to step ST24. In step ST26, in a case in which the number of the small waveform signals SWS has reached the predetermined number, a positive determination is made, and the ideal waveform signal acquisition processing proceeds to step ST28.

In step ST28, the control device 30A acquires the large waveform signal LWS from the servo band signal acquired in step ST22. For example, the control device 30A acquires the large waveform signal LWS by extracting, as the large waveform signal LWS, the signal for one wavelength having one peak value equal to or more the second threshold value TH2 between the adjacent points P from the first servo band signal S1. After the processing of step ST28 is executed, the ideal waveform signal acquisition processing proceeds to step ST30.

In step ST30, the control device 30A determines whether or not the number of the large waveform signals LWS acquired in step ST28 has reached a predetermined number (for example, five). In step ST30, in a case in which the number of the large waveform signals LWS has not reached the predetermined number, a negative determination is made, and the ideal waveform signal acquisition processing proceeds to step ST28. In step ST30, in a case in which the number of the large waveform signals LWS has reached the predetermined number, a positive determination is made, and the ideal waveform signal acquisition processing proceeds to step ST32.

In step ST32, the control device 30A generates, as the first ideal waveform signal 66A, the signal indicating the average waveform of the plurality of large waveform signals LWS obtained by repeatedly performing the processing of step ST28 and the processing of step ST30, and stores the first ideal waveform signal 66A in the storage 32. Here, for example, the storage refers to overwriting storage of the first ideal waveform signal 66A in the storage 32. The overwriting storage of the first ideal waveform signal 66A in the storage 32 is merely an example, and the first ideal waveform signal 66A may be stored in the storage 32 in time series (for example, in a state of being associated with a time stored in the storage 32). After the processing of step ST32 is executed, the ideal waveform signal acquisition processing proceeds to step ST34.

In step ST34, the control device 30A generates, as the second ideal waveform signal 66B, the signal indicating the average waveform of the plurality of small waveform signals SWS obtained by repeatedly performing the processing of step ST24 and the processing of step ST26, and stores the second ideal waveform signal 66B in the storage 32. The overwriting storage of the second ideal waveform signal 66B in the storage 32 is merely an example, and the second ideal waveform signal 66B may be stored in the storage 32 in time series (for example, in a state of being associated with a time stored in the storage 32). After the processing of step ST34 is executed, the ideal waveform signal acquisition processing proceeds to step ST36.

In step ST36, the control device 30A determines whether or not a condition for terminating the ideal waveform signal acquisition processing (hereinafter, referred to as "termination condition") is satisfied. Examples of the termination condition include any one of the following first to fourth conditions. The first condition is a condition that the servo reading element SR reaches the region between the ideal waveform signal acquisition section 31C and the BOT section 31A or the EOT section 31B in which the servo reading element SR is positioned at an end of all the ideal waveform signal acquisition sections 31C in the traveling direction of the magnetic tape MT (for example, the forward direction or the backward direction). The second condition is that the servo reading element SR passes through all the ideal waveform signal acquisition sections 31C in the traveling direction of the magnetic tape MT. The third condition is that the servo reading element SR reaches the BOT section 31A or the EOT section 31B. The fourth condition is that the command to terminate the ideal waveform signal acquisition processing is received by the UI system device 34.

In step ST36, in a case in which the termination condition is not satisfied, a negative determination is made, and the ideal waveform signal acquisition processing proceeds to step ST20. In step ST36, in a case in which the termination condition is satisfied, a positive determination is made, and the ideal waveform signal acquisition processing is terminated.

The ideal waveform signal 66 stored in the storage 32 by performing the ideal waveform signal acquisition processing shown in FIG. 16 is used for the comparison with the servo band signal in the servo pattern detection processing.

In the ideal waveform signal acquisition processing shown in FIG. 16, the form example has been described in which the result of reading the servo pattern 52 by the servo reading element SR from the ideal waveform signal acquisition section 31C is stored in the storage 32 as the ideal waveform signal 66, but the technology of the present disclosure is not limited to this. For example, the result of reading the servo pattern 52 by the servo reading element SR from the BOT section 31A and/or the EOT section 31B may be stored in the storage 32 as the ideal waveform signal 66.

As described above, in the magnetic tape system 10 according to the present embodiment, the result of reading the servo pattern 52 recorded in the servo band SB of the ideal waveform signal acquisition section 31C is stored in the storage 32 as the ideal waveform signal 66, and the servo band signal and the ideal waveform signal are compared with each other to detect the servo pattern signal. Therefore, with the present configuration, the servo pattern signal can be detected with higher accuracy than in a case in which the ideal waveform signal 66 to be compared with the servo band signal is a signal set only by empirical rule or intuition.

In addition, with the present configuration, even in a case in which the magnetic processing is performed by the magnetic head 28 between the BOT section 31A and the EOT section 31B in the magnetic tape MT, it is not necessary to return the servo reading element SR on the BOT section 31A or the EOT section 31B only to obtain a new ideal waveform signal 66, so that the new ideal waveform signal 66 can be more quickly obtained than in a case in which the servo reading element SR is returned to the BOT section 31A or the EOT section 31B. In addition, with the present configuration, in a case in which the magnetic processing is performed by the magnetic head 28 between the BOT section 31A and the EOT section 31B in the magnetic tape MT, the result of reading, by the servo reading element SR, the servo pattern 52 in a portion having a characteristic closer to a characteristic of a portion in which the magnetic processing is performed than the characteristic of the BOT section 31A or the EOT section 31B (for example, a degree of deformation of the magnetic tape MT in the width direction) can be used as the new ideal waveform signal 66.

In addition, in the magnetic tape system 10 according to the present embodiment, the results of reading, by the servo reading element SR, the servo patterns 52 of each of the plurality of ideal waveform signal acquisition sections 31C intermittently provided along the longitudinal direction LD in the magnetic tape MT are used as the ideal waveform signal 66. Therefore, with the present configuration, the ideal waveform signal 66 corresponding to the characteristic of the portion in which the magnetic processing is performed by the magnetic head 28 between the BOT section 31A and the EOT section 31B in the magnetic tape MT can be obtained.

In addition, in the magnetic tape system 10 according to the present embodiment, the plurality of ideal waveform signal acquisition sections 31C are provided at regular intervals along the longitudinal direction LD in the magnetic tape MT, and the result of reading the servo pattern 52 of each of the plurality of ideal waveform signal acquisition sections 31C by the servo reading element SR is used as the ideal waveform signal 66. Therefore, with the present configuration, the ideal waveform signal 66 can be updated at regular intervals between the BOT section 31A and the EOT section 31B in the magnetic tape MT.

In addition, in the magnetic tape system 10 according to the present embodiment, the signal indicating the result of reading the servo pattern 52 recorded in at least one of the BOT section 31A or the EOT section 31B of the servo band SB by the servo reading element SR is adopted as the ideal waveform signal 66. Therefore, with the present configuration, even in a case in which a situation occurs in which the ideal waveform signal 66 cannot be obtained in the ideal waveform signal acquisition section 31C, the ideal waveform signal 66 can be obtained.

In addition, in the magnetic tape system 10 according to the present embodiment, the signal obtained by statisticizing the plurality of large waveform signals LWS (for example, the signal indicating the average waveform among the plurality of large waveform signals LWS) is adopted as the first ideal waveform signal 66A. Therefore, with the present configuration, the first ideal waveform signal 66A having higher reliability can be obtained than in a case in which the large waveform signal LWS randomly selected from the plurality of large waveform signals LWS is used as the first ideal waveform signal 66A. In addition, in the magnetic tape system 10 according to the present embodiment, the signal obtained by statisticizing the plurality of small waveform signals SWS (for example, the signal indicating the average waveform among the plurality of small waveform signals SWS) is adopted as the second ideal waveform signal 66B. Therefore, with the present configuration, the second ideal waveform signal 66B having higher reliability can be obtained than in a case in which the small waveform signal SWS randomly selected from the plurality of small waveform signals SWS is used as the second ideal waveform signal 66B.

In addition, in the magnetic tape system 10 according to the present embodiment, the geometrical characteristic of the servo pattern 52 read by the servo reading element SR in order to generate the ideal waveform signal 66 is the same as the geometrical characteristics of the other servo patterns 52. Therefore, with the present configuration, the ideal waveform signal 66 with higher reliability can be generated than in a case in which the geometrical characteristic of the servo pattern 52 read by the servo reading element SR in order to generate the ideal waveform signal 66 is completely different from the geometrical characteristics of the other servo patterns 52.

In addition, in the magnetic tape system 10 according to the present embodiment, the linear magnetization regions 54A1 and 54A2 inclined in opposite directions with respect to the imaginary straight line C1 are read by the servo reading element SR. In this case, as described above, there is the variation due to the azimuth loss between the first linear magnetization region signal Sla (see FIG. 10) and the second linear magnetization region signal S1*b* (see FIG. 10). However, even in a case in which the variation occurs between the first linear magnetization region signal Sla and the second linear magnetization region signal S1*b*, in the magnetic tape system 10 according to the present embodiment, the ideal waveform signal 66 is stored in advance in the storage 32, and the servo pattern signal is detected by comparing the servo band signal with the ideal waveform signal 66. Therefore, with the present configuration, even in a case in which the linear magnetization regions 54A1 and 54A2 inclined in opposite directions with respect to the imaginary straight line C1 are read by the servo reading element SR, it is possible to detect the servo pattern signal with higher accuracy than in a case in which the servo pattern signal is detected by using only the method of determining whether or not the signal level exceeds the threshold value.

In addition, in the magnetic tape system 10 according to the present embodiment, the first detection circuit 39A and the second detection circuit 39B are connected in parallel, and the common servo band signal is incorporated into the first detection circuit 39A and the second detection circuit 39B. In this case, for example, the second linear magnetization region signal S1*b* is detected by comparing the first servo band signal S1 with the first ideal waveform signal 66A by the first detection circuit 39A, and the first linear magnetization region signal Sla is detected by comparing the first servo band signal S1 with the second ideal waveform signal 66B by the second detection circuit 39B. That is, the first detection circuit 39A and the second detection circuit 39B detect the second linear magnetization region signal S1*b* and the first linear magnetization region signal Sla in parallel. Moreover, in the first position detection device 30B1, the logical sum of the second linear magnetization region signal S1*b* detected by the first detection circuit 39A and the first linear magnetization region signal Sla detected by the second detection circuit 39B is detected as the servo pattern signal S1A. In addition, also in the second position detection device 30B2, in the same manner as in the first position detection device 30A, the second linear magnetization region signal S1*b* and the first linear magnetization region signal Sla are detected from the second servo band signal S2 in parallel, and a logical sum between the second linear magnetization region signal S1*b* and the first linear magnetization region signal Sla is detected as the servo pattern signal S2A. Therefore, with the present configuration, the first linear magnetization region signal Sla and the second linear magnetization region signal S1*b* can be detected more quickly than in a case in which the first linear magnetization region signal Sla and the second linear magnetization region signal S1*b* are detected in order by comparing different ideal waveform signals (for example, the first ideal waveform signal 66A and the second ideal waveform signal 66B) with respect to one servo band signal in order.

In addition, in the magnetic tape system 10 according to the present embodiment, the servo pattern signal is detected by using the autocorrelation coefficient. Therefore, with the present configuration, the servo pattern signal can be detected with higher accuracy than a case in which the servo pattern signal is detected by using only a method of determining whether or not the signal level exceeds a threshold value.

In addition, in the servo writer SW according to the present embodiment, the device corresponding to the processing device 30 shown in FIG. 9 is incorporated into the servo writer controller SW5. Therefore, the servo writer controller SW5 performs the ideal waveform signal acquisition processing, and performs the servo pattern detection processing by using the ideal waveform signal 66 obtained by the ideal waveform signal acquisition processing. Therefore, the servo writer controller SW5 can inspect the servo band SB by acquiring the position detection result from the servo pattern reading result and determining the correctness of the servo pattern 52 by using the position detection result. Therefore, the servo writer controller SW5 incorporating the device corresponding to the processing device 30 shown in FIG. 9 can detect the servo pattern signal with higher accuracy than in a case in which the servo pattern signal is detected by only using the method of determining whether or not the signal level exceeds the threshold value, so that the servo writer SW incorporating the servo writer controller SW5 can inspect the servo band SB with high accuracy.

In the embodiment described above, the ideal waveform signal 66 is stored in advance in the storage 32, but this is merely an example, and the ideal waveform signal 66 may be stored in the cartridge memory 24, for example. In addition, for example, the ideal waveform signal 66 may be stored in a memory (not shown) of the external device 37. In addition, the ideal waveform signal 66 may be stored in the BOT section 31A and/or the EOT section 31B of the magnetic tape MT. In addition, the ideal waveform signal 66 may be stored in an empty region of the data band DB. In these cases, since it is not necessary to store the ideal waveform signal 66 in the storage 32, it is possible to increase the capacity of the storage 32 by an amount in which the ideal waveform signal 66 is not stored.

Figure 17:
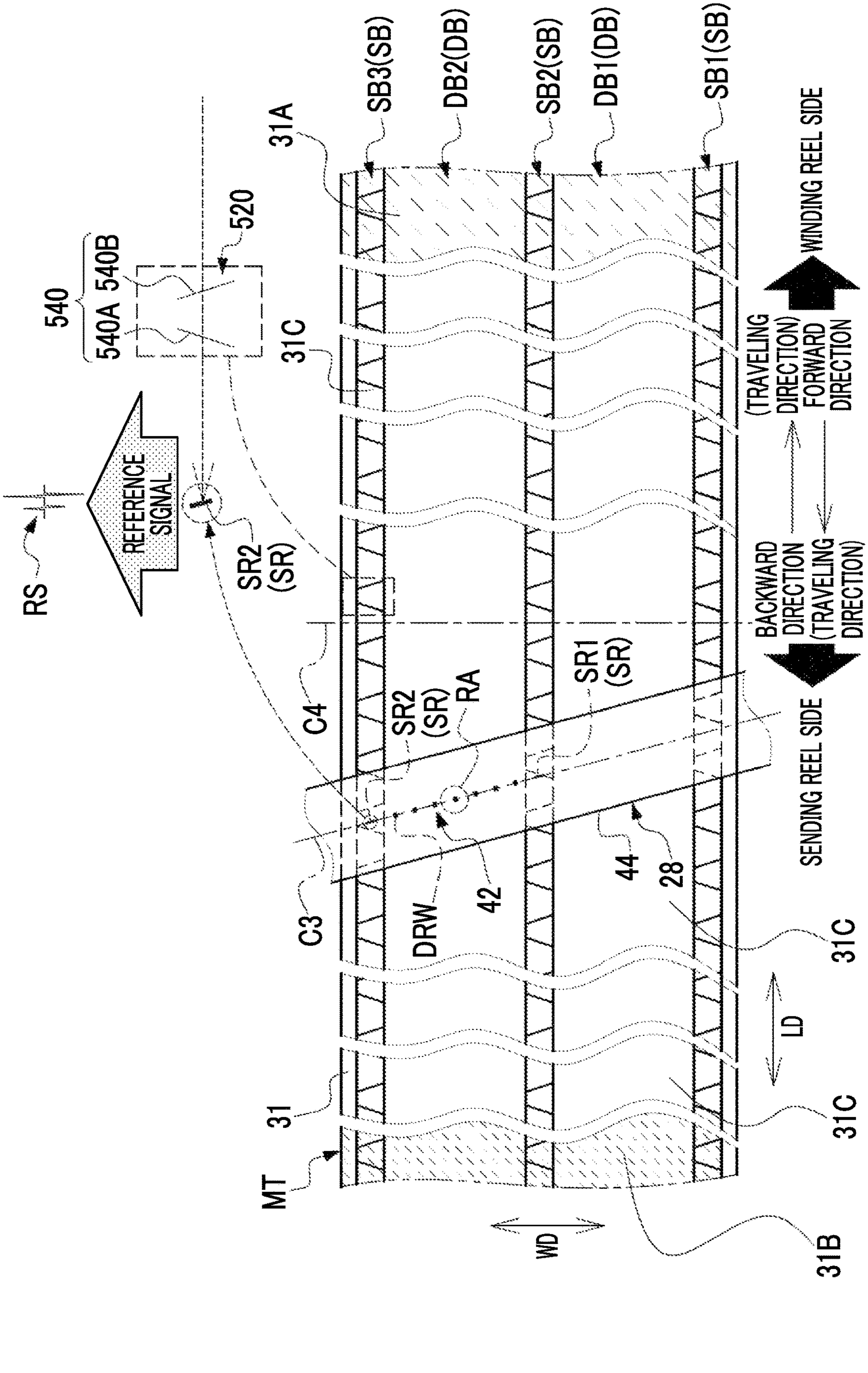
FIG. 17 is a conceptual diagram showing an example of an aspect in which a reference servo pattern is read by the servo reading element from the servo band in a BOT section of the magnetic tape according to the embodiment.

In addition, in the embodiment described above, the form example has been described in which the result obtained by reading the servo pattern 52 by the servo reading element SR is used as the ideal waveform signal 66, but the technology of the present disclosure is limited to this. For example, as shown in FIG. 17, a result obtained by reading a reference servo pattern 520 by the servo reading element SR may be used as the ideal waveform signal 66, instead of the servo pattern 52.

The reference servo pattern 520 consists of a linear magnetization region pair 540. The geometrical characteristic of the reference servo pattern 520 corresponds to the geometrical characteristic of the servo pattern 52 described in the above embodiment. The linear magnetization region pair 540 consists of magnetization straight lines 540A and 540B. The magnetization straight line 540A is a magnetization straight line corresponding to one magnetization straight line 54A1*a* (see FIGS. 6 to 8) included in the linear magnetization region 54A1, and the magnetization straight line 540B is a magnetization straight line corresponding to one magnetization straight line 54A2*a* (see FIGS. 6 to 8) included in the linear magnetization region 54A2.

The servo reading element SR reads the reference servo pattern 520 from the servo band SB in the BOT section 31A, and outputs a reference signal RS indicating the result of reading the reference servo pattern 520.

Figure 18:
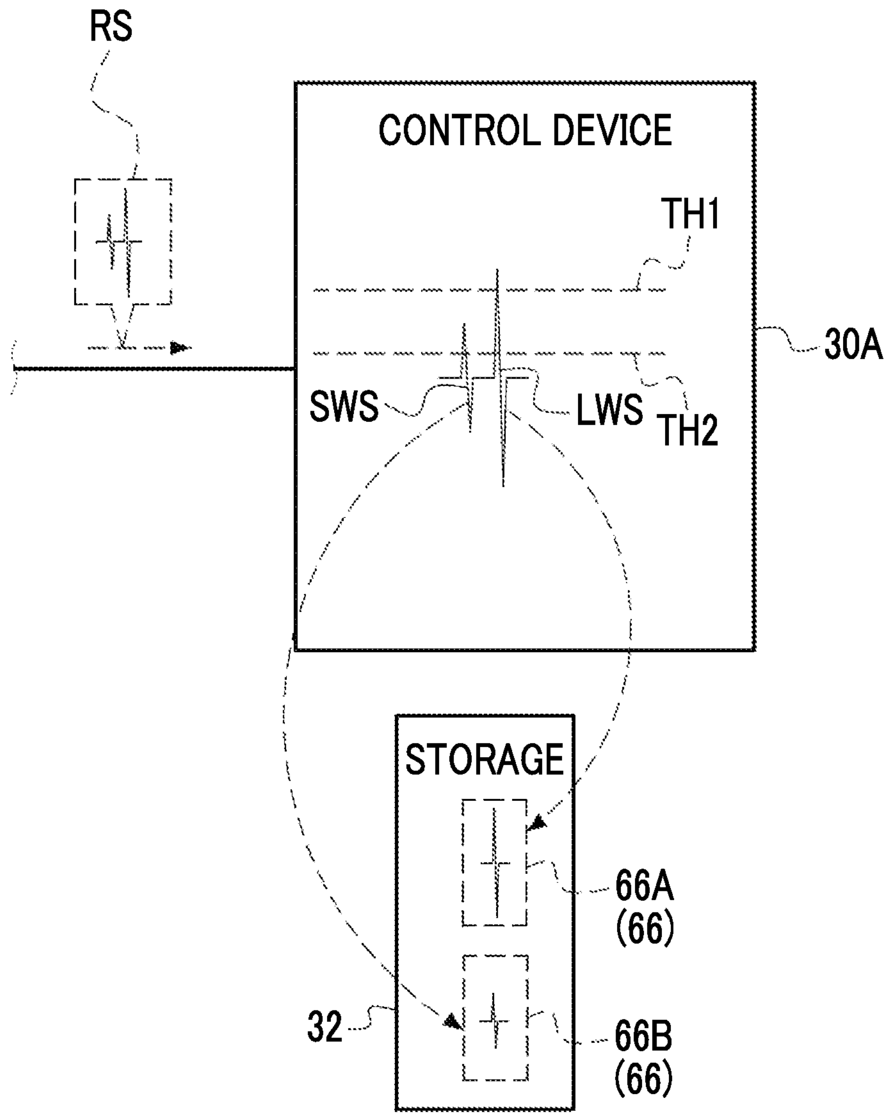
FIG. 18 is a conceptual diagram showing an example of an aspect in which the ideal waveform signal is generated from the reference signal by the control device and stored in the storage.

As shown in FIG. 18 as an example, the reference signal RS is input to the control device 30A. The reference signal RS includes the small waveform signal SWS and the large waveform signal LWS described in the above embodiment. The control device 30A extracts the small waveform signal SWS and the large waveform signal LWS from the reference signal RS in a manner described in the above embodiment. Moreover, the control device 30A stores the large waveform signal LWS extracted from the reference signal RS as the first ideal waveform signal 66A in the storage 32, and stores the small waveform signal SWS extracted from the reference signal RS as the second ideal waveform signal 66B in the storage 32. The first ideal waveform signal 66A and the second ideal waveform signal 66B stored in the storage 32 in this way are used for the comparison with the servo band signal in the servo pattern detection processing.

In addition, in the embodiment described above, the form example has been described in which the plurality of ideal waveform signal acquisition sections 31C are provided at regular intervals along the longitudinal direction LD in the magnetic tape MT, but the technology of the present disclosure is not limited to this. For example, in the magnetic tape MT, the plurality of ideal waveform signal acquisition sections 31C may be provided across a portion that is designated in advance as a portion in which the width of the magnetic tape MT is deformed, in the longitudinal direction LD. In this case, the ideal waveform signal 66 having higher reliability can be used as the ideal waveform signal 66 to be compared with the servo band signal in a case in which the magnetic processing is performed by the magnetic head 28 in the portion in which the width of the magnetic tape MT is deformed than in a case in which the plurality of ideal waveform signal acquisition sections 31C are disposed regardless of the portion in which the width of the magnetic tape MT is deformed.

In addition, in the embodiment described above, the servo pattern 52 is described as an example, but the servo pattern 52 is merely an example, and the technology of the present disclosure is established even in a case in which other types of servo patterns (that is, servo patterns having the geometrical characteristic different from the geometrical characteristic of the servo pattern 52) are used. In the following first modification example to eighth modification example, a servo pattern of a type different from that of the servo pattern 52 will be described.

First Modification Example

Figure 19:
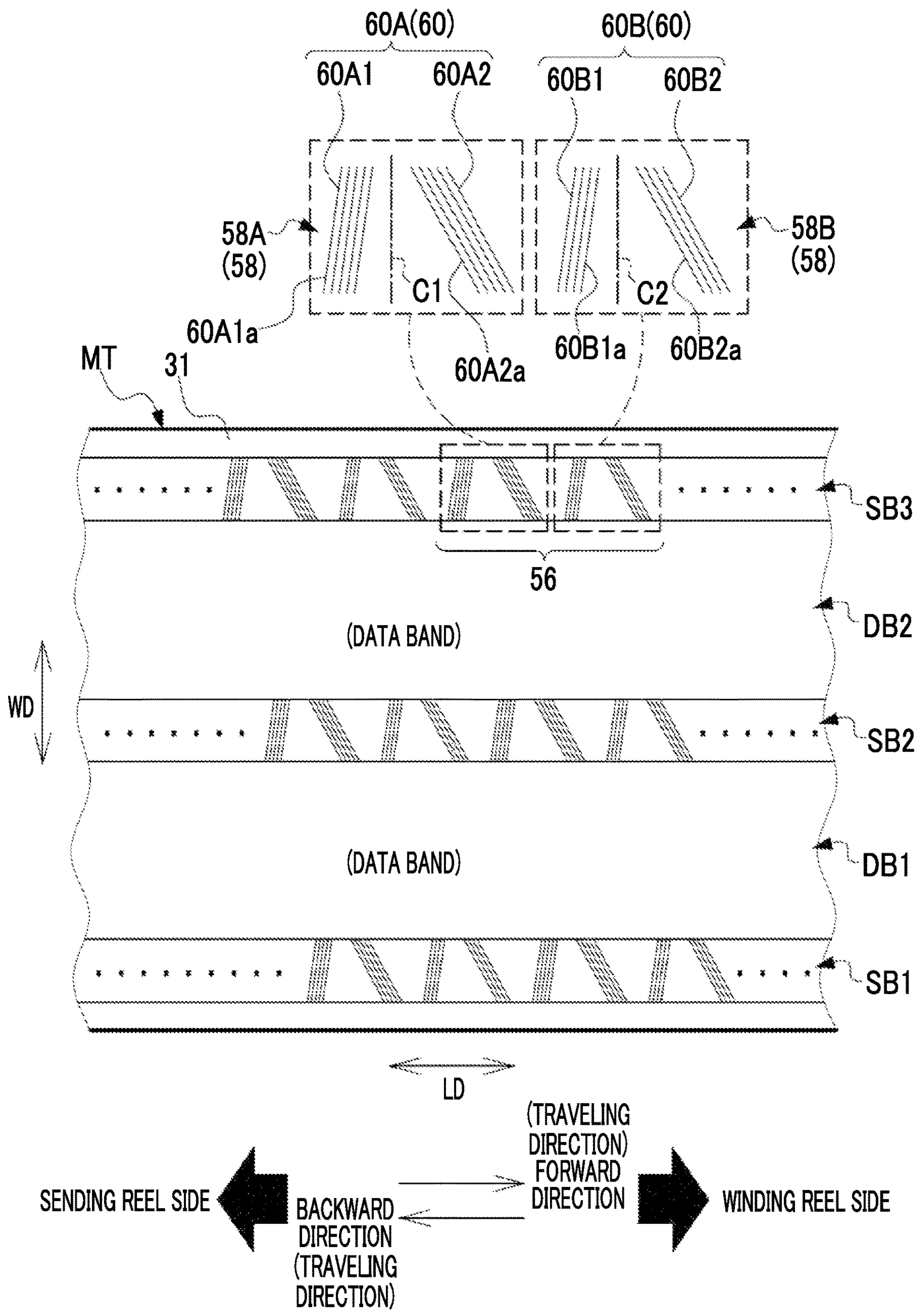
FIG. 19 is a conceptual diagram showing a first modification example, and is a conceptual diagram showing a modification example of the magnetic tape according to the embodiment (conceptual diagram showing an example of an aspect in which the magnetic tape is observed from the front surface side of the magnetic tape)

As shown in FIG. 19 as an example, the magnetic tape MT according to the first modification example is different from the magnetic tape MT shown in FIG. 6 in that a frame 56 is provided instead of the frame 50. The frame 56 is defined by a set of servo patterns 58. A plurality of servo patterns 58 are recorded in the servo band SB along the longitudinal direction LD of the magnetic tape MT. The plurality of servo patterns 58 are disposed at regular intervals along the longitudinal direction LD of the magnetic tape MT, similarly to the plurality of servo patterns 52 recorded in the magnetic tape MT shown in FIG. 6.

In the example shown in FIG. 19, servo patterns 58A and 58B are shown as an example of the set of servo patterns 58 included in the frame 56. The servo patterns 58A and 58B are adjacent to each other along the longitudinal direction LD of the magnetic tape MT, and the servo pattern 58A is positioned on the upstream side in the forward direction and the servo pattern 58B is positioned on the downstream side in the forward direction in the frame 56.

The servo pattern 58 consists of a linear magnetization region pair 60. The linear magnetization region pair 60 is classified into a linear magnetization region pair 60A and a linear magnetization region pair 60B.

The servo pattern 58A consists of the linear magnetization region pair 60A. In the example shown in FIG. 19, linear magnetization regions 60A1 and 60A2 are shown as an example of the linear magnetization region pair 60A. Each of the linear magnetization regions 60A1 and 60A2 is a linearly magnetized region.

The linear magnetization regions 60A1 and 60A2 are inclined in opposite directions with respect to the imaginary straight line C1. The linear magnetization regions 60A1 and 60A2 are not parallel to each other and are inclined at different angles with respect to the imaginary straight line C1. The linear magnetization region 60A1 has a steeper inclined angle with respect to the imaginary straight line C1 than the linear magnetization region 60A2. Here, "steep"

means that, for example, an angle of the linear magnetization region 60A1 with respect to the imaginary straight line C1 is smaller than an angle of the linear magnetization region 60A2 with respect to the imaginary straight line C1. In addition, a total length of the linear magnetization region 60A1 is shorter than a total length of the linear magnetization region 60A2.

In the servo pattern 58A, a plurality of magnetization straight lines 60A1*a* are included in the linear magnetization region 60A1, and a plurality of magnetization straight lines 60A2*a* are included in the linear magnetization region 60A2. The number of the magnetization straight lines 60A1*a* included in the linear magnetization region 60A1 is the same as the number of the magnetization straight lines 60A2*a* included in the linear magnetization region 60A2.

The linear magnetization region 60A1 is a set of magnetization straight lines 60A1*a*, which are five magnetized straight lines, and the linear magnetization region 60A2 is a set of magnetization straight lines 60A2*a*, which are five magnetized straight lines. In the servo band SB, the positions of both ends of the linear magnetization region 60A1 (that is, the positions of both ends of each of the five magnetization straight lines 60A1*a*) and the positions of both ends of the linear magnetization region 60A2 (that is, the positions of both ends of each of the five magnetization straight lines 60A2*a*) are aligned in the width direction WD. It should be noted that, here, the example has been described in which the positions of both ends of each of the five magnetization straight lines 60A1*a* and the positions of both ends of each of the five magnetization straight lines 60A2*a* are aligned, but this is merely an example, and the positions of both ends of one or more magnetization straight lines 60A1*a* among the five magnetization straight lines 60A1*a* and the positions of both ends of one or more magnetization straight lines 60A2*a* among of the five magnetization straight lines 60A2*a* need only be aligned. In addition, in the present embodiment, the concept of "aligned" also includes meaning of "aligned" including an error generally allowed in the technical field to which the technology of the present disclosure belongs, which is the error to the extent that it does not contradict the purpose of the technology of the present disclosure, in addition to the meaning of being exactly aligned.

The servo pattern 58B consists of the linear magnetization region pair 60B. In the example shown in FIG. 19, linear magnetization regions 60B1 and 60B2 are shown as an example of the linear magnetization region pair 60B. Each of the linear magnetization regions 60B1 and 60B2 is a linearly magnetized region.

The linear magnetization regions 60B1 and 60B2 are inclined in opposite directions with respect to the imaginary straight line C2. The linear magnetization regions 60B1 and 60B2 are not parallel to each other and are inclined at different angles with respect to the imaginary straight line C2. The linear magnetization region 60B1 has a steeper inclined angle with respect to the imaginary straight line C2 than the linear magnetization region 60B2. Here, "steep" means that, for example, an angle of the linear magnetization region 60B1 with respect to the imaginary straight line C2 is smaller than an angle of the linear magnetization region 60B2 with respect to the imaginary straight line C2. In addition, a total length of the linear magnetization region 60B1 is shorter than a total length of the linear magnetization region 60B2.

In the servo pattern 58B, a plurality of magnetization straight lines 60B1*a* are included in the linear magnetization region 60B1, and a plurality of magnetization straight lines 60B2*a* are included in the linear magnetization region 60B2. The number of the magnetization straight lines 60B1*a* included in the linear magnetization region 60B1 is the same as the number of the magnetization straight lines 60B2*a* included in the linear magnetization region 60B2.

The total number of the magnetization straight lines 60B1*a* and 60B2*a* included in the servo pattern 58B is different from the total number of the magnetization straight lines 60A1*a* and 60A2*a* included in the servo pattern 58A. In the example shown in FIG. 19, the total number of the magnetization straight lines 60A1*a* and 60A2*a* included in the servo pattern 58A is ten, whereas the total number of the magnetization straight lines 60B1*a* and 60B2*a* included in the servo pattern 58B is eight.

The linear magnetization region 60B1 is a set of magnetization straight lines 60B1*a*, which are four magnetized straight lines, and the linear magnetization region 60B2 is a set of magnetization straight lines 60B2*a*, which are four magnetized straight lines. In the servo band SB, the positions of both ends of the linear magnetization region 60B1 (that is, the positions of both ends of each of the four magnetization straight lines 60B1*a*) and the positions of both ends of the linear magnetization region 60B2 (that is, the positions of both ends of each of the four magnetization straight lines 60B2*a*) are aligned in the width direction WD.

It should be noted that, here, the example has been described in which the positions of both ends of each of the four magnetization straight lines 60B1*a* and the positions of both ends of each of the four magnetization straight lines 60B2*a* are aligned, but this is merely an example, and the positions of both ends of one or more magnetization straight lines 60B1*a* among the four magnetization straight lines 60B1*a* and the positions of both ends of one or more magnetization straight lines 60B2*a* among of the four magnetization straight lines 60B2*a* need only be aligned.

In addition, here, the set of magnetization straight lines 60A1*a*, which are five magnetized straight lines, is described as an example of the linear magnetization region 60A1, the set of magnetization straight lines 60A2*a*, which are five magnetized straight lines, is described as an example of the linear magnetization region 60A2, the set of magnetization straight lines 60B1*a*, which are four magnetized straight lines, is described as an example of the linear magnetization region 60B1, and the set of magnetization straight lines 60B2*a*, which are four magnetized straight lines, is described as an example of the linear magnetization region 60B2, but the technology of the present disclosure is not limited thereto. For example, the linear magnetization region 60A1 need only have the number of the magnetization straight lines 60A1*a* that contribute to specifying the position of the magnetic head 28 on the magnetic tape MT, the linear magnetization region 60A2 need only have the number of the magnetization straight lines 60A2*a* that contribute to specifying the position of the magnetic head 28 on the magnetic tape MT, the linear magnetization region 60B1 need only have the number of the magnetization straight lines 60B1*a* that contribute to specifying the position of the magnetic head 28 on the magnetic tape MT, and the linear magnetization region 60B2 need only have the number of the magnetization straight lines 60B2*a* that contribute to specifying the position of the magnetic head 28 on the magnetic tape MT.

Here, the geometrical characteristic of the linear magnetization region pair 60A on the magnetic tape MT will be described with reference to FIG. 20.

Figure 20:
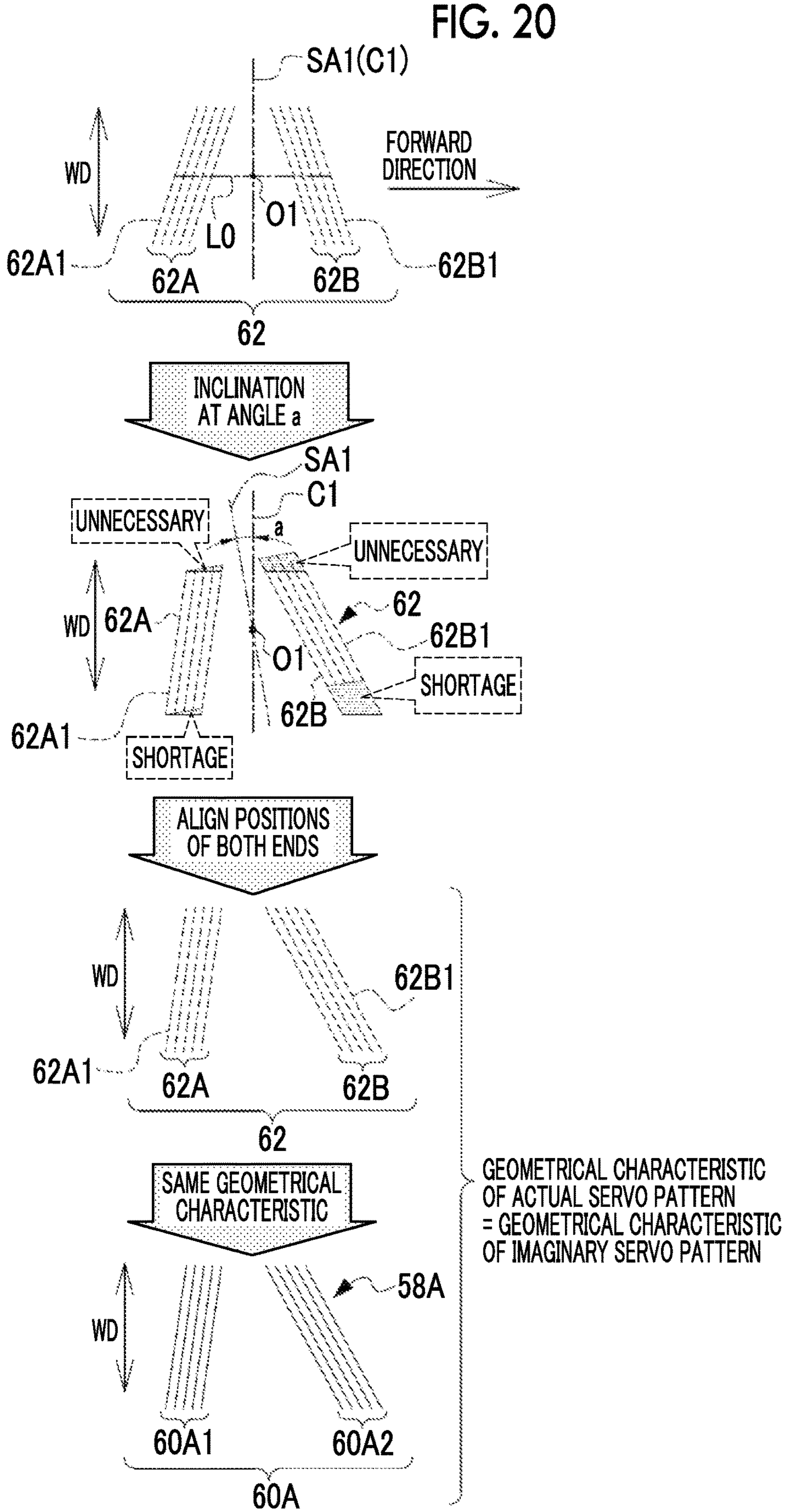
FIG. 20 is a conceptual diagram showing the first modification example, and is a conceptual diagram showing a relationship between a geometrical characteristic of an actual servo pattern and a geometrical characteristic of an imaginary servo pattern.

As an example, as shown in FIG. 20, the geometrical characteristic of the linear magnetization region pair 60A on the magnetic tape MT can be expressed by using an imaginary linear region pair 62. The imaginary linear region pair 62 consists of an imaginary linear region 62A and an imaginary linear region 62B. The geometrical characteristic of the linear magnetization region pair 60A on the magnetic tape MT corresponds to the geometrical characteristic based on the imaginary linear region pair 62 inclined line-symmetrically with respect to the imaginary straight line C1 in a case in which an entirety of the imaginary linear region pair 62 is inclined with respect to the imaginary straight line C1 by inclining a symmetry axis SA1 of the imaginary linear region 62A and the imaginary linear region 62B with respect to the imaginary straight line C1.

The imaginary linear region pair 62 is an imaginary linear magnetization region pair having the same geometrical characteristic as the linear magnetization region pair 54A shown in FIG. 8. The imaginary linear region pair 62 is an imaginary magnetization region used for convenience for describing the geometrical characteristic of the linear magnetization region pair 60A on the magnetic tape MT, and is not an actually present magnetization region.

The imaginary linear region 62A has the same geometrical characteristic as the linear magnetization region 54A1 shown in FIG. 8, and consists of five imaginary straight lines 62A1 corresponding to the five magnetization straight lines 54A1*a* shown in FIG. 8. The imaginary linear region 62B has the same geometrical characteristic as the linear magnetization region 54B1 shown in FIG. 8, and consists of five imaginary straight lines 62B1 corresponding to the five magnetization straight lines 54A2*a* shown in FIG. 8.

A center O1 is provided in the imaginary linear region pair 62. For example, the center O1 is a center of a line segment L0 connecting a center of the straight line 62A1 positioned on the most upstream side of the five straight lines 62A1 in the forward direction and a center of the straight line 62B1 positioned on the most downstream side of the five straight lines 62B1 in the forward direction.

Since the imaginary linear region pair 62 has the same geometrical characteristic as the linear magnetization region pair 54A shown in FIG. 8, the imaginary linear region 62A and the imaginary linear region 62B are inclined line-symmetrically with respect to the imaginary straight line C1. Here, a case will be considered in which reading by the servo reading element SR is performed tentatively with respect to the imaginary linear region pair 62 in a case in which the entirety of the imaginary linear region pair 62 is inclined with respect to the imaginary straight line C1 by inclining the symmetry axis SA1 of the imaginary linear regions 62A and 62B at an angle α (for example, 10 degrees) with respect to the imaginary straight line C1 with the center O1 as the rotation axis. In this case, in the imaginary linear region pair 62, in the width direction WD, a portion is generated in which the imaginary linear region 62A is read but the imaginary linear region 62B is not read or the imaginary linear region 62A is not read is read but the imaginary linear region 62B. That is, in each of the imaginary linear regions 62A and 62B, in a case in which reading by the servo reading element SR is performed, a shortage part and an unnecessary part are generated.

Therefore, by compensating for the shortage part and removing the unnecessary part, the positions of both ends of the imaginary linear region 62A (that is, the positions of both ends of each of the five straight lines 62A1) and the positions of both ends of the imaginary linear region 62B (that is, the positions of both ends of each of the five straight lines 62B1) are aligned in the width direction WD.

The geometrical characteristic of the imaginary linear region pair 62 (that is, the geometrical characteristic of the imaginary servo pattern) obtained as described above corresponds to the geometrical characteristic of the actual servo pattern 58A. That is, the linear magnetization region pair 60A having the geometrical characteristic corresponding to the geometrical characteristic of the imaginary linear region pair 62 obtained by aligning the positions of both ends of the imaginary linear region 62A and the positions of both ends of the imaginary linear region 62B in the width direction WD is recorded in the servo band SB.

It should be noted that the linear magnetization region pair 60B is different from the linear magnetization region pair 60A only in that the four magnetization straight lines 60B1*a* are provided instead of the five magnetization straight lines 60A1*a* and the four magnetization straight lines 60B2*a* are provided instead of the five magnetization straight lines 60A2*a*. Therefore, the linear magnetization region pair 60B having the geometrical characteristic corresponding to the geometrical characteristic of the imaginary linear region pair (not shown) obtained by aligning the positions of both ends of each of the four straight lines 62A1 and the positions of both ends of each of the four straight lines 62B1 in the width direction WD is recorded in the servo band SB.

Figure 21:
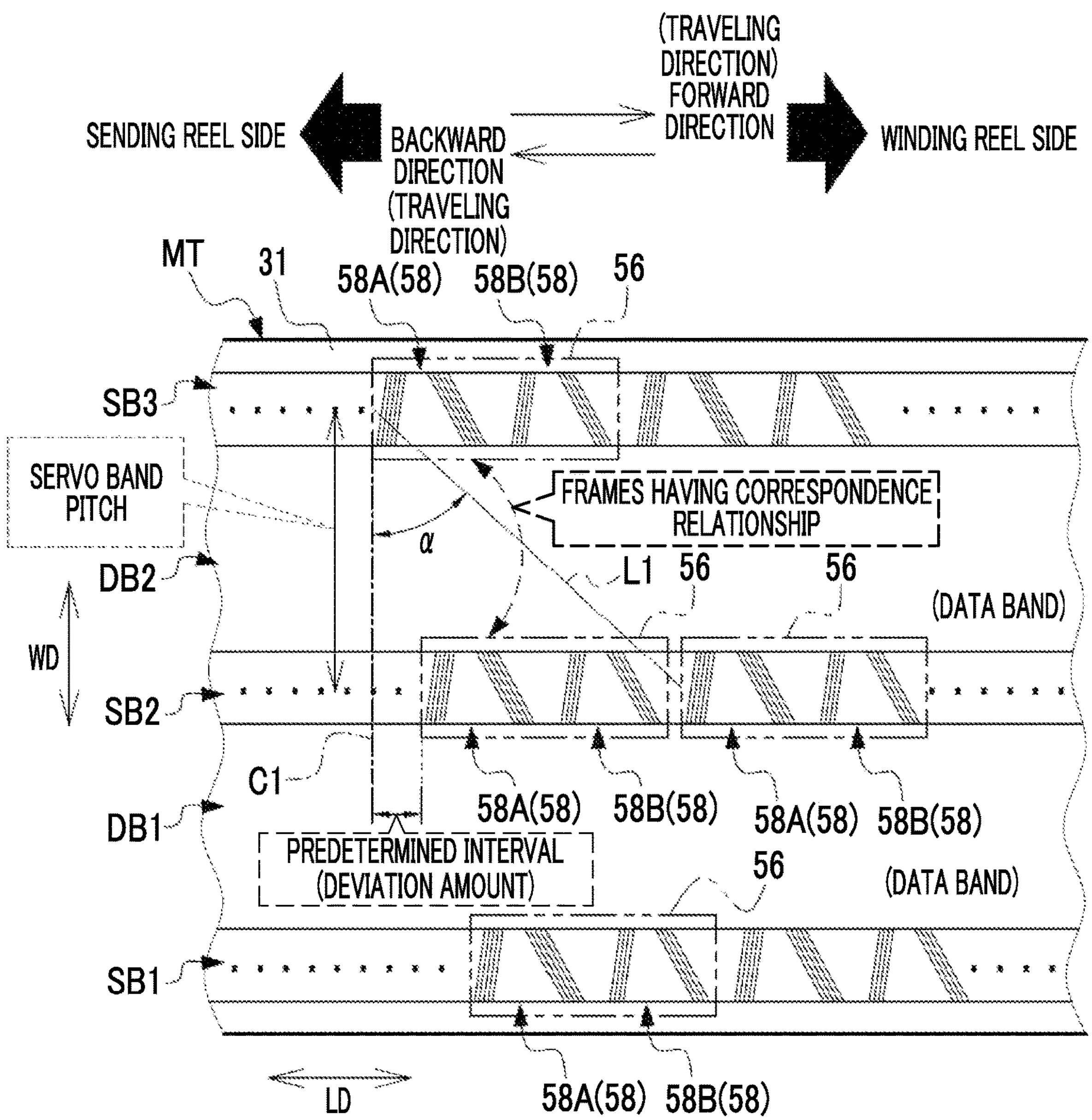
FIG. 21 is a conceptual diagram showing the first modification example, and is a conceptual diagram showing an example of an aspect in which a state in which frames corresponding to each other between the servo bands adjacent to each other in a width direction of the magnetic tape according to the embodiment deviate from each other at a predetermined interval is observed from the front surface side of the magnetic tape.

As an example, as shown in FIG. 21, the plurality of servo bands SB are formed on the magnetic tape MT in the width direction WD, and the frames 56 having a correspondence relationship between the servo bands SB deviate from each other at predetermined intervals in the longitudinal direction LD of the magnetic tape MT, between the servo bands SB adjacent to each other in the width direction WD. This means that the servo patterns 58 having a correspondence relationship between the servo bands SB deviate from each other at the predetermined interval in the longitudinal direction LD between the servo bands SB adjacent to each other in the width direction WD of the magnetic tape MT.

The predetermined interval is defined based on an angle α, a pitch between the servo bands SB adjacent to each other in the width direction WD (hereinafter, also referred to as "servo band pitch"), and a frame length. In the example shown in FIG. 21, the angle α is exaggerated in order to make it easier to visually grasp the angle α, but in reality, the angle α is, for example, about 15 degrees. The angle α is an angle formed by the frames 56 having no correspondence relationship between the servo bands SB adjacent to each other in the width direction WD and the imaginary straight line C1. In the example shown in FIG. 21, as an example of the angle α, an angle formed by an interval (in the example shown in FIG. 21, a line segment L1) between one frame 56 of a pair of frames 56 having the correspondence relationship between the servo bands SB adjacent to each other in the width direction WD (in the example shown in FIG. 21, one frame 56 of the servo band SB3) and the frame 56 adjacent to the other frame 56 of the pair of frames 56 (in the example shown in FIG. 21, the frame 56 having the correspondence relationship with one frame 56 of the servo band SB3 among the plurality of frames 56 in the servo band SB2), and the imaginary straight line C1 is shown. In this case, the frame length refers to the total length of the frame 56 with respect to the longitudinal direction LD of the magnetic tape MT. The predetermined interval is defined by Expression (1). It should be noted that Mod (A/B) means a remainder generated in a case in which "A" is divided by "B".

$$(\text{Predetermined interval})=\text{Mod}\,\{(\text{Servo band pitch}\times\tan\alpha)/(\text{Frame length})\} \quad (1)$$

It should be noted that, in the example shown in FIG. 21, the angle formed by the interval between one frame 56 of the pair of frames 56 having the correspondence relationship between the servo bands SB adjacent to each other in the width direction WD (hereinafter, also referred to as "first frame") and the frame 56 adjacent to the other frame 56 of the pair of frames 56 (hereinafter, also referred to as "second frame"), and the imaginary straight line C1 has been described as the angle α, but the technology of the present disclosure is not limited to this. For example, as the angle α, an angle formed by an interval between the first frame and the frame 56 away from the second frame by two or more frames (hereinafter, also referred to as "third frame") in the same servo band SB as the second frame, and the imaginary straight line C1 may be used. In this case, the "frame length" used in Expression (1) is the pitch between the second frame and the third frame in the longitudinal direction LD of the magnetic tape MT (for example, a distance from the distal end of the second frame to the distal end of the third frame).

Figure 22:
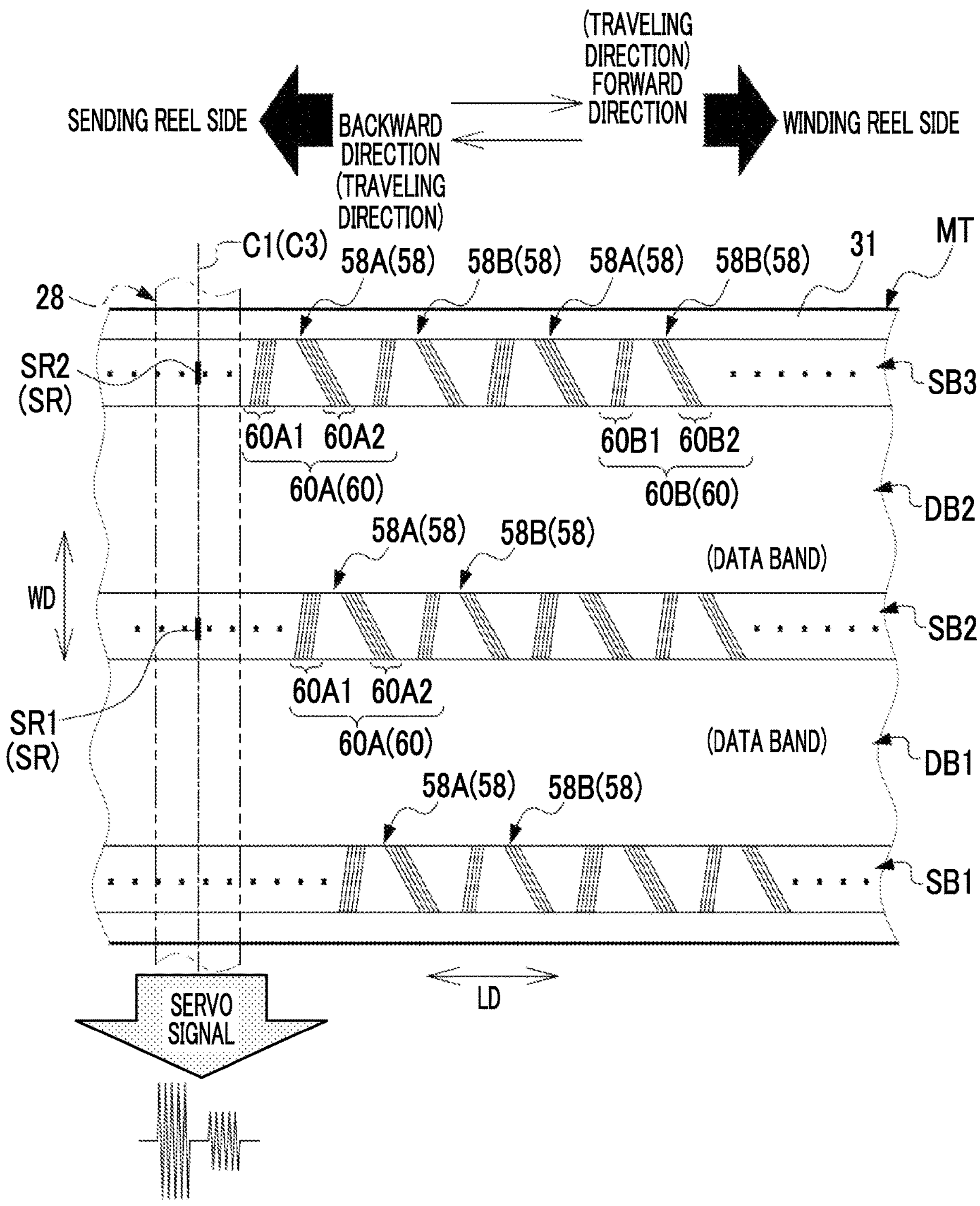
FIG. 22 is a conceptual diagram showing the first modification example, and is a conceptual diagram showing an example of an aspect in which a state in which the servo pattern is read by a servo reading element provided in the magnetic head that is not skewed on the magnetic tape according to the embodiment is observed from the front surface side of the magnetic tape.

As an example, as shown in FIG. 22, in a case in which the servo pattern 58A (that is, the linear magnetization region pair 60A) is read by the servo reading element SR in a state in which the direction of the imaginary straight line C1 and the direction of the imaginary straight line C3 match (that is, a state in which the longitudinal direction of the magnetic head 28 and the width direction WD match), the variation due to the azimuth loss occurs between the servo pattern signal derived from the linear magnetization region 60A1 and the servo pattern signal derived from the linear magnetization region 60A2. In addition, also in a case in which the servo pattern 58B (that is, the linear magnetization region pair 60B) is read by the servo reading element SR in a state in which the direction of the imaginary straight line C1 and the direction of the imaginary straight line C3 match (that is, a state in which the longitudinal direction of the magnetic head 28 and the width direction WD match), a similar phenomenon occurs.

Figure 23:
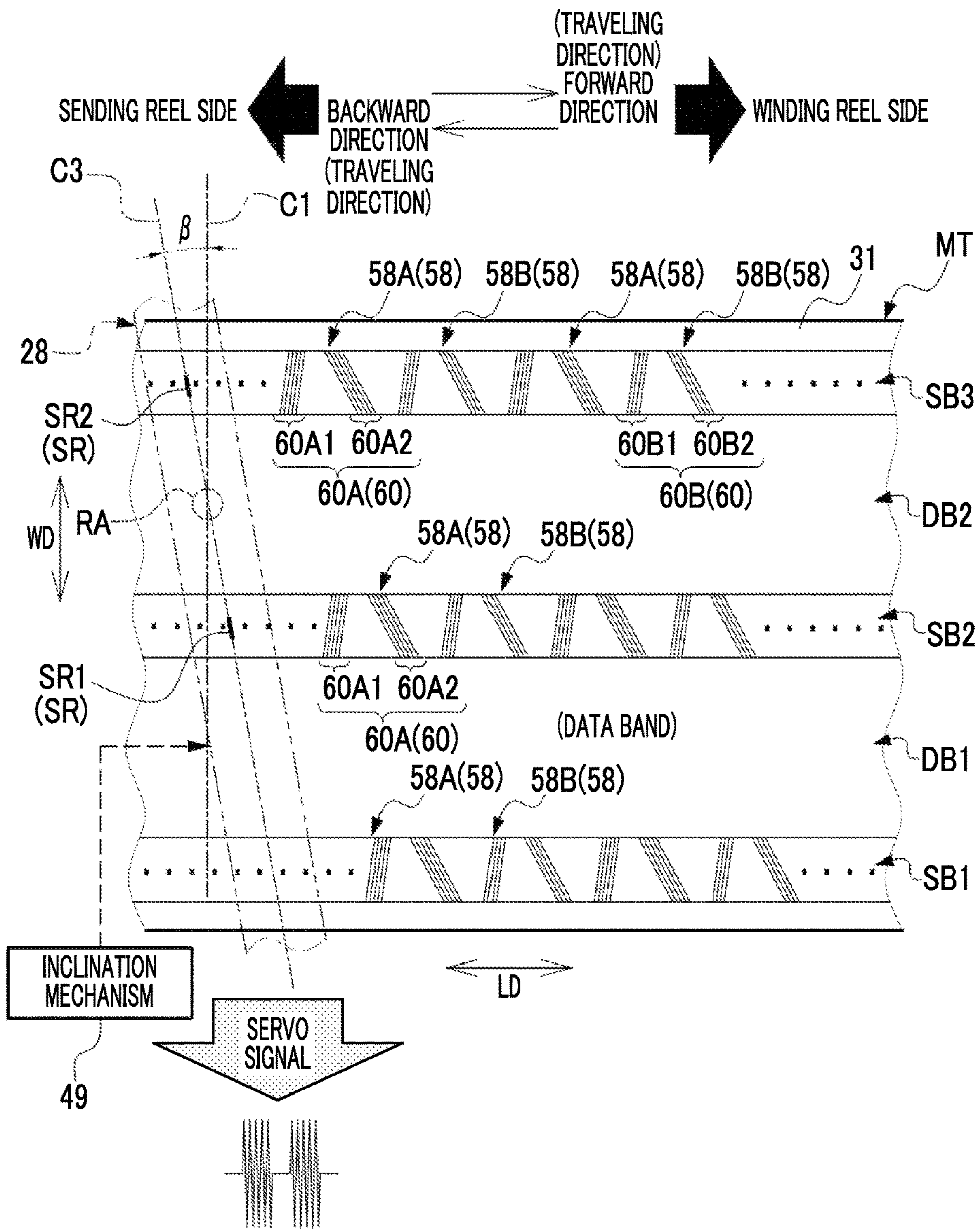
FIG. 23 is a conceptual diagram showing the first modification example, and is a conceptual diagram showing an example of an aspect in which a state in which the servo pattern is read by the servo reading element provided in the magnetic head that is skewed on the magnetic tape according to the embodiment is observed from the front surface side of the magnetic tape.

Therefore, as an example, as shown in FIG. 23, the inclination mechanism 49 (see FIG. 8) skews the magnetic head 28 on the magnetic tape MT around the rotation axis RA such that the imaginary straight line C3 is inclined with respect to the imaginary straight line C1 to the upstream side in the forward direction at an angle β (that is, the angle β counterclockwise as viewed from the paper surface side of FIG. 23). As described above, since the magnetic head 28 is inclined to the upstream side in the forward direction at the angle β on the magnetic tape MT, the variation due to the azimuth loss between the servo pattern signal derived from the linear magnetization region 60A1 and the servo pattern signal derived from the linear magnetization region 60A2 is smaller than that in the example shown in FIG. 22. In addition, also in a case in which the servo pattern 58B (that is, the linear magnetization region pair 60B) is read by the servo reading element SR, similarly, the variation due to the azimuth loss between the servo pattern signal derived from the linear magnetization region 60B1 and the servo pattern signal derived from the linear magnetization region 60B2 is small.

Second Modification Example

Figure 24:
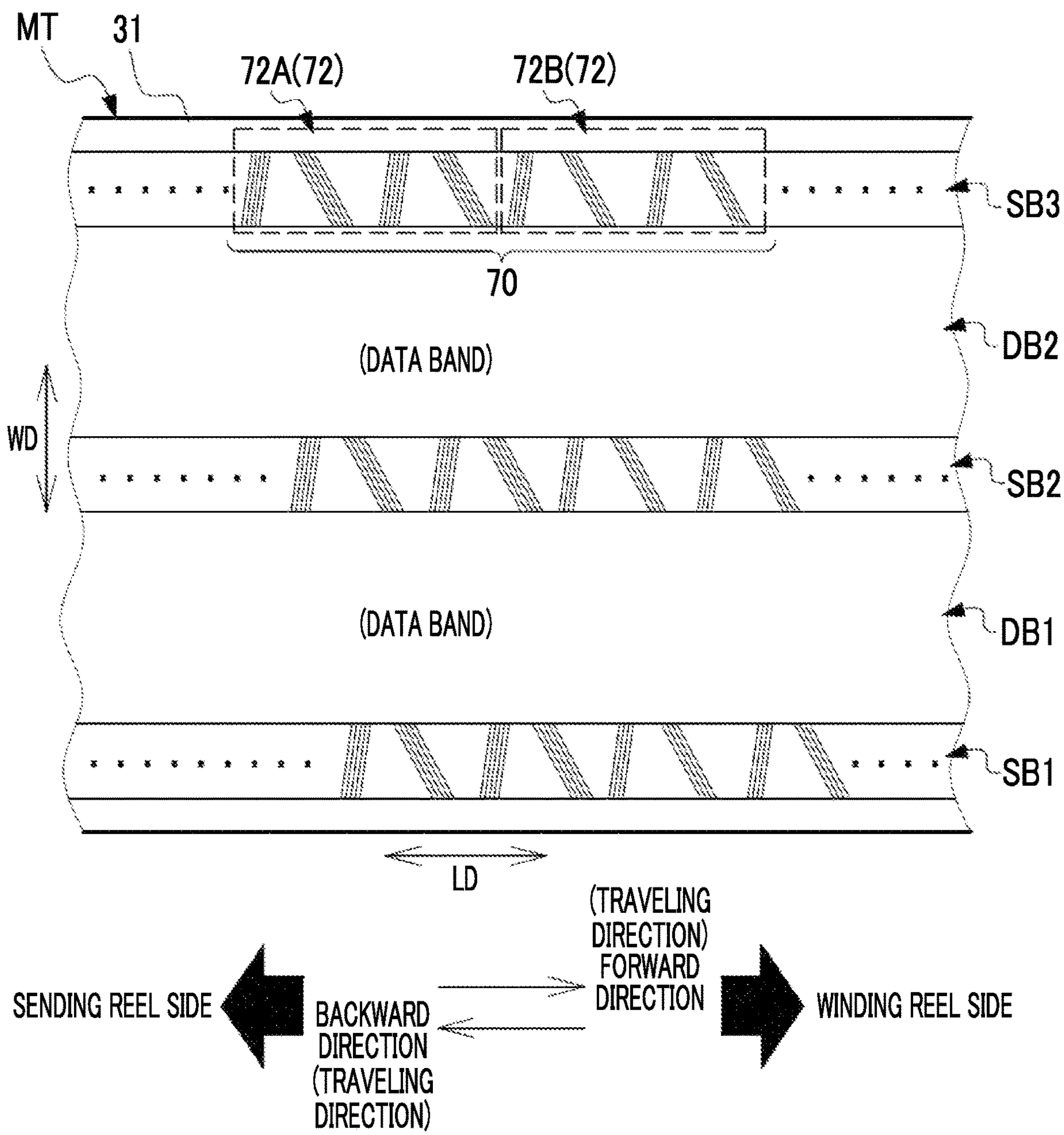
FIG. 24 is a conceptual diagram showing a second modification example, and is a conceptual diagram showing a modification example of the magnetic tape according to the embodiment (conceptual diagram showing an example of an aspect in which the magnetic tape is observed from the front surface side of the magnetic tape)

It should be noted that, in the first modification example described above, the form example has been described in which the servo band SB is divided by the plurality of frames 56 along the longitudinal direction LD of the magnetic tape MT, but the technology of the present disclosure is not limited to this. For example, as shown in FIG. 24, the servo band SB may be divided by a frame 70 along the longitudinal direction LD of the magnetic tape MT. The frame 70 is defined by a set of servo patterns 72. A plurality of servo patterns 72 are recorded in the servo band SB along the longitudinal direction LD of the magnetic tape MT. The plurality of servo patterns 72 are disposed at regular intervals along the longitudinal direction LD of the magnetic tape MT, similarly to the plurality of servo patterns 58.

In the example shown in FIG. 24, servo patterns 72A and 72B are shown as an example of the set of servo patterns 72. Each of the servo patterns 72A and 72B is an M-shaped magnetized servo pattern. The servo patterns 72A and 72B are adjacent to each other along the longitudinal direction LD of the magnetic tape MT, and the servo pattern 72A is positioned on the upstream side in the forward direction and the servo pattern 72B is positioned on the downstream side in the forward direction in the frame 70.

Figure 25:
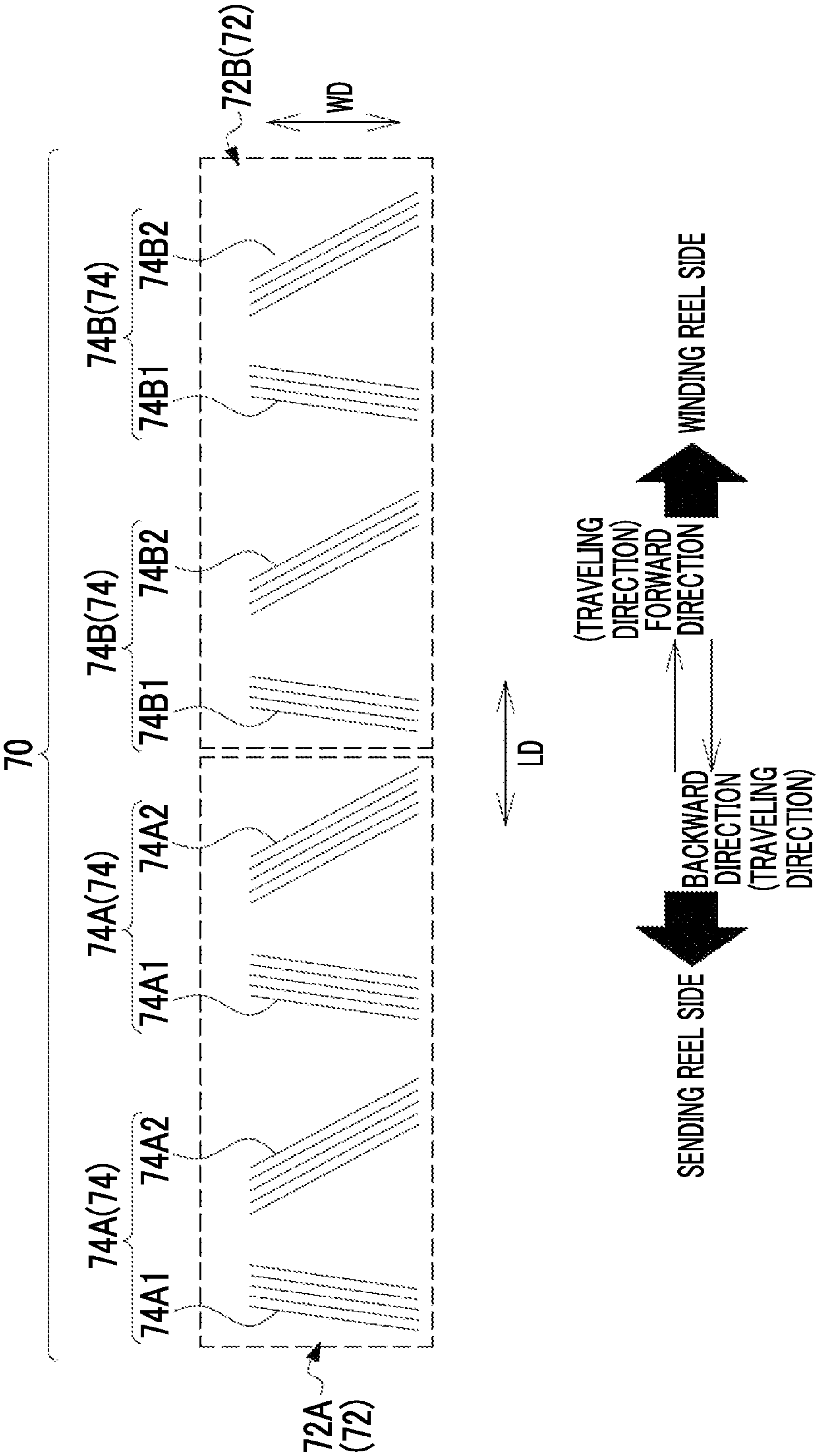
FIG. 25 is a conceptual diagram showing the second modification example, and is a conceptual diagram showing an example of an aspect of the servo pattern included in the magnetic tape.

As an example, as shown in FIG. 25, the servo pattern 72 consists of a linear magnetization region pair 74. The linear magnetization region pair 74 is classified into a linear magnetization region pair 74A and a linear magnetization region pair 74B.

The servo pattern 72A consists of a set of linear magnetization region pairs 74A. The set of linear magnetization region pairs 74A are disposed in a state of being adjacent to each other along the longitudinal direction LD of the magnetic tape MT.

In the example shown in FIG. 25, linear magnetization regions 74A1 and 74A2 are shown as an example of the linear magnetization region pair 74A. The linear magnetization region pair 74A is configured in the same manner as the linear magnetization region pair 60A described in the above first modification example, and has the same geometrical characteristic as the linear magnetization region pair 60A. That is, the linear magnetization region 74A1 is configured in the same manner as the linear magnetization region 60A1 described in the above first modification example, and has the same geometrical characteristic as the linear magnetization region 60A1, and the linear magnetization region 74A2 is configured in the same manner as the linear magnetization region 60A2 described in the above first modification example, and has the same geometrical characteristic as the linear magnetization region 60A2.

The servo pattern 72B consists of a set of linear magnetization region pairs 74B. The set of linear magnetization region pairs 74B are disposed in a state of being adjacent to each other along the longitudinal direction LD of the magnetic tape MT.

In the example shown in FIG. 25, linear magnetization regions 74B1 and 74B2 are shown as an example of the linear magnetization region pair 74B. The linear magnetization region pair 74B is configured in the same manner as the linear magnetization region pair 60B described in the above first modification example, and has the same geometrical characteristic as the linear magnetization region pair 60B. That is, the linear magnetization region 74B1 is configured in the same manner as the linear magnetization region 60B1 described in the above first modification example, and has the same geometrical characteristic as the linear magnetization region 60B1, and the linear magnetization region 74B2 is configured in the same manner as the linear magnetization region 60B2 described in the above first modification example, and has the same geometrical characteristic as the linear magnetization region 60B2.

Third Modification Example

Figure 26:
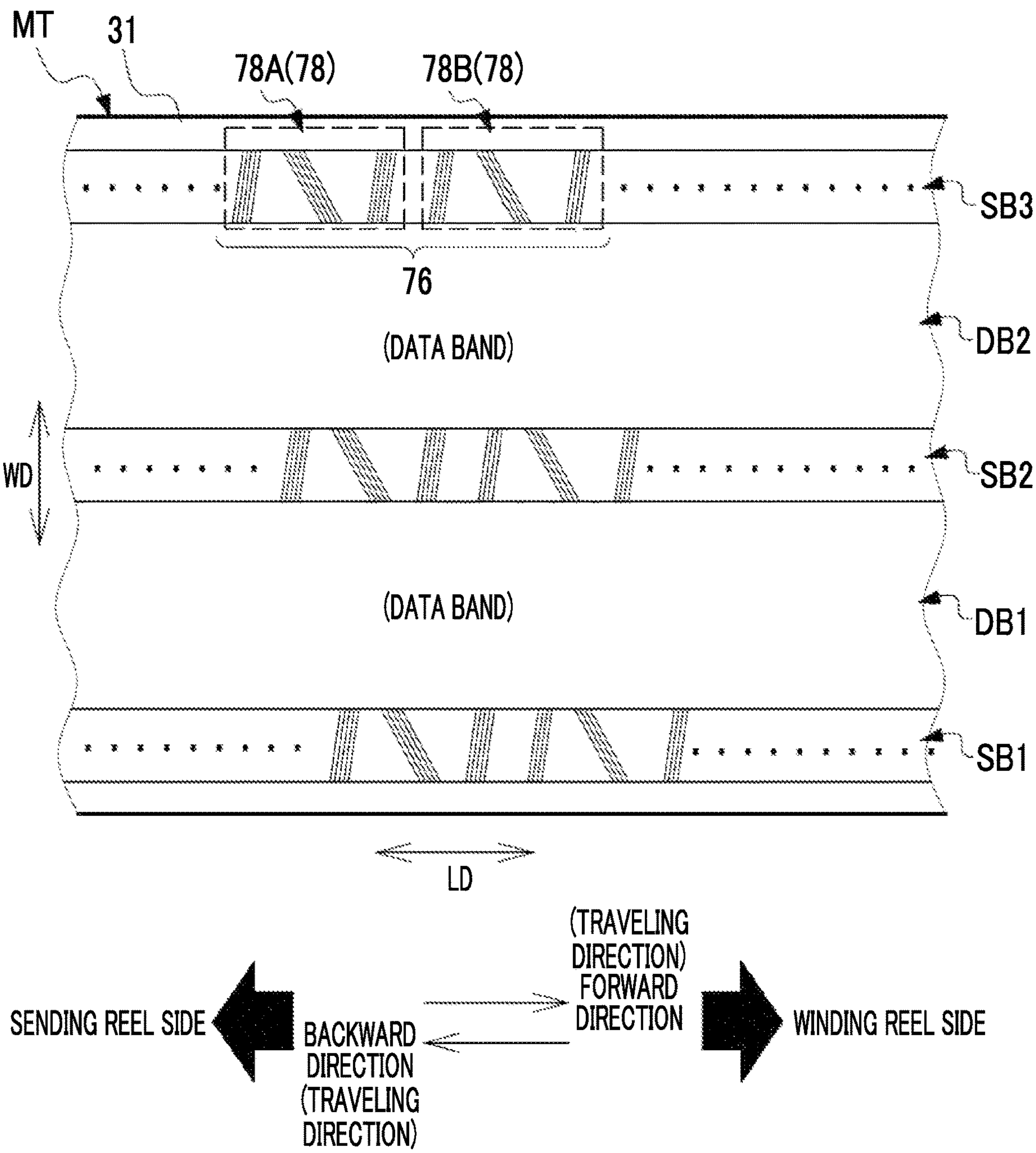
FIG. 26 is a conceptual diagram showing a third modification example, and is a conceptual diagram showing a modification example of the magnetic tape according to the embodiment (conceptual diagram showing an example of an aspect in which the magnetic tape is observed from the front surface side of the magnetic tape)

In the example shown in FIG. 24, the form example has been described in which the servo band SB is divided by a plurality of frames 70 along the longitudinal direction LD of the magnetic tape MT, but the technology of the present disclosure is not limited to this. For example, as shown in FIG. 26, the servo band SB may be divided by a frame 76 along the longitudinal direction LD of the magnetic tape MT. The frame 76 is defined by a set of servo patterns 78. A plurality of servo patterns 78 are recorded in the servo band SB along the longitudinal direction LD of the magnetic tape MT. Similarly to the plurality of servo patterns 72 (see FIG. 24), the plurality of servo patterns 78 are disposed at regular intervals along the longitudinal direction LD of the magnetic tape MT.

In the example shown in FIG. 26, servo patterns 78A and 78B are shown as an example of the set of servo patterns 78. Each of the servo patterns 78A and 78B is an N-shaped magnetized servo pattern. The servo patterns 78A and 78B are adjacent to each other along the longitudinal direction LD of the magnetic tape MT, and the servo pattern 78A is positioned on the upstream side in the forward direction and the servo pattern 78B is positioned on the downstream side in the forward direction in the frame 76.

Figure 27:
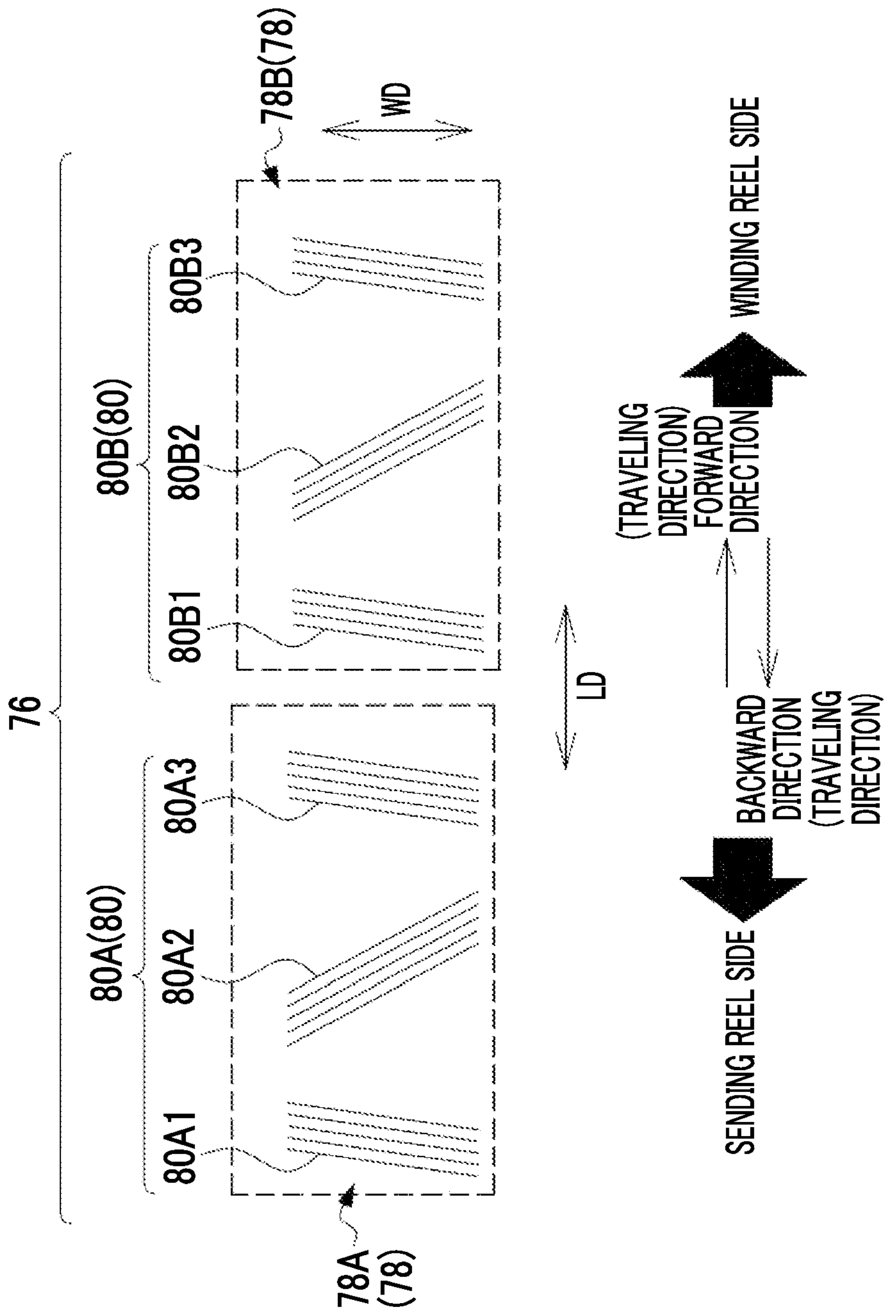
FIG. 27 is a conceptual diagram showing the third modification example, and is a conceptual diagram showing an example of an aspect of the servo pattern included in the magnetic tape.

As an example, as shown in FIG. 27, the servo pattern 78 consists of a linear magnetization region group 80. The linear magnetization region group 80 is classified into a linear magnetization region group 80A and a linear magnetization region group 80B.

The servo pattern 78A consists of the linear magnetization region group 80A. The linear magnetization region group 80A consists of linear magnetization regions 80A1, 80A2, and 80A3. The linear magnetization regions 80A1, 80A2, and 80A3 are disposed in a state of being adjacent to each other along the longitudinal direction LD of the magnetic tape MT. The linear magnetization regions 80A1, 80A2, and 80A3 are disposed in the order of the linear magnetization regions 80A1, 80A2, and 80A3 from the upstream side in the forward direction.

The linear magnetization regions 80A1 and 80A2 are configured in the same manner as the linear magnetization region pair 74A shown in FIG. 25, and have the same geometrical characteristics as the linear magnetization region pair 74A. That is, the linear magnetization region 80A1 is configured in the same manner as the linear magnetization region 74A1 shown in FIG. 25, and have the same geometrical characteristic as the linear magnetization region 74A1, and the linear magnetization region 80A2 is configured in the same manner as the linear magnetization region 74A2 shown in FIG. 25, and have the same geometrical characteristic as the linear magnetization region 74A2. In addition, the linear magnetization region 80A3 is configured in the same manner as the linear magnetization region 80A1, and has the same geometrical characteristic as the linear magnetization region 80A1.

The servo pattern 78B consists of the linear magnetization region group 80B. The linear magnetization region group 80B consists of linear magnetization regions 80B1, 80B2, and 80B3. The linear magnetization regions 80B1, 80B2, and 80B3 are disposed in a state of being adjacent to each other along the longitudinal direction LD of the magnetic tape MT. The linear magnetization regions 80B1, 80B2, and 80B3 are disposed in the order of the linear magnetization regions 80B1, 80B2, and 80B3 from the upstream side in the forward direction.

The linear magnetization regions 80B1 and 80B2 are configured in the same manner as the linear magnetization region pair 74B shown in FIG. 25, and have the same geometrical characteristics as the linear magnetization region pair 74B. That is, the linear magnetization region 80B1 is configured in the same manner as the linear magnetization region 74B1 shown in FIG. 25, and have the same geometrical characteristic as the linear magnetization region 74B1, and the linear magnetization region 80B2 is configured in the same manner as the linear magnetization region 74B2 shown in FIG. 25, and have the same geometrical characteristic as the linear magnetization region 74B2. In addition, the linear magnetization region 80B3 is configured in the same manner as the linear magnetization region 80B1, and has the same geometrical characteristic as the linear magnetization region 80B1.

Fourth Modification Example

Figure 28:
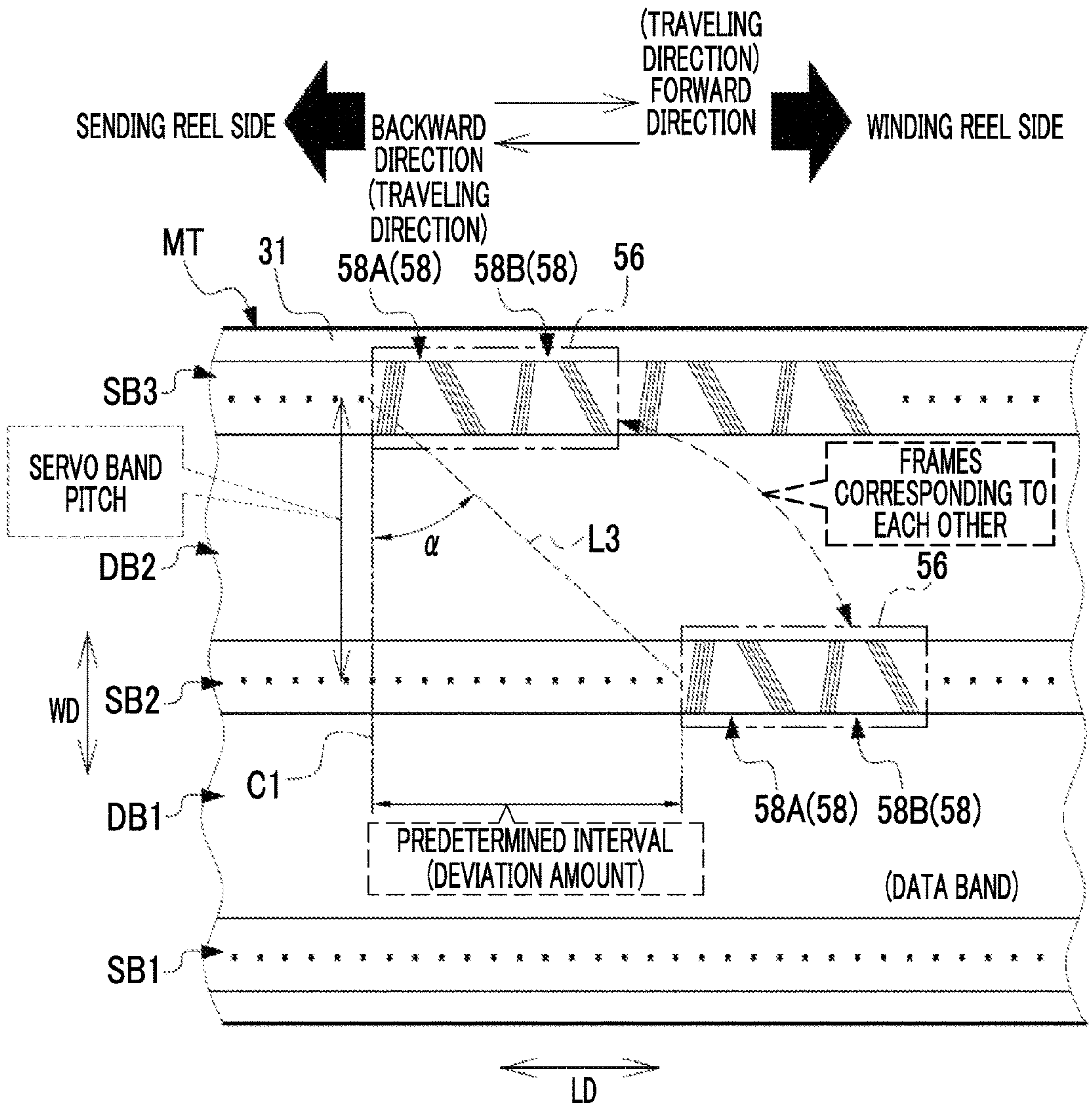
FIG. 28 is a conceptual diagram showing a fourth modification example, and is a conceptual diagram showing an example of an aspect in which a state in which frames corresponding to each other between the servo bands adjacent to each other in the width direction of the magnetic tape according to the embodiment deviate from each other at a predetermined interval is observed from the front surface side of the magnetic tape.

In the first modification example described above, the form example has been described in which the predetermined interval is defined based on the angle α, the servo band pitch, and the frame length, but the technology of the present disclosure is not limited to this, and the predetermined interval may be defined without using the frame length. For example, as shown in FIG. 28, the predetermined interval is defined based on the angle α formed by the interval between the frames 56 having the correspondence relationship between the servo bands SB adjacent to each other in the width direction WD (in the example shown in FIG. 28, a line segment L3) and the imaginary straight line C1, and the pitch between the servo bands SB adjacent to each other in the width direction WD (that is, the servo band pitch). In this case, for example, the predetermined interval is calculated from Expression (2).

$$(\text{Predetermined interval})=(\text{Servo band pitch})\times\tan\alpha \qquad (2)$$

As described above, Expression (2) does not include the frame length. This means that the predetermined interval is calculated even in a case in which the frame length is not considered. Therefore, with the present configuration, the predetermined interval can be calculated more easily than in a case of calculating the predetermined interval from Expression (1).

Fifth Modification Example

It should be noted that, in the first modification example described above, the form example has been described in which the servo band SB is divided by the plurality of frames 56 along the longitudinal direction LD of the magnetic tape MT, but the technology of the present disclosure is not limited to this. For example, as shown in FIG. 29, the servo band SB may be divided by a frame 82 along the longitudinal direction LD of the magnetic tape MT.

The frame 82 is defined by a set of servo patterns 84. A plurality of servo patterns 84 are recorded in the servo band SB along the longitudinal direction LD of the magnetic tape MT. The plurality of servo patterns 84 are disposed at regular intervals along the longitudinal direction LD of the magnetic tape MT, similarly to the plurality of servo patterns 52 (see FIG. 6) recorded in the magnetic tape MT (see FIG. 6).

Figure 29:
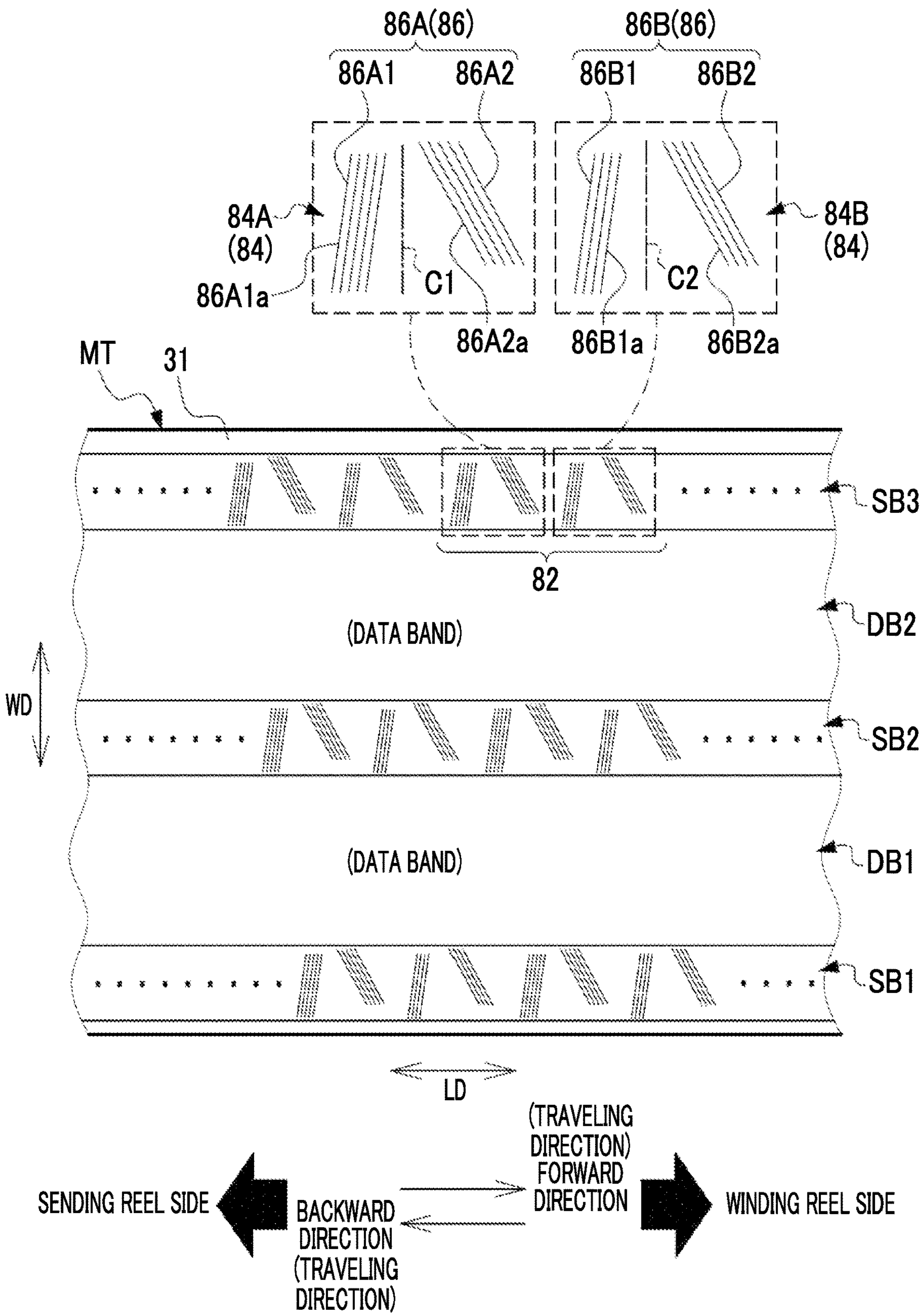
FIG. 29 is a conceptual diagram showing a fifth modification example, and is a conceptual diagram showing a modification example of the magnetic tape according to the embodiment (conceptual diagram showing an example of an aspect in which the magnetic tape is observed from the front surface side of the magnetic tape)

In the example shown in FIG. 29, servo patterns 84A and 84B are shown as an example of the set of servo patterns 84 included in the frame 82. The servo patterns 84A and 84B are adjacent to each other along the longitudinal direction LD of the magnetic tape MT, and the servo pattern 84A is positioned on the upstream side in the forward direction in the frame 82, and the servo pattern 84B is positioned on the downstream side in the forward direction.

The servo pattern 84A consists of the linear magnetization region pair 86A. In the example shown in FIG. 29, linear magnetization regions 86A1 and 86A2 are shown as an example of the linear magnetization region pair 86A. Each of the linear magnetization regions 86A1 and 86A2 is a linearly magnetized region.

The linear magnetization regions 86A1 and 86A2 are inclined in opposite directions with respect to the imaginary straight line C1. The linear magnetization regions 86A1 and 86A2 are not parallel to each other and are inclined at different angles with respect to the imaginary straight line C1. The linear magnetization region 86A1 has a steeper inclined angle with respect to the imaginary straight line C1 than the linear magnetization region 86A2. Here, "steep" means that, for example, an angle of the linear magnetization region 86A1 with respect to the imaginary straight line C1 is smaller than an angle of the linear magnetization region 86A2 with respect to the imaginary straight line C1.

In addition, the overall position of the linear magnetization region 86A1 and the overall position of the linear magnetization region 86A2 deviate from each other in the width direction WD. That is, the position of one end of the linear magnetization region 86A1 and the position of one end of the linear magnetization region 86A2 are not uniform in the width direction WD, and the position of the other end of the linear magnetization region 86A1 and the position of the other end of the linear magnetization region 86A2 are not uniform in the width direction WD.

In the servo pattern 84A, a plurality of magnetization straight lines 86A1*a* are included in the linear magnetization region 86A1, and a plurality of magnetization straight lines 86A2*a* are included in the linear magnetization region 86A2. The number of the magnetization straight lines 86A1*a* included in the linear magnetization region 86A1 is the same as the number of the magnetization straight lines 86A2*a* included in the linear magnetization region 86A2.

The linear magnetization region 86A1 is a set of magnetization straight lines 86A1*a*, which are five magnetized straight lines, and the linear magnetization region 86A2 is a set of magnetization straight lines 86A2*a*, which are five magnetized straight lines.

In the servo band SB, the position of one end of each of all the magnetization straight lines 86A1*a* included in the linear magnetization region 86A1 in the width direction WD is aligned, and the position of the other end of each of all the magnetization straight lines 86A1*a* included in the linear magnetization region 86A1 in the width direction WD is also aligned. In addition, in the servo band SB, the position of one end of each of all the magnetization straight lines 86A2*a* included in the linear magnetization region 86A2 in the width direction WD is aligned, and the position of the other end of each of all the magnetization straight lines 86A2*a* included in the linear magnetization region 86A2 in the width direction WD is also aligned.

The servo pattern 84B consists of the linear magnetization region pair 86B. In the example shown in FIG. 29, linear magnetization regions 86B1 and 86B2 are shown as an example of the linear magnetization region pair 86B. Each of the linear magnetization regions 86B1 and 86B2 is a linearly magnetized region.

The linear magnetization regions 86B1 and 86B2 are inclined in opposite directions with respect to the imaginary straight line C2. The linear magnetization regions 86B1 and 86B2 are not parallel to each other and are inclined at different angles with respect to the imaginary straight line C2. The linear magnetization region 86B1 has a steeper inclined angle with respect to the imaginary straight line C2 than the linear magnetization region 86B2. Here, "steep" means that, for example, an angle of the linear magnetization region 86B1 with respect to the imaginary straight line C2 is smaller than an angle of the linear magnetization region 86B2 with respect to the imaginary straight line C2.

In addition, the overall position of the linear magnetization region 86B1 and the overall position of the linear magnetization region 86B2 deviate from each other in the width direction WD. That is, the position of one end of the linear magnetization region 86B1 and the position of one end of the linear magnetization region 86B2 are not uniform in the width direction WD, and the position of the other end of the linear magnetization region 86B1 and the position of the other end of the linear magnetization region 86B2 are not uniform in the width direction WD.

In the servo pattern 84B, a plurality of magnetization straight lines 86B1*a* are included in the linear magnetization region 86B1, and a plurality of magnetization straight lines 86B2*a* are included in the linear magnetization region 86B2. The number of the magnetization straight lines 86B1*a* included in the linear magnetization region 86B1 is the same as the number of the magnetization straight lines 86B2*a* included in the linear magnetization region 86B2.

The total number of the magnetization straight lines 86B1*a* and 86B2*a* included in the servo pattern 84B is different from the total number of the magnetization straight lines 86A1*a* and 86A2*a* included in the servo pattern 84A. In the example shown in FIG. 29, the total number of the magnetization straight lines 86A1*a* and 86A2*a* included in the servo pattern 84A is ten, whereas the total number of the magnetization straight lines 86B1*a* and 86B2*a* included in the servo pattern 84B is eight.

The linear magnetization region 86B1 is a set of magnetization straight lines 86B1*a*, which are four magnetized straight lines, and the linear magnetization region 86B2 is a set of magnetization straight lines 86B2*a*, which are four magnetized straight lines.

In the servo band SB, the position of one end of each of all the magnetization straight lines 86B1*a* included in the linear magnetization region 86B1 in the width direction WD is aligned, and the position of the other end of each of all the magnetization straight lines 86B1*a* included in the linear magnetization region 86B1 in the width direction WD is also aligned. In addition, in the servo band SB, the position of one end of each of all the magnetization straight lines 86B2*a* included in the linear magnetization region 86B2 in the width direction WD is aligned, and the position of the other end of each of all the magnetization straight lines 86B2*a* included in the linear magnetization region 86B2 in the width direction WD is also aligned.

It should be noted that, here, the set of magnetization straight lines 86A1*a*, which are five magnetized straight lines, is described as an example of the linear magnetization region 86A1, the set of magnetization straight lines 86A2*a*, which are five magnetized straight lines, is described as an example of the linear magnetization region 86A2, the set of magnetization straight lines 86B1*a*, which are four magnetized straight lines, is described as an example of the linear magnetization region 86B1, and the set of magnetization straight lines 86B2*a*, which are four magnetized straight lines, is described as an example of the linear magnetization region 86B2, but the technology of the present disclosure is not limited thereto. For example, the linear magnetization region 86A1 need only have the number of the magnetization straight lines 86A1*a* that contribute to specifying the position of the magnetic head 28 on the magnetic tape MT, the linear magnetization region 86A2 need only have the number of the magnetization straight lines 86A2*a* that contribute to specifying the position of the magnetic head 28 on the magnetic tape MT, the linear magnetization region 86B1 need only have the number of the magnetization straight lines 86B1*a* that contribute to specifying the position of the magnetic head 28 on the magnetic tape MT, and the linear magnetization region 86B2 need only have the number of the magnetization straight lines 86B2*a* that contribute to specifying the position of the magnetic head 28 on the magnetic tape MT.

Here, the geometrical characteristic of the linear magnetization region pair 86A on the magnetic tape MT will be described with reference to FIG. 30.

Figure 30:
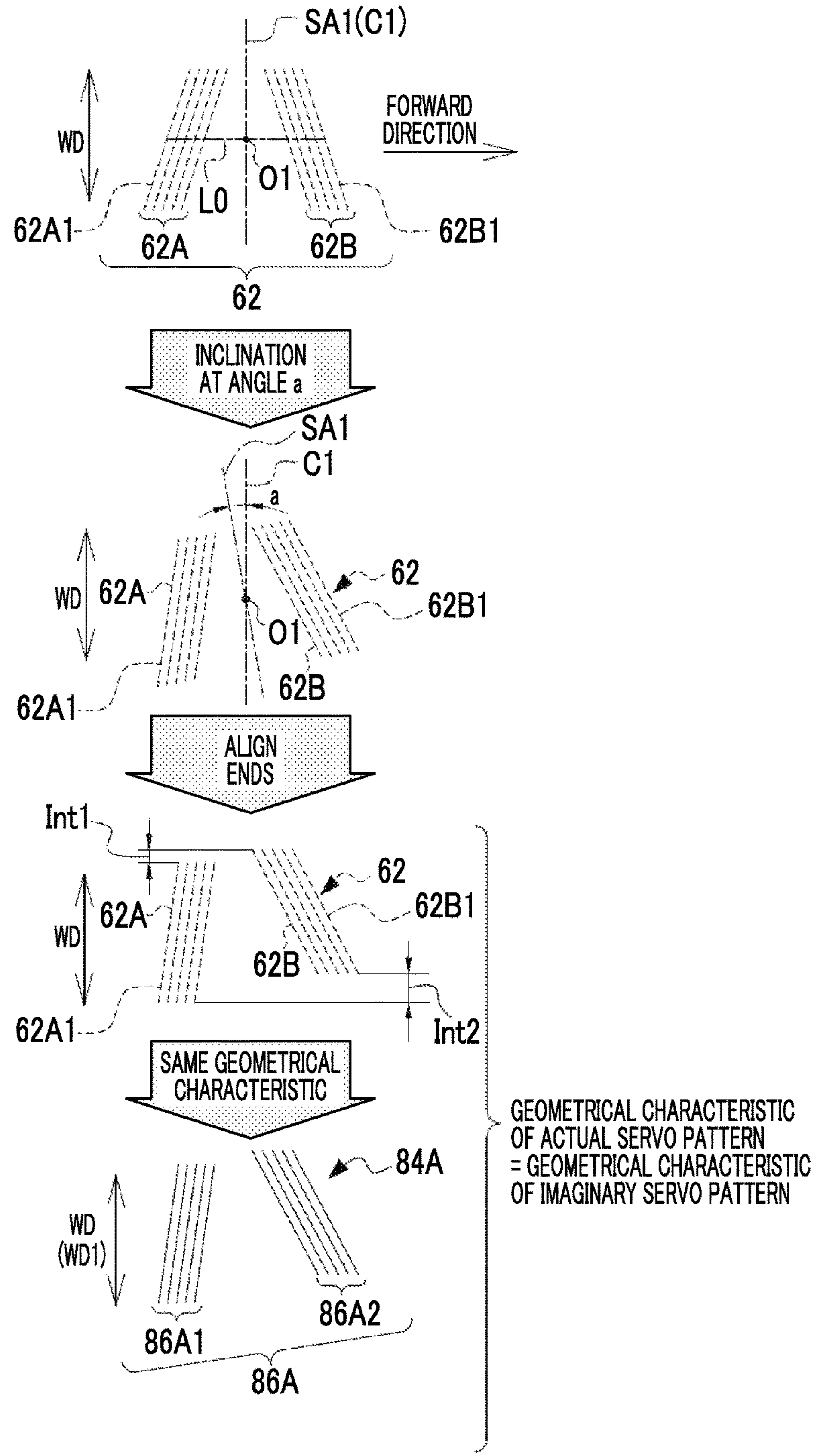
FIG. 30 is a conceptual diagram showing the fifth modification example, and is a conceptual diagram showing a relationship between a geometrical characteristic of an actual servo pattern and a geometrical characteristic of an imaginary servo pattern.

As an example, as shown in FIG. 30, the geometrical characteristic of the linear magnetization region pair 86A on the magnetic tape MT can be expressed by using an imaginary linear region pair 62. Here, the entirety of the imaginary linear region pair 62 is inclined with respect to the imaginary straight line C1 by inclining the symmetry axis SA1 of the imaginary linear regions 62A and 62B at an angle α (for example, 10 degrees) with respect to the imaginary straight line C1 with the center O1 as the rotation axis. Moreover, the position of one end of each of all the straight lines 62A1 included in the imaginary linear region 62A of the imaginary linear region pair 62 in this state in the width direction WD is aligned, and the position of the other end of each of all the straight lines 62A1 included in the imaginary linear region 62A in the width direction WD is also aligned. In addition, similarly, the position of one end of each of all the straight lines 62B1 included in the imaginary linear region 62B of the imaginary linear region pair 62 in the width direction WD is aligned, and the position of the other end of each of all the straight lines 62B1 included in the imaginary linear region 62B in the width direction WD is also aligned. As a result, the imaginary linear region 62A and the imaginary linear region 62B deviate from each other in the width direction WD.

That is, one end of the imaginary linear region 62A and one end of the imaginary linear region 62B deviate from each other in the width direction WD at a regular interval Int1, and the other end of the imaginary linear region 62A and the other end of the imaginary linear region 62B deviate from each other in the width direction WD at a regular interval Int2.

The geometrical characteristic of the imaginary linear region pair 62 (that is, the geometrical characteristic of the imaginary servo pattern) obtained as described above corresponds to the geometrical characteristic of the actual servo pattern 84A. That is, the geometrical characteristic of the linear magnetization region pair 86A on the magnetic tape MT corresponds to the geometrical characteristic based on the imaginary linear region pair 62 inclined line-symmetrically with respect to the imaginary straight line C1 in a case in which the entirety of the imaginary linear region pair 62 is inclined with respect to the imaginary straight line C1 by inclining a symmetry axis SA1 of the imaginary linear region 62A and the imaginary linear region 62B with respect to the imaginary straight line C1.

The imaginary linear region 62A corresponds to the linear magnetization region 86A1 of the servo pattern 84A, and the imaginary linear region 62B corresponds to the linear magnetization region 86A2 of the servo pattern 84A. Therefore, in the servo band SB, the servo pattern 84A consisting of the linear magnetization region pair 86A in which one end of the linear magnetization region 86A1 and one end of the linear magnetization region 86A2 deviate from each other in the width direction WD at the regular interval Int1, and the other end of the linear magnetization region 86A1 and the other end of the linear magnetization region 86A2 deviate from each other in the width direction WD at the regular interval Int2 is recorded (see FIG. 29).

It should be noted that the linear magnetization region pair 86B is different from the linear magnetization region pair 86A only in that the four magnetization straight lines 86B1*a* are provided instead of the five magnetization straight lines 86A1*a* and the four magnetization straight lines 86B2*a* are provided instead of the five magnetization straight lines 86A2*a* (see FIG. 29). Therefore, in the servo band SB, the servo pattern 84B consisting of the linear magnetization region pair 86B in which one end of the linear magnetization region 86B1 and one end of the linear magnetization region 86B2 deviate from each other in the width direction WD at the regular interval Int1, and the other end of the linear magnetization region 86B1 and the other end of the linear magnetization region 86B2 deviate from each other in the width direction WD at the regular interval Int2 is recorded (see FIG. 29).

Figure 31:
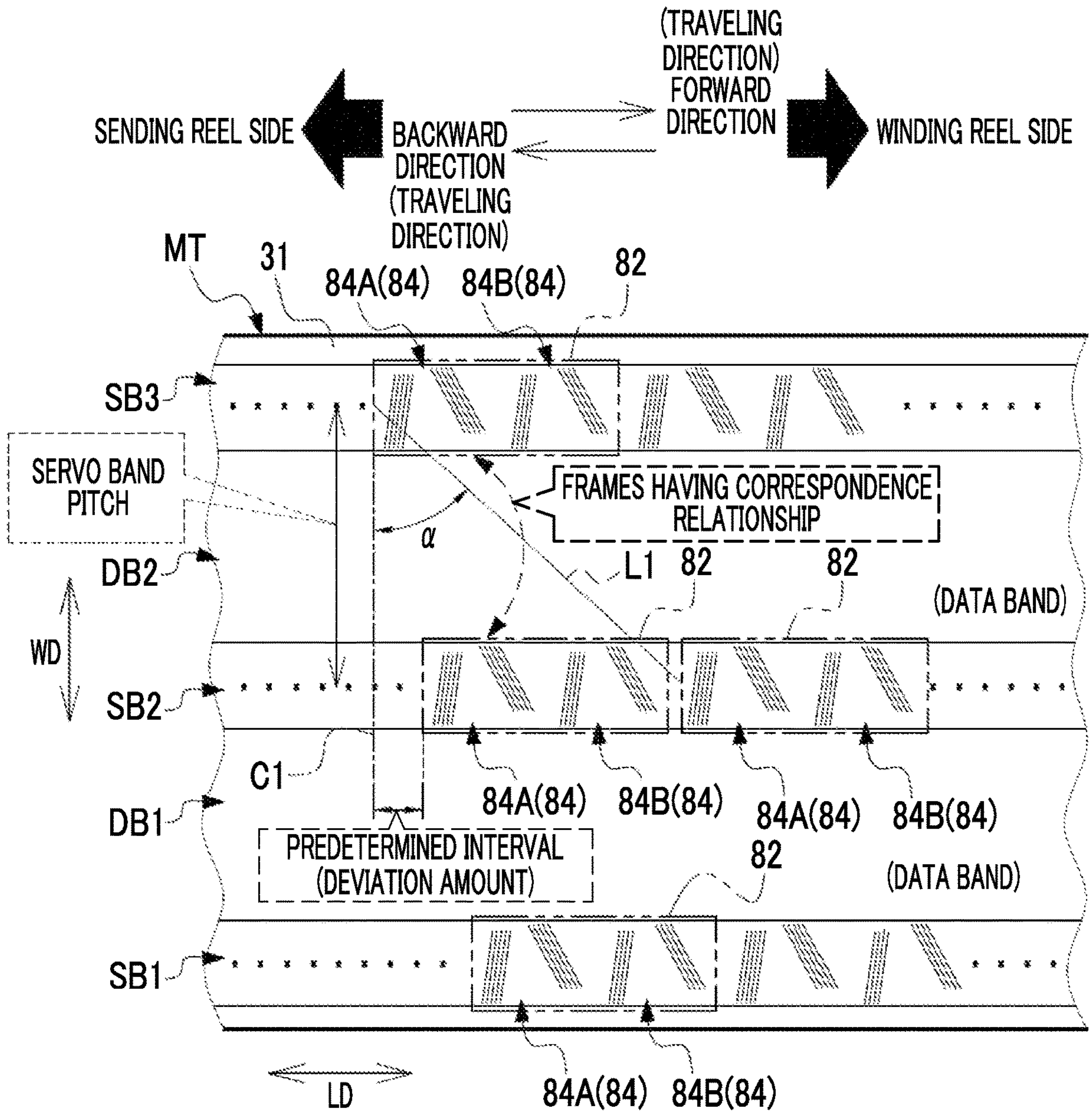
FIG. 31 is a conceptual diagram showing the fifth modification example, and is a conceptual diagram showing an example of an aspect in which a state in which frames corresponding to each other between the servo bands adjacent to each other in a width direction of the magnetic tape according to the embodiment deviate from each other at a predetermined interval is observed from the front surface side of the magnetic tape.

As an example, as shown in FIG. 31, the plurality of servo bands SB are formed on the magnetic tape MT in the width direction WD, and the frames 82 having a correspondence relationship between the servo bands SB deviate from each other at predetermined intervals in the longitudinal direction LD, between the servo bands SB adjacent to each other in the width direction WD of the magnetic tape MT. This means that the servo patterns 84 having a correspondence relationship between the servo bands SB deviate from each other at the predetermined interval described in the above first modification example in the longitudinal direction LD between the servo bands SB adjacent to each other in the width direction WD of the magnetic tape MT. The predetermined interval is defined by Expression (1) described in the first modification example.

Figure 32:
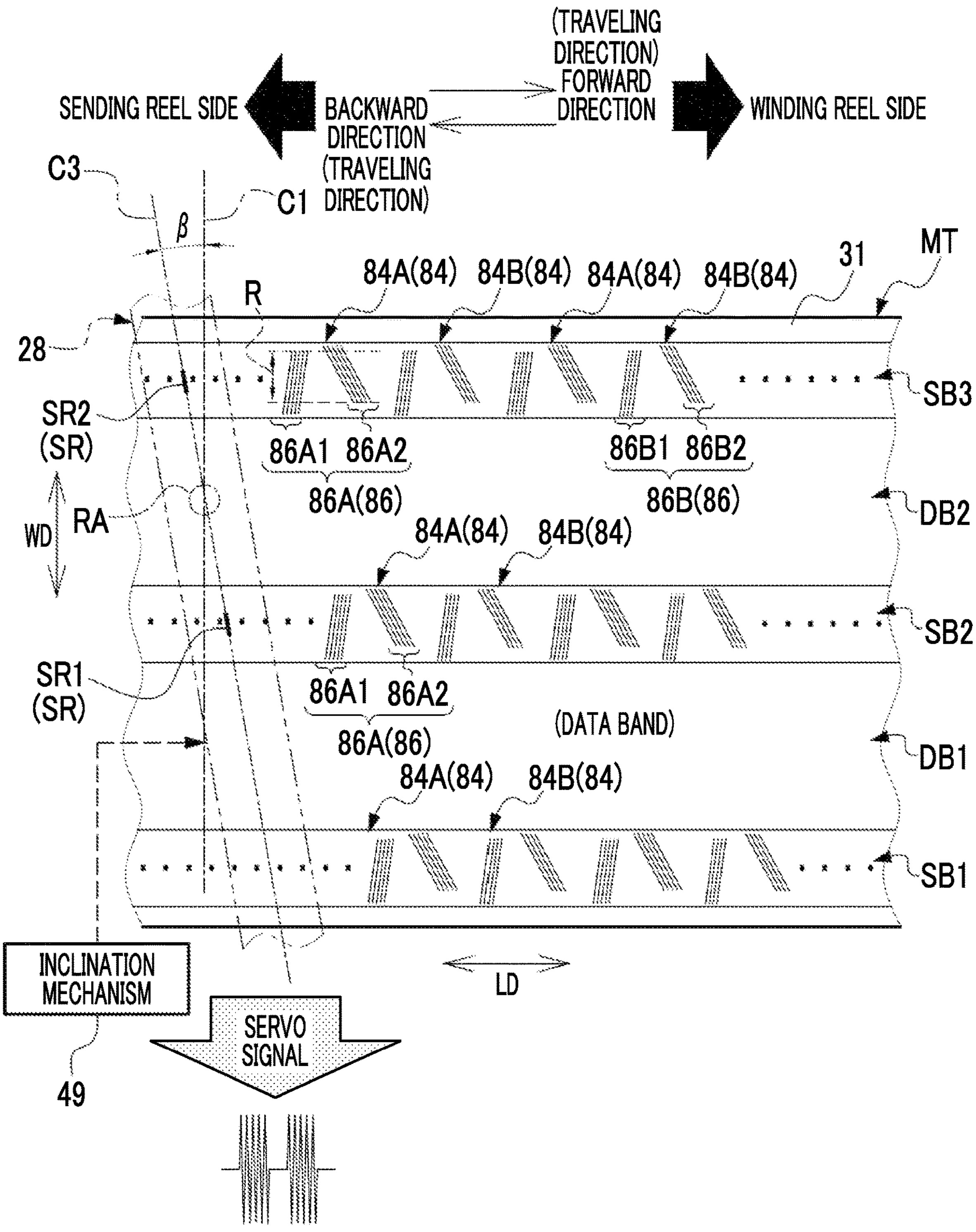
FIG. 32 is a conceptual diagram showing the fifth modification example, and is a conceptual diagram showing an example of an aspect in which a state in which the servo pattern is read by the servo reading element provided in the magnetic head that is skewed on the magnetic tape according to the embodiment is observed from the front surface side of the magnetic tape.

Similarly to the first modification example described above, in the fifth modification example, as shown in FIG. 32 as an example, the inclination mechanism 49 (see FIG. 8) skews the magnetic head 28 on the magnetic tape MT around the rotation axis RA such that the imaginary straight line C3 is inclined with respect to the imaginary straight line C1 to the upstream side in the forward direction at an angle β (that is, the angle β counterclockwise as viewed from the paper surface side of FIG. 32). That is, the magnetic head 28 is inclined at the angle β to the upstream side in the forward direction on the magnetic tape MT. In this state, in a case in which the servo pattern 84A is read by the servo reading element SR along the longitudinal direction LD within a range R in which the linear magnetization regions 86A1 and 86A2 overlap with each other in the width direction WD, the variation due to the azimuth loss between the servo pattern signal derived from the linear magnetization region 86A1 and the servo pattern signal derived from the linear magnetization region 86A2 is smaller than in the examples shown in FIG. 22. In addition, also in a case in which the servo pattern 84B (that is, the linear magnetization region pair 86B) is read by the servo reading element SR, similarly, the variation due to the azimuth loss between the servo pattern signal derived from the linear magnetization region 86B1 and the servo pattern signal derived from the linear magnetization region 86B2 is small.

Sixth Modification Example

It should be noted that, in the fifth modification example described above, the form example has been described in which the servo band SB is divided by a plurality of frames

Figure 33:
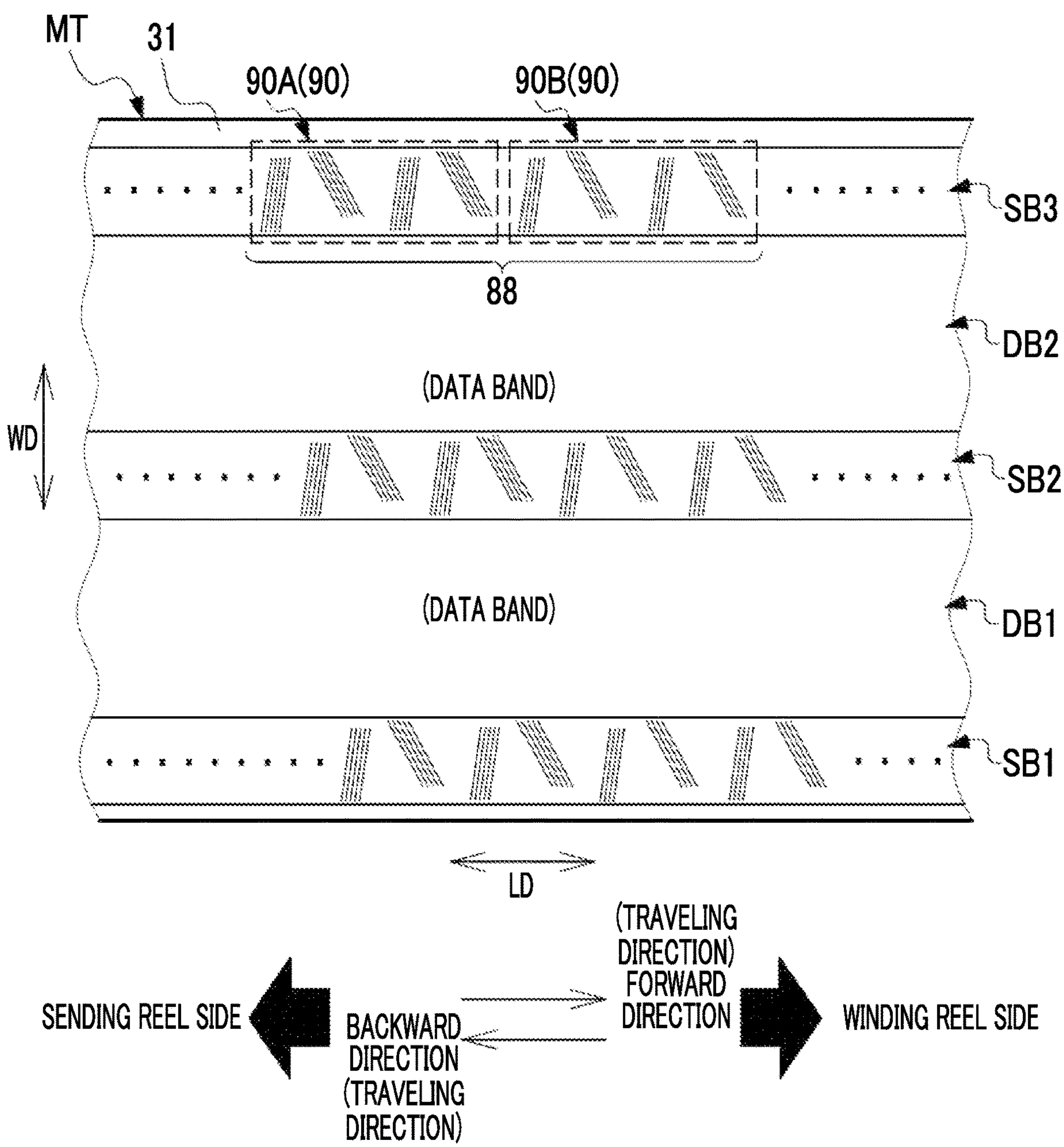
FIG. 33 is a conceptual diagram showing a sixth modification example, and is a conceptual diagram showing a modification example of the magnetic tape according to the embodiment (conceptual diagram showing an example of an aspect in which the magnetic tape is observed from the front surface side of the magnetic tape)

82 along the longitudinal direction LD of the magnetic tape MT, but the technology of the present disclosure is not limited to this. For example, as shown in FIG. 33, the servo band SB may be divided by a frame 88 along the longitudinal direction LD of the magnetic tape MT. The frame 88 is defined by a set of servo patterns 90. A plurality of servo patterns 90 are recorded in the servo band SB along the longitudinal direction LD of the magnetic tape MT. Similarly to the plurality of servo patterns 84 (see FIG. 29), the plurality of servo patterns 90 are disposed at regular intervals along the longitudinal direction LD of the magnetic tape MT.

In the example shown in FIG. 33, servo patterns 90A and 90B are shown as an example of the set of servo patterns 90. Each of the servo patterns 90A and 90B is an M-shaped magnetized servo pattern. The servo patterns 90A and 90B are adjacent to each other along the longitudinal direction LD of the magnetic tape MT, and the servo pattern 90A is positioned on the upstream side in the forward direction in the frame 88, and the servo pattern 90B is positioned on the downstream side in the forward direction.

Figure 34:
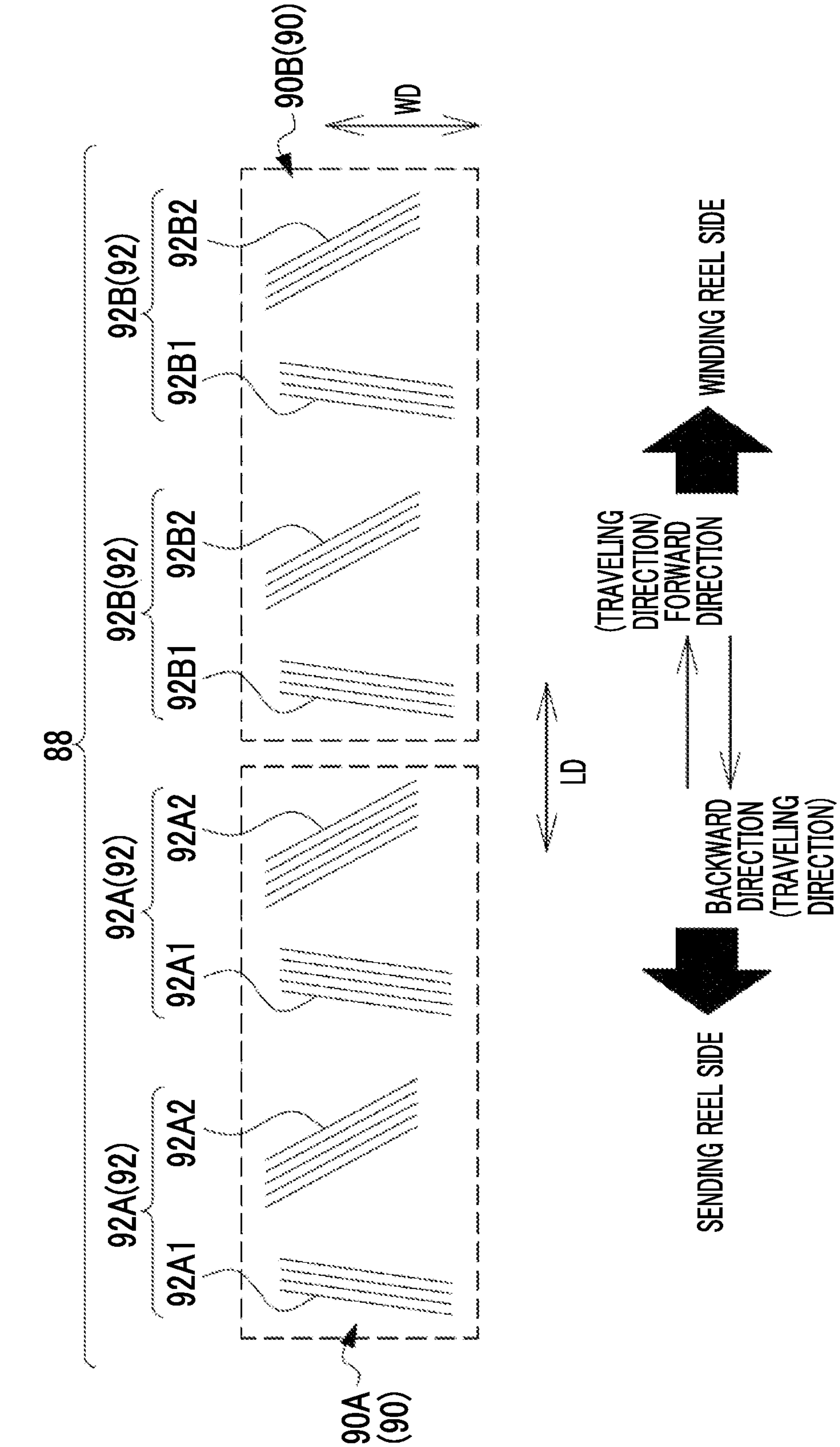
FIG. 34 is a conceptual diagram showing the sixth modification example, and is a conceptual diagram showing an example of an aspect of the servo pattern included in the magnetic tape.

As an example, as shown in FIG. 34, the servo pattern 90 consists of a linear magnetization region pair 92. The linear magnetization region pair 92 is classified into a linear magnetization region pair 92A and a linear magnetization region pair 92B.

The servo pattern 90A consists of a set of linear magnetization region pairs 92A. The set of linear magnetization region pairs 92A are disposed in a state of being adjacent to each other along the longitudinal direction LD of the magnetic tape MT.

In the example shown in FIG. 34, linear magnetization regions 92A1 and 92A2 are shown as an example of the linear magnetization region pair 92A. The linear magnetization region pair 92A is configured in the same manner as the linear magnetization region pair 86A (see FIG. 29) described in the fifth modification example, and has the same geometrical characteristic as the linear magnetization region pair 86A. That is, the linear magnetization region 92A1 is configured in the same manner as the linear magnetization region 86A1 (see FIG. 29) described in the fifth modification example and has the same geometrical characteristic as the linear magnetization region 86A1, and the linear magnetization region 92A2 is configured in the same manner as the linear magnetization region 86A2 (see FIG. 29) described in the fifth modification example and has the same geometrical characteristic as the linear magnetization region 86A2.

The servo pattern 90B consists of a set of linear magnetization region pairs 92B. The set of linear magnetization region pairs 92B are disposed in a state of being adjacent to each other along the longitudinal direction LD of the magnetic tape MT.

In the example shown in FIG. 34, linear magnetization regions 92B1 and 92B2 are shown as an example of the linear magnetization region pair 92B. The linear magnetization region pair 92B is configured in the same manner as the linear magnetization region pair 86B (see FIG. 29) described in the fifth modification example, and has the same geometrical characteristic as the linear magnetization region pair 86B. That is, the linear magnetization region 92B1 is configured in the same manner as the linear magnetization region 86B1 (see FIG. 29) described in the fifth modification example and has the same geometrical characteristic as the linear magnetization region 86B1, and the linear magnetization region 92B2 is configured in the same manner as the linear magnetization region 86B2 (see FIG. 29) described in the fifth modification example and has the same geometrical characteristic as the linear magnetization region 86B2.

Seventh Modification Example

Figure 35:
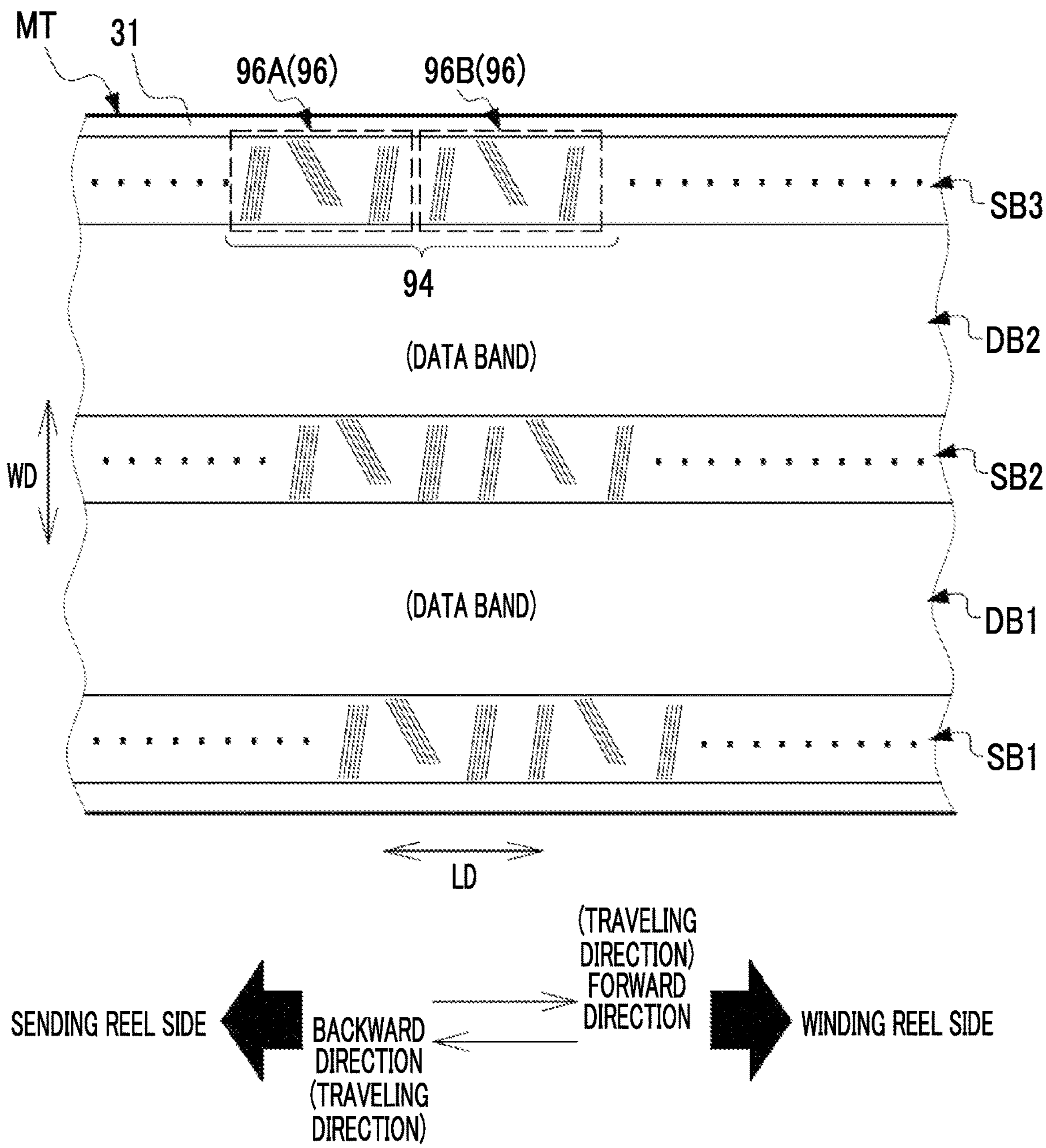
FIG. 35 is a conceptual diagram showing a seventh modification example, and is a conceptual diagram showing a modification example of the magnetic tape according to the embodiment (conceptual diagram showing an example of an aspect in which the magnetic tape is observed from the front surface side of the magnetic tape)

In the example shown in FIG. 33, the form example has been described in which the servo band SB is divided by a plurality of frames 88 along the longitudinal direction LD of the magnetic tape MT, but the technology of the present disclosure is not limited to this. For example, as shown in FIG. 35, the servo band SB may be divided by a frame 94 along the longitudinal direction LD of the magnetic tape MT. The frame 94 is defined by a set of servo patterns 96. A plurality of servo patterns 96 are recorded in the servo band SB along the longitudinal direction LD of the magnetic tape MT. Similarly to the plurality of servo patterns 90 (see FIG. 33), the plurality of servo patterns 96 are disposed at regular intervals along the longitudinal direction LD of the magnetic tape MT.

In the example shown in FIG. 35, servo patterns 96A and 96B are shown as an example of the set of servo patterns 96. Each of the servo patterns 96A and 96B is an N-shaped magnetized servo pattern. The servo patterns 96A and 96B are adjacent to each other along the longitudinal direction LD of the magnetic tape MT, and the servo pattern 96A is positioned on the upstream side in the forward direction in the frame 94, and the servo pattern 96B is positioned on the downstream side in the forward direction.

Figure 36:
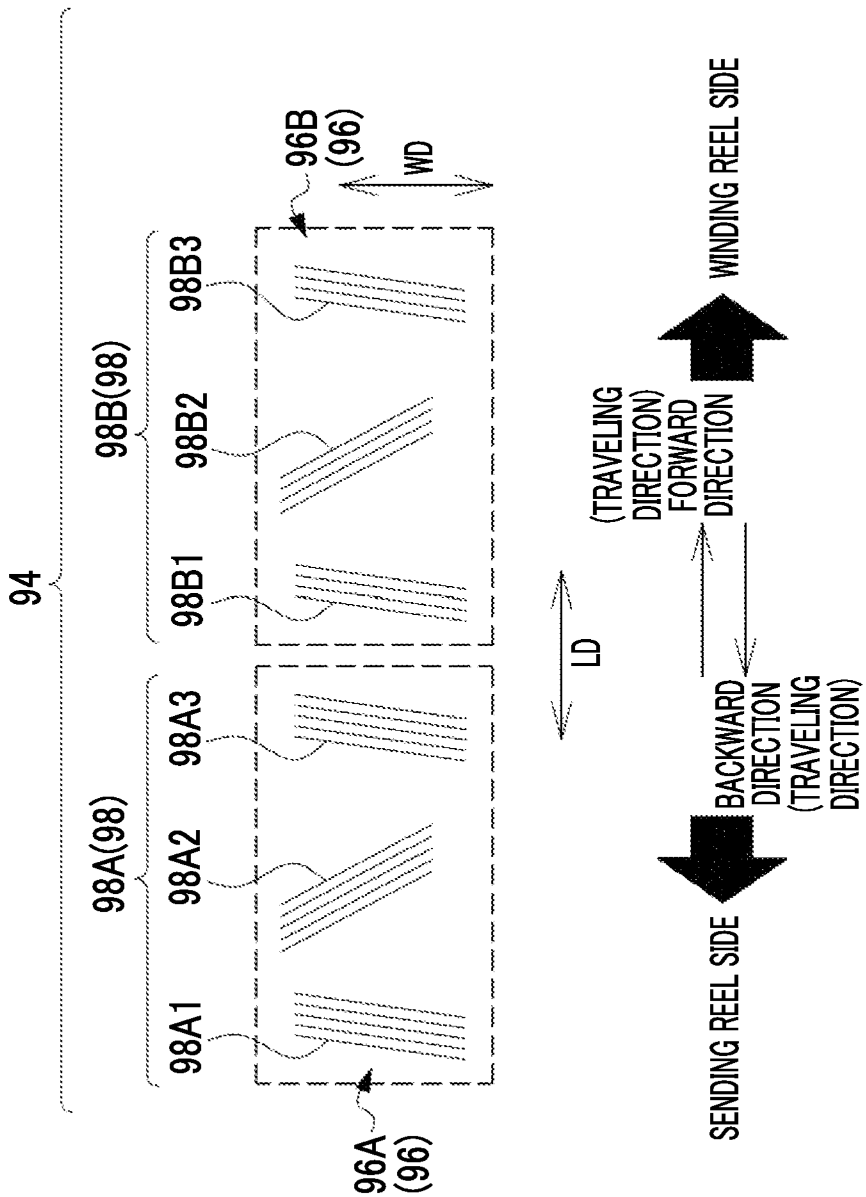
FIG. 36 is a conceptual diagram showing the seventh modification example, and is a conceptual diagram showing an example of an aspect of the servo pattern included in the magnetic tape.

As an example, as shown in FIG. 36, the servo pattern 96 consists of a linear magnetization region group 98. The linear magnetization region group 98 is classified into a linear magnetization region group 98A and a linear magnetization region group 98B.

The servo pattern 96A consists of the linear magnetization region group 98A. The linear magnetization region group 98A consists of linear magnetization regions 98A1, 98A2, and 98A3. The linear magnetization regions 98A1, 98A2, and 98A3 are disposed in a state of being adjacent to each other along the longitudinal direction LD of the magnetic tape MT. The linear magnetization regions 98A1, 98A2, and 98A3 are disposed in the order of the linear magnetization regions 98A1, 98A2, and 98A3 from the upstream side in the forward direction.

The linear magnetization regions 98A1 and 98A2 are configured in the same manner as the linear magnetization region pair 92A shown in FIG. 34, and have the same geometrical characteristics as the linear magnetization region pair 92A. That is, the linear magnetization region 98A1 is configured in the same manner as the linear magnetization region 92A1 shown in FIG. 34, and has the same geometrical characteristic as the linear magnetization region 92A1, and the linear magnetization region 98A2 is configured in the same manner as the linear magnetization region 92A2 shown in FIG. 34, and has the same geometrical characteristic as the linear magnetization region 92A2. In addition, the linear magnetization region 98A3 is configured in the same manner as the linear magnetization region 92A1, and has the same geometrical characteristic as the linear magnetization region 92A1.

The servo pattern 96B consists of the linear magnetization region group 98B. The linear magnetization region group 98B consists of linear magnetization regions 98B1, 98B2, and 98B3. The linear magnetization regions 98B1, 98B2, and 98B3 are disposed in a state of being adjacent to each other along the longitudinal direction LD of the magnetic tape MT. The linear magnetization regions 98B1, 98B2, and 98B3 are disposed in the order of the linear magnetization regions 98B1, 98B2, and 98B3 from the upstream side in the forward direction.

The linear magnetization regions 98B1 and 98B2 are configured in the same manner as the linear magnetization region pair 92B shown in FIG. 34, and have the same geometrical characteristics as the linear magnetization region pair 92B. That is, the linear magnetization region 98B1 is configured in the same manner as the linear magnetization region 92B1 shown in FIG. 34, and has the same geometrical characteristic as the linear magnetization region 92B1, and the linear magnetization region 98B2 is configured in the same manner as the linear magnetization region 92B2 shown in FIG. 34, and has the same geometrical characteristic as the linear magnetization region 92B2. In addition, the linear magnetization region 98B3 is configured in the same manner as the linear magnetization region 92B1, and has the same geometrical characteristic as the linear magnetization region 92B1.

Eighth Modification Example

Figure 37:
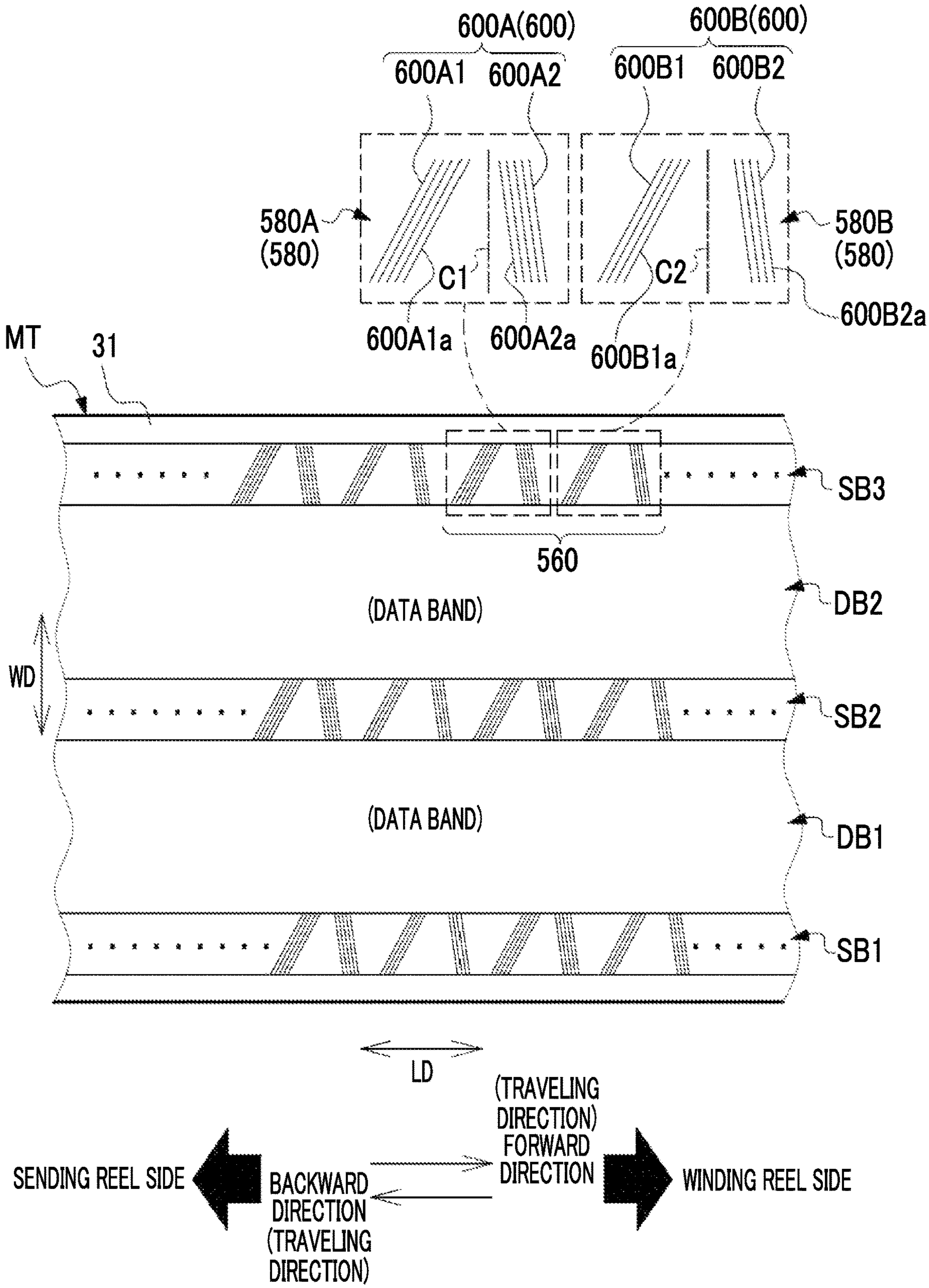
FIG. 37 is a conceptual diagram showing an eighth modification example, and is a conceptual diagram showing a modification example of the magnetic tape according to the embodiment (conceptual diagram showing an example of an aspect in which the magnetic tape is observed from the front surface side of the magnetic tape)

It should be noted that, in the first modification example described above (for example, example shown in FIG. 19), the form example has been described in which the servo band SB is divided by the plurality of frames 56 along the longitudinal direction LD of the magnetic tape MT, but the technology of the present disclosure is not limited to this. For example, as shown in FIG. 37, the servo band SB may be divided by a frame 560 along the longitudinal direction LD of the magnetic tape MT. The frame 560 is defined by a set of servo patterns 580. A plurality of servo patterns 580 are recorded in the servo band SB along the longitudinal direction LD of the magnetic tape MT. The plurality of servo patterns 580 are disposed at regular intervals along the longitudinal direction LD of the magnetic tape MT, similarly to the plurality of servo patterns 58.

The servo pattern 580 consists of a linear magnetization region pair 600. The linear magnetization region pair 600 is classified into a linear magnetization region pair 600A and a linear magnetization region pair 600B. That is, the linear magnetization region pair 600 is different from the linear magnetization region pair 60 (see FIG. 19) in that the linear magnetization region pair 600A is provided instead of the linear magnetization region pair 60A, and the linear magnetization region pair 600B is provided instead of the linear magnetization region pair 60B.

The servo pattern 580A consists of the linear magnetization region pair 600A. The linear magnetization region pair 600A is different from the linear magnetization region pair 60A in that the linear magnetization region 600A1 is provided instead of the linear magnetization region 60A1, and the linear magnetization region 600A2 is provided instead of the linear magnetization region 60A2. Each of the linear magnetization regions 600A1 and 600A2 is a linearly magnetized region.

The linear magnetization regions 600A1 and 600A2 are inclined in opposite directions with respect to the imaginary straight line C1. The linear magnetization regions 600A1 and 600A2 are not parallel to each other and are inclined at different angles with respect to the imaginary straight line C1. The linear magnetization region 600A2 has a steeper inclined angle with respect to the imaginary straight line C1 than the linear magnetization region 600A1. Here, “steep” means that, for example, an angle of the linear magnetization region 600A2 with respect to the imaginary straight line C1 is smaller than an angle of the linear magnetization region 600A1 with respect to the imaginary straight line C1. In addition, a total length of the linear magnetization region 600A2 is shorter than a total length of the linear magnetization region 600A1.

The linear magnetization region 600A1 is different from the linear magnetization region 60A1 in that a plurality of magnetization straight lines 600A1$a$ are provided instead of the plurality of magnetization straight lines 60A1$a$. The linear magnetization region 600A2 is different from the linear magnetization region 60A2 in that a plurality of magnetization straight lines 600A2$a$ are provided instead of the plurality of magnetization straight lines 60A2$a$.

The plurality of magnetization straight lines 600A1$a$ are included in the linear magnetization region 600A1, and the plurality of magnetization straight lines 600A2$a$ are included in the linear magnetization region 600A2. The number of the magnetization straight lines 600A1$a$ included in the linear magnetization region 600A1 is the same as the number of the magnetization straight lines 600A2$a$ included in the linear magnetization region 600A2.

The linear magnetization region 600A1 is a linear magnetization region corresponding to a first line symmetry region. The first line symmetry region refers to a region in which the linear magnetization region 60A2 (see FIG. 19) described in the first modification example is formed line-symmetrically with respect to the imaginary straight line C1. That is, the linear magnetization region 600A1 can be said to be a linear magnetization region formed by a geometrical characteristic of a mirror image of the linear magnetization region 60A2 (see FIG. 19) (that is, geometrical characteristic obtained by performing the mirror image with respect to the linear magnetization region 60A2 (see FIG. 19) with the imaginary straight line C1 as a line symmetry axis).

The linear magnetization region 600A2 is a linear magnetization region corresponding to a second line symmetry region. The second line symmetry region refers to a region in which the linear magnetization region 60A1 (see FIG. 19) described in the first embodiment is formed line-symmetrically with respect to the imaginary straight line C1. That is, the linear magnetization region 600A2 can be said to be a linear magnetization region formed by a geometrical characteristic of a mirror image of the linear magnetization region 60A1 (see FIG. 19) (that is, geometrical characteristic obtained by performing the mirror image with respect to the linear magnetization region 60A1 (see FIG. 19) with the imaginary straight line C1 as a line symmetry axis).

That is, in the example shown in FIG. 20, the geometrical characteristic of the imaginary linear region pair 62 obtained by aligning the positions of both ends of the imaginary linear region 62A and the positions of both ends of the imaginary linear region 62B in a case in which the entirety of the imaginary linear region pair 62 is inclined with respect to the imaginary straight line C1 by inclining the symmetry axis SA1 of the imaginary linear regions 62A and 62B with respect to the imaginary straight line C1 at the angle α clockwise as viewed from the paper surface side of FIG. 20 with the center O1 as the rotation axis corresponds to the geometrical characteristic of the servo pattern 580A.

The servo pattern 580B consists of the linear magnetization region pair 600B. The linear magnetization region pair 600B is different from the linear magnetization region pair 60B in that the linear magnetization region 600B1 is provided instead of the linear magnetization region 60B1, and the linear magnetization region 600B2 is provided instead of the linear magnetization region 60B2. Each of the linear magnetization regions 600B1 and 600B2 is a linearly magnetized region.

The linear magnetization regions 600B1 and 600B2 are inclined in opposite directions with respect to the imaginary straight line C2. The linear magnetization regions 600B1 and 600B2 are not parallel to each other and are inclined at different angles with respect to the imaginary straight line C2. The linear magnetization region 600B2 has a steeper inclined angle with respect to the imaginary straight line C2 than the linear magnetization region 600B1. Here, "steep" means that, for example, an angle of the linear magnetization region 600B2 with respect to the imaginary straight line C2 is smaller than an angle of the linear magnetization region 600B1 with respect to the imaginary straight line C2.

The plurality of magnetization straight lines 600B1*a* are included in the linear magnetization region 600B1, and the plurality of magnetization straight lines 600B2*a* are included in the linear magnetization region 600B2. The number of the magnetization straight lines 600B1*a* included in the linear magnetization region 600B1 is the same as the number of the magnetization straight lines 600B2*a* included in the linear magnetization region 600B2.

The total number of the magnetization straight lines 600B1*a* and 600B2*a* included in the servo pattern 580B is different from the total number of the magnetization straight lines 600A1*a* and 600A2*a* included in the servo pattern 580A. In the example shown in FIG. 34, the total number of the magnetization straight lines 600A1*a* and 600A2*a* included in the servo pattern 580A is ten, whereas the total number of the magnetization straight lines 600B1*a* and 600B2*a* included in the servo pattern 580B is eight.

The linear magnetization region 600B1 is a set of magnetization straight lines 600B1*a*, which are four magnetized straight lines, and the linear magnetization region 600B2 is a set of magnetization straight lines 600B2*a*, which are four magnetized straight lines. In the servo band SB, the positions of both ends of the linear magnetization region 600B1 (that is, the positions of both ends of each of the four magnetization straight lines 600B1*a*) and the positions of both ends of the linear magnetization region 600B2 (that is, the positions of both ends of each of the four magnetization straight lines 600B2*a*) are aligned in the width direction WD.

As described above, the geometrical characteristic of the servo pattern 580A corresponds to the geometrical characteristic of the mirror image of the linear magnetization region 60A2 (see FIG. 19) and the geometrical characteristic of the mirror image of the linear magnetization region 60A2 (see FIG. 19) (that is, geometrical characteristic of the mirror image of the servo pattern 58A shown in FIG. 19), and the geometrical characteristic of the servo pattern 580B corresponds to the geometrical characteristic of the mirror image of the linear magnetization region 60B2 (see FIG. 19) and the geometrical characteristic of the mirror image of the linear magnetization region 60B2 (see FIG. 19) (that is, geometrical characteristic of the mirror image of the servo pattern 58B shown in FIG. 19). However, this is merely an example, and instead of the servo pattern 580, the servo pattern formed by the geometrical characteristic of the mirror image of the servo pattern 72 shown in FIG. 24, the geometrical characteristic of the mirror image of the servo pattern 78 shown in FIG. 26, the geometrical characteristic of the mirror image of the servo pattern 84 shown in FIG. 29, the geometrical characteristic of the mirror image of the servo pattern 90 shown in FIG. 33, or the geometrical characteristic of the mirror image of the servo pattern 96 shown in FIG. 35 may be applied.

It should be noted that, even in a case in which the geometrical characteristic of the servo pattern is changed in this way, the inclination mechanism 49 changes the direction of the inclination (that is, azimuth) of the imaginary straight line C3 with respect to the imaginary straight line C4 and the inclined angle (for example, angle β shown in FIG. 23) in accordance with the geometrical characteristic of the servo pattern. That is, even in a case in which the geometrical characteristic of the servo pattern is changed, as in the same manner in the first modification example described above, the inclination mechanism 49 rotates, under the control of the control device 30A, the magnetic head 28 around the rotation axis RA on the front surface 31 of the magnetic tape MT to change the direction of the inclination of the imaginary straight line C3 with respect to the imaginary straight line C4 (that is, azimuth) and the inclined angle (for example, angle β shown in FIG. 23) such that the variation in the servo pattern signal is reduced.

Other Modification Examples

In the embodiment described above, the magnetic tape system 10 has been described in which the magnetic tape cartridge 12 can be inserted and removed with respect to the magnetic tape drive 14, but the technology of the present disclosure is not limited to this. For example, even in a case of the magnetic tape system in which at least one magnetic tape cartridge 12 is loaded in advance into the magnetic tape drive 14 (that is, the magnetic tape system in which at least one magnetic tape cartridge 12 and the magnetic tape drive 14 are integrated in advance), the technology of the present disclosure is established.

In the embodiment described above, the single magnetic head 28 has been described, but the technology of the present disclosure is not limited to this. For example, a plurality of magnetic heads 28 may be disposed on the magnetic tape MT. For example, the magnetic head 28 for reading and at least one magnetic head 28 for writing may be disposed on the magnetic tape MT. The magnetic head 28 for reading may be used for verifying the data recorded in the data band DB by the magnetic head 28 for writing. In addition, one magnetic head on which the magnetic element unit 42 for reading and at least one magnetic element unit 42 for writing are mounted may be disposed on the magnetic tape MT.

Figure 38:
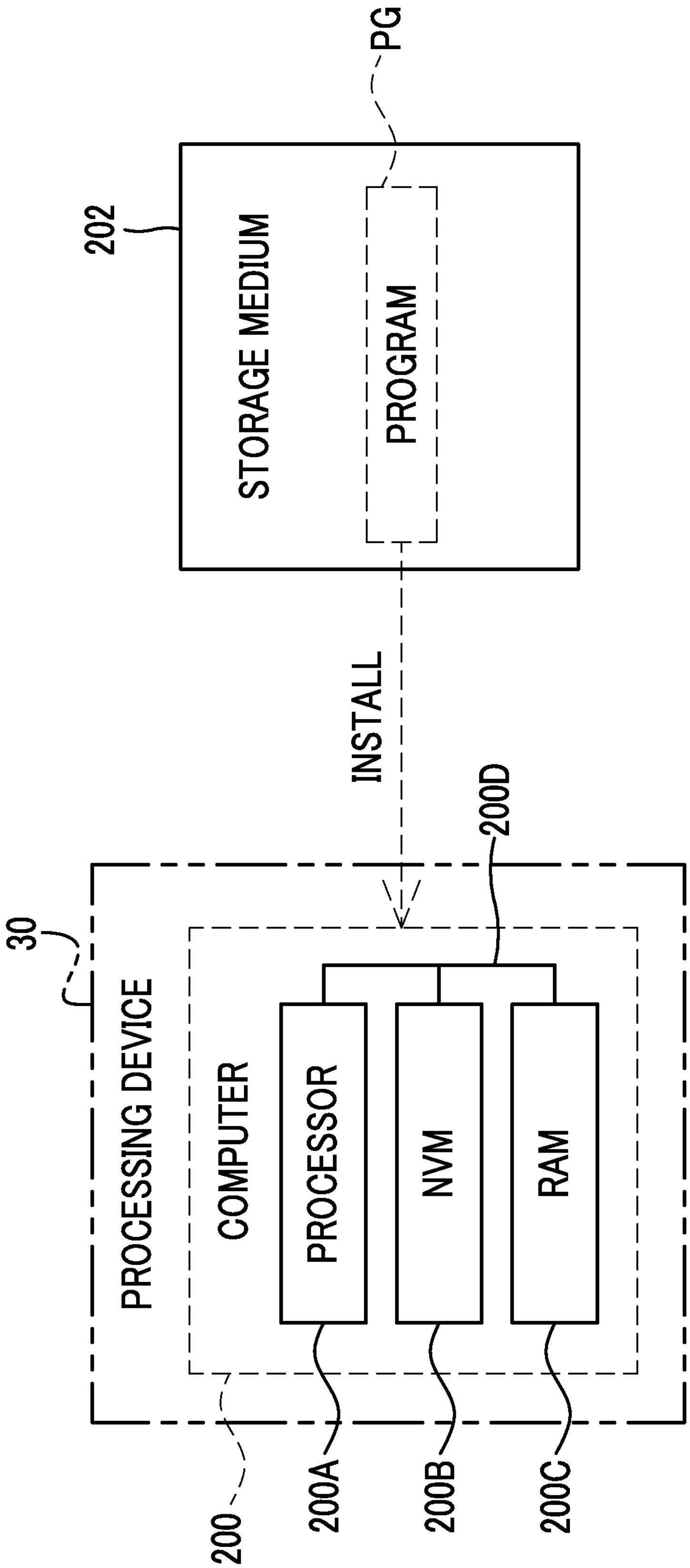
FIG. 38 is a conceptual diagram showing an example of an aspect in which a program stored in a storage medium is installed in a computer of the processing device.

In the embodiment described above, the form example has been described in which the processing device 30 (see FIG. 3) is realized by the ASIC, but the technology of the present disclosure is not limited to this, and the processing device 30 may be realized by a software configuration. In addition, only the control device 30A and the position detection device 30B provided in the processing device 30 may be realized by the software configuration. In a case in which the control device 30A and the position detection device 30B are realized by the software configuration, for example, as shown in FIG. 38, the processing device 30 comprises a computer 200. The computer 200 includes a processor 200A (for example, a single CPU or a plurality of CPUs), an NVM 200B, and a RAM 200C. The processor 200A, the NVM 200B, and the RAM 200C are connected to a bus 200D. A detection program PG is stored in a portable storage medium 202 (for example, an SSD or a USB memory) which is a computer-readable non-transitory storage medium.

The program PG stored in the storage medium 202 is installed in the computer 200. The processor 200A executes the servo pattern detection processing (see FIG. 15) and the ideal waveform signal acquisition processing (see FIG. 16) in accordance with the program PG.

In addition, the servo pattern detection program PG may be stored in a storage device of another computer or server device connected to the computer 200 via a communication network (not shown), and the program PG may be downloaded in response to a request from the processing device 30 and installed in the computer 200. It should be noted that the program PG is an example of a "program" according to the technology of the present disclosure, and the computer 200 is an example of a "computer" according to the technology of the present disclosure.

In the example shown in FIG. 38, although the computer 200 has been described as an example, the technology of the present disclosure is not limited to this, and a device including an ASIC, an FPGA, and/or a PLC may be applied instead of the computer 200. In addition, instead of the computer 200, a hardware configuration and a software configuration may be used in combination.

As the hardware resource for executing the processing of the processing device 30 (see FIG. 3) and/or the servo writer controller SW5 (see FIG. 14), various processors shown below can be used. Examples of the processor include the CPU which is a general-purpose processor functioning as the hardware resource for executing the processing by executing software, that is, a program. In addition, examples of the processor include a dedicated electronic circuit which is a processor having a circuit configuration designed to be dedicated to executing specific processing, such as an FPGA, a PLC, or an ASIC described as an example. A memory is built in or connected to any processor, and any processor executes the processing by using the memory.

The hardware resource for executing the processing of the processing device 30 and/or the servo writer controller SW5 may be composed of one of those various processors or may be composed of a combination of two or more processors of the same type or different types (for example, a combination of a plurality of FPGAs or a combination of a CPU and an FPGA). In addition, the hardware resource for executing the processing of the processing device 30 and/or the servo writer controller SW5 may be one processor.

As a configuring example of one processor, first, there is a form in which one processor is composed of a combination of one or more CPUs and software and the processor functions as the hardware resource for executing the processing. Secondly, as represented by SoC, there is a form in which a processor that realizes the functions of the entire system including a plurality of hardware resources for executing the processing with one IC chip is used. As described above, the processing of the processing device 30 and/or the servo writer controller SW5 is realized by using one or more of the various processors described above as the hardware resource.

Further, as the hardware structure of these various processors, more specifically, it is possible to use an electronic circuit in which circuit elements, such as semiconductor elements, are combined. In addition, the processing of the processing device 30 and/or the servo writer controller SW5 is merely an example. Therefore, it is needless to say that unnecessary steps may be deleted, new steps may be added, or the processing order may be changed within a range that does not deviate from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be described by reference.

What is claimed is:

1. A detection device comprising:
a processing device; and
a storage medium,
wherein the processing device
stores in advance a sampling result of reading a reference servo pattern by a servo reading element from a magnetic tape in which the reference servo pattern is recorded, in the storage medium as an ideal waveform signal indicating an ideal waveform,
acquires a servo band signal which is a result of reading a servo pattern recorded in a servo band of the magnetic tape by the servo reading element, and
detects a servo pattern signal which is a result of reading the servo pattern by the servo reading element by comparing the ideal waveform signal stored in the storage medium with the servo band signal,
the magnetic tape has a BOT section and an EOT section, and
the reference servo pattern is recorded between the BOT section and the EOT section in a longitudinal direction of the magnetic tape.

2. The detection device according to claim 1,
wherein the reference servo pattern is recorded in a plurality of sections intermittently provided along the longitudinal direction.

3. The detection device according to claim 2,
wherein the plurality of sections are provided across a portion, which is designated in advance as a portion in which a width of the magnetic tape is deformed, in the longitudinal direction.

4. The detection device according to claim 2,
wherein the plurality of sections are provided at regular intervals along the longitudinal direction of the magnetic tape.

5. The detection device according to claim 1,
wherein the reference servo pattern is further recorded in at least one of the BOT section or the EOT section.

6. The detection device according to claim 1,
wherein the ideal waveform signal is a signal indicating a statistic value of the result of reading the reference servo pattern.

7. The detection device according to claim 1, wherein a geometrical characteristic of the reference servo pattern corresponds to a geometrical characteristic of the servo pattern.

8. The detection device according to claim 1, wherein the reference servo pattern is at least one first linear magnetization region pair, the first linear magnetization region pair includes a first linear magnetization region which is linearly magnetized, and a second linear magnetization region which is linearly magnetized, the first linear magnetization region and the second linear magnetization region are inclined in opposite directions with respect to a first imaginary straight line along a width direction of the magnetic tape, the ideal waveform signal is classified into a first ideal waveform signal and a second ideal waveform signal, the first ideal waveform signal is a signal indicating a result of reading the first linear magnetization region by the servo reading element, and the second ideal waveform signal is a signal indicating a result of reading the second linear magnetization region by the servo reading element.

9. The detection device according to claim 8, wherein the servo pattern is at least one second linear magnetization region pair, the second linear magnetization region pair includes a third linear magnetization region which is linearly magnetized, and a fourth linear magnetization region which is linearly magnetized, the third linear magnetization region and the fourth linear magnetization region are inclined in opposite directions with respect to the first imaginary straight line along the width direction of the magnetic tape, the servo pattern signal includes a first signal which is a result of reading the third linear magnetization region by the servo reading element, and a second signal which is a result of reading the fourth linear magnetization region by the servo reading element, the processing device includes a first detection circuit and a second detection circuit which are connected in parallel, the first detection circuit acquires the servo band signal, and detects the first signal by comparing the servo band signal with the first ideal waveform signal, and the second detection circuit acquires the servo band signal, and detects the second signal by comparing the servo band signal with the second ideal waveform signal.

10. The detection device according to claim 1, wherein the processing device detects the servo pattern signal by using an autocorrelation coefficient.

11. The detection device according to claim 1, wherein the magnetic tape is accommodated in a cartridge, and a noncontact storage medium capable of communicating with the processing device in a noncontact manner is provided in the cartridge as the storage medium.

12. The detection device according to claim 1, wherein the storage medium is the magnetic tape.

13. A magnetic tape cartridge comprising:

a memory in which the ideal waveform signal to be compared with the servo band signal by the processing device provided in the detection device according to claim 1 is stored; and the magnetic tape.

14. A magnetic tape in which the ideal waveform signal to be compared with the servo band signal by the processing device provided in the detection device according to claim 1 is stored.

15. The magnetic tape according to claim 14, wherein a BOT section and/or an EOT section is provided, and the ideal waveform signal is stored in the BOT section and/or the EOT section.

16. The magnetic tape according to claim 14, wherein a data band is formed, and the ideal waveform signal is stored in the data band.

17. A magnetic tape cartridge in which the magnetic tape according to claim 14 is accommodated.

18. An inspection device comprising:

the detection device according to claim 1; and an inspection processor that performs an inspection of the servo band in which the servo pattern is recorded in the magnetic tape based on the servo pattern signal detected by the detection device.

19. A magnetic tape drive comprising:

the detection device according to claim 1, and a magnetic head that is operated in response to the servo pattern signal detected by the detection device.

20. A magnetic tape system comprising:

a magnetic tape drive including the detection device according to claim 1, and a magnetic head that is operated in response to the servo pattern signal detected by the detection device; and a magnetic tape subjected to magnetic processing by the magnetic head.

21. A detection method comprising:

storing in advance a sampling result of reading a reference servo pattern by a servo reading element from a magnetic tape in which the reference servo pattern is recorded, in a storage medium as an ideal waveform signal indicating an ideal waveform;

acquiring a servo band signal which is a result of reading a servo pattern recorded in a servo band of the magnetic tape by the servo reading element; and detecting a servo pattern signal which is a result of reading the servo pattern by the servo reading element by comparing the ideal waveform signal stored in the storage medium with the servo band signal, wherein the magnetic tape has a BOT section and an EOT section, and the reference servo pattern is recorded between the BOT section and the EOT section in a longitudinal direction of the magnetic tape.

22. An inspection method comprising:

performing an inspection of the servo band in which the servo pattern is recorded in the magnetic tape based on the servo pattern signal detected by the detection method according to claim 21.

23. A non-transitory computer-readable storage medium storing a program executable by a computer to perform a process comprising:

storing in advance a sampling result of reading a reference servo pattern by a servo reading element from a magnetic tape in which the reference servo pattern is recorded, in a storage medium as an ideal waveform signal indicating an ideal waveform;

acquiring a servo band signal which is a result of reading a servo pattern recorded in a servo band of the magnetic tape by the servo reading element; and detecting a servo pattern signal which is a result of reading the servo pattern by the servo reading element by comparing the ideal waveform signal stored in the storage medium with the servo band signal, wherein the magnetic tape has a BOT section and an EOT section, and the reference servo pattern is recorded between the BOT section and the EOT section in a longitudinal direction of the magnetic tape.

24. The detection device according to claim 1, wherein:

the processing device performs servo pattern detection processing and ideal waveform signal acquisition processing, the ideal waveform signal acquisition processing is performed in a previous stage of the servo pattern detection processing, and in the ideal waveform signal acquisition processing, the processing device stores a result of actually reading a reference servo pattern by the servo reading element from the magnetic tape, in the storage medium as the ideal waveform signal, and in the servo pattern detection processing, the processing device acquires the servo band signal and detects a servo pattern signal by comparing the ideal waveform signal stored with the servo band signal.

* * * * *